US012213455B2

(12) United States Patent
Brayer et al.

(10) Patent No.: US 12,213,455 B2
(45) Date of Patent: Feb. 4, 2025

(54) LIVESTOCK LOCATION SYSTEM

(71) Applicant: S.C.R. (ENGINEERS) LIMITED, Netanya (IL)

(72) Inventors: Eyal Brayer, Kfar Monash (IL); Vladimir Voronin, Netanya (IL); Uri Ben Menachem, Netanya (IL)

(73) Assignee: S.C.R. (ENGINEERS) LIMITED, Netanya (IL)

( * ) Notice: Subject to any disclaimer, the term of this patent is extended or adjusted under 35 U.S.C. 154(b) by 0 days.

(21) Appl. No.: 18/476,340

(22) Filed: Sep. 28, 2023

(65) Prior Publication Data

US 2024/0049689 A1 Feb. 15, 2024

Related U.S. Application Data

(63) Continuation of application No. 17/183,376, filed on Feb. 24, 2021, now Pat. No. 11,963,515, which is a
(Continued)

(51) Int. Cl.
*A01K 29/00* (2006.01)
*A01J 5/007* (2006.01)
(Continued)

(52) U.S. Cl.
CPC ............ *A01K 29/005* (2013.01); *A01J 5/007* (2013.01); *A01J 5/01* (2013.01); *A01K 1/0029* (2013.01);
(Continued)

(58) Field of Classification Search
CPC ........ A01K 5/02; A01K 29/00; A01K 5/0216; A01K 5/00; A01K 11/006; A01K 11/004; A01K 11/007; A01J 5/01
See application file for complete search history.

(56) References Cited

U.S. PATENT DOCUMENTS 85,575 A 1/1869 Drake
377,588 A 2/1888 Walsh, Jr.
(Continued)

FOREIGN PATENT DOCUMENTS

AU 199534570 10/1994
AU 2003239832 5/2002
(Continued)

OTHER PUBLICATIONS

Christian Pahl, Eberhard Hartung, Anne Grothmann, Katrin Mahlkow-Nerge, Angelika Haeussermann, Rumination activity of dairy cows in the 24 hours before and after calving, Journal of Dairy Science, vol. 97, Issue 11, 2014, pp. 6935-6941.
(Continued)

*Primary Examiner* — Yvonne R Abbott-Lewis
(74) *Attorney, Agent, or Firm* — S.J. Intellectual Property LTD.

(57) ABSTRACT

In a headlock system having a plurality of n headlock cells, each of the n cells being adapted to enclose at least one animal; n is an integer greater than 1; a system for locating the position of at least one animal, the system comprising: at least one identification means adapted to transmit at least one identification signal associated with said at least one animal; at least one locating means adapted to generate at least one location signal associated with said at least one animal; and, a data processing system in communication with said at least one identification means and said at least one locating means, adapted to analyze said signals, said analyzed signals comprising the position within a predetermined region in said headlock system of each of said at least one animals as a function of time.

19 Claims, 18 Drawing Sheets

Related U.S. Application Data continuation of application No. 15/275,507, filed on Sep. 26, 2016, now Pat. No. 10,986,816, which is a continuation-in-part of application No. PCT/IL2015/050273, filed on Mar. 15, 2015.

(60) Provisional application No. 61/970,379, filed on Mar. 26, 2014.

(51) Int. Cl.

| | | |
|---|---|---|
| *A01J 5/01* | (2006.01) | |
| *A01K 1/00* | (2006.01) | |
| *A01K 1/12* | (2006.01) | |
| *A01K 11/00* | (2006.01) | |
| *A01K 15/02* | (2006.01) | |
| *G05B 19/4155* | (2006.01) | |

(52) U.S. Cl.
CPC .............. *A01K 1/12* (2013.01); *A01K 11/004* (2013.01); *A01K 11/006* (2013.01); *A01K 11/007* (2013.01); *A01K 15/029* (2013.01); *G05B 19/4155* (2013.01); *G05B 2219/45113* (2013.01)

(56) References Cited

U.S. PATENT DOCUMENTS

| | | | |
|---|---|---|---|
| 584,121 A | 6/1897 | Sanders | |
| 818,783 A | 4/1906 | Philippi | |
| 823,079 A | 6/1906 | Rais | |
| 1,016,752 A | 2/1912 | Leith | |
| 1,188,510 A | 6/1916 | Timson | |
| 1,364,137 A | 1/1921 | Pannier | |
| 1,759,400 A | 5/1930 | Hobbs | |
| 1,843,314 A | 2/1932 | Berntson et al. | |
| 1,863,037 A | 6/1932 | Archbold | |
| 2,078,827 A | 4/1937 | Ketchum | |
| 2,420,020 A | 5/1947 | Snell | |
| 2,553,400 A | 5/1951 | Blair | |
| 2,570,048 A | 10/1951 | Cooke et al. | |
| 3,091,770 A | 6/1963 | Mcmurray et al. | |
| 3,261,243 A | 7/1966 | Ellison | |
| 3,596,541 A | 8/1971 | Bieganski | |
| 3,812,859 A | 5/1974 | Murphy et al. | |
| 3,884,100 A | 5/1975 | Fideldy | |
| 3,981,209 A | 9/1976 | Caroff | |
| 4,120,303 A | 10/1978 | Villa-Massone et al. | |
| 4,121,591 A | 10/1978 | Hayes | |
| 4,281,657 A | 8/1981 | Ritchey | |
| 4,323,183 A | 4/1982 | Duchin | |
| 4,497,321 A | 2/1985 | Fearing et al. | |
| 4,516,577 A | 5/1985 | Scott et al. | |
| 4,531,520 A | 7/1985 | Reggers et al. | |
| 4,552,147 A | 11/1985 | Gardner | |
| 4,618,861 A * | 10/1986 | Gettens ................ | A61D 17/002 119/51.02 |
| 4,666,436 A | 5/1987 | McDonald et al. | |
| 4,672,966 A | 6/1987 | Haas, Jr. | |
| 4,696,119 A | 9/1987 | Howe et al. | |
| 4,716,899 A | 1/1988 | Huenefeld et al. | |
| 4,819,639 A | 4/1989 | Gardner | |
| 4,821,683 A | 4/1989 | Veldman | |
| 4,878,302 A | 11/1989 | Jowsey | |
| 4,943,294 A | 7/1990 | Knapp | |
| 5,022,253 A | 6/1991 | Parlatore | |
| 5,056,385 A | 10/1991 | Petersen | |
| 5,141,514 A | 8/1992 | van Amelsfort | |
| 5,154,721 A | 10/1992 | Perez | |
| 5,267,464 A | 12/1993 | Cleland | |
| 5,509,291 A | 4/1996 | Nilsson et al. | |
| 5,651,791 A | 7/1997 | Zavlodaver et al. | |
| 5,778,820 A | 7/1998 | van der Lely et al. | |
| 6,007,548 A | 12/1999 | Ritchey | |
| 6,016,769 A | 1/2000 | Forster | |
| 6,043,748 A | 3/2000 | Touchton et al. | |
| 6,053,926 A | 4/2000 | Luehrs et al. | |
| 6,095,915 A | 8/2000 | Geissler et al. | |
| 6,099,482 A | 8/2000 | Brune et al. | |
| 6,100,804 A | 8/2000 | Brady et al. | |
| 6,113,539 A | 9/2000 | Ridenour | |
| 6,114,957 A | 9/2000 | Westrick et al. | |
| 6,145,225 A | 11/2000 | Ritchey | |
| 6,166,643 A | 12/2000 | Janning et al. | |
| 6,172,640 B1 | 1/2001 | Durst et al. | |
| 6,232,880 B1 | 5/2001 | Anderson et al. | |
| 6,235,036 B1 | 5/2001 | Gardner et al. | |
| 6,271,757 B1 | 8/2001 | Touchton et al. | |
| 6,297,739 B1 | 10/2001 | Small | |
| 6,310,553 B1 | 10/2001 | Dance | |
| 6,375,612 B1 | 4/2002 | Guichon et al. | |
| 6,402,692 B1 | 6/2002 | Morford | |
| 6,497,197 B1 | 12/2002 | Huisma | |
| 6,502,060 B1 | 12/2002 | Christian | |
| 6,510,630 B1 | 1/2003 | Gardner | |
| 6,516,744 B1 * | 2/2003 | Bjork ................... | A01K 1/0023 119/14.02 |
| 6,535,131 B1 | 3/2003 | Bar-Shalom et al. | |
| 6,569,092 B1 | 5/2003 | Guichon et al. | |
| 6,659,039 B1 | 12/2003 | Larsen | |
| 6,772,556 B1 | 8/2004 | Liu | |
| 6,868,804 B1 | 3/2005 | Huisma et al. | |
| 7,016,730 B2 | 3/2006 | Ternes | |
| 7,046,152 B1 | 5/2006 | Peinetti et al. | |
| 7,137,359 B1 | 11/2006 | Braden | |
| 7,296,539 B2 | 11/2007 | Iljas | |
| 7,380,518 B2 | 6/2008 | Kates | |
| 7,705,736 B1 | 4/2010 | Kedziora | |
| 7,721,675 B2 * | 5/2010 | Kaever ................ | A01K 11/006 119/14.08 |
| 7,772,979 B2 | 8/2010 | Caisley | |
| 7,843,350 B2 | 11/2010 | Geissler et al. | |
| 7,937,861 B1 | 5/2011 | Zacher | |
| 8,005,624 B1 | 8/2011 | Starr | |
| 8,232,888 B2 | 7/2012 | Frederick et al. | |
| 8,266,990 B1 | 9/2012 | Janson | |
| 8,305,220 B2 | 11/2012 | Gibson | |
| 8,478,389 B1 | 7/2013 | Brockway et al. | |
| 8,622,929 B2 | 1/2014 | Wilson et al. | |
| 8,763,557 B2 | 7/2014 | Lipscomb et al. | |
| 8,950,357 B2 * | 2/2015 | Rajkondawar ............ | A01J 5/00 119/14.02 |
| 8,955,462 B1 | 2/2015 | Golden et al. | |
| 8,979,757 B2 | 3/2015 | Mottram et al. | |
| 9,215,862 B2 | 12/2015 | Bladen et al. | |
| 9,392,767 B2 | 7/2016 | Talt et al. | |
| 9,392,946 B1 | 7/2016 | Sarantos et al. | |
| 9,449,487 B1 | 9/2016 | Spitalny | |
| 9,603,342 B2 * | 3/2017 | Rajkondawar ....... | A01K 29/005 |
| 9,648,849 B1 | 5/2017 | Vivathana | |
| 9,693,536 B1 | 7/2017 | Dana | |
| 9,717,216 B1 | 8/2017 | Schlachta et al. | |
| 9,743,643 B1 | 8/2017 | Kaplan et al. | |
| 9,848,577 B1 | 12/2017 | Brandao et al. | |
| 9,861,080 B1 | 1/2018 | Hathaway et al. | |
| 10,004,204 B2 | 6/2018 | Hayes et al. | |
| 10,021,857 B2 | 7/2018 | Bailey et al. | |
| 10,039,263 B2 | 8/2018 | Teychene et al. | |
| 10,045,511 B1 | 8/2018 | Yarden et al. | |
| 10,064,391 B1 | 9/2018 | Riley | |
| 10,091,972 B1 | 10/2018 | Jensen et al. | |
| 10,231,442 B1 | 3/2019 | Chang et al. | |
| 10,242,547 B1 | 3/2019 | Strusaker et al. | |
| 10,264,762 B1 | 4/2019 | Lamb | |
| 10,352,759 B1 | 7/2019 | Jensen | |
| 10,446,006 B1 | 10/2019 | Johnson, Jr. et al. | |
| 10,512,430 B1 | 12/2019 | Hladio | |
| 10,588,295 B1 | 3/2020 | Riley | |
| 10,628,756 B1 | 4/2020 | Kuper et al. | |
| 10,638,726 B1 | 5/2020 | Makarychev et al. | |
| 10,691,674 B2 | 6/2020 | Leong et al. | |
| 2001/0027751 A1 | 10/2001 | van den Berg | |
| 2002/0010390 A1 | 1/2002 | Guice et al. | |
| 2002/0021219 A1 | 2/2002 | Edwards | |

(56) References Cited

U.S. PATENT DOCUMENTS

| | | | |
|---|---|---|---|
| 2002/0050248 A1* | 5/2002 | Pratt | A01K 29/00 119/51.02 |
| 2002/0091326 A1 | 7/2002 | Hashimoto et al. | |
| 2002/0095828 A1 | 7/2002 | Koopman et al. | |
| 2002/0154015 A1 | 10/2002 | Hixson | |
| 2002/0158765 A1 | 10/2002 | Pape et al. | |
| 2003/0004652 A1 | 1/2003 | Brunner et al. | |
| 2003/0023517 A1 | 1/2003 | Marsh et al. | |
| 2003/0028327 A1 | 2/2003 | Brunner et al. | |
| 2003/0062001 A1 | 4/2003 | Andersson | |
| 2003/0066491 A1 | 4/2003 | Stampe | |
| 2003/0144926 A1 | 7/2003 | Bodin et al. | |
| 2003/0146284 A1 | 8/2003 | Schmit et al. | |
| 2003/0149526 A1 | 8/2003 | Zhou et al. | |
| 2003/0154925 A1* | 8/2003 | Van Den Berg | A01K 1/12 119/14.02 |
| 2003/0177025 A1 | 9/2003 | Curkendall et al. | |
| 2003/0201931 A1 | 10/2003 | Durst et al. | |
| 2003/0208157 A1 | 11/2003 | Eidson et al. | |
| 2003/0221343 A1 | 12/2003 | Volk et al. | |
| 2003/0229452 A1 | 12/2003 | Lewis | |
| 2004/0066298 A1 | 4/2004 | Schmitt et al. | |
| 2004/0078390 A1 | 4/2004 | Saunders | |
| 2004/0118920 A1 | 6/2004 | He | |
| 2004/0123810 A1 | 7/2004 | Lorton et al. | |
| 2004/0177011 A1 | 9/2004 | Ramsay et al. | |
| 2004/0201454 A1 | 10/2004 | Waterhouse et al. | |
| 2005/0010333 A1 | 1/2005 | Lorton et al. | |
| 2005/0026181 A1 | 2/2005 | Davis et al. | |
| 2005/0097997 A1 | 5/2005 | Hile | |
| 2005/0108912 A1 | 5/2005 | Bekker | |
| 2005/0115508 A1 | 6/2005 | Little | |
| 2005/0128086 A1 | 6/2005 | Brown et al. | |
| 2005/0139168 A1 | 6/2005 | Light et al. | |
| 2005/0145187 A1 | 7/2005 | Gray | |
| 2005/0223997 A1* | 10/2005 | Umegard | G07C 9/28 119/14.03 |
| 2005/0273117 A1 | 12/2005 | Teychene | |
| 2005/0279287 A1 | 12/2005 | Kroeker | |
| 2005/0284381 A1 | 12/2005 | Bell et al. | |
| 2006/0011145 A1 | 1/2006 | Kates | |
| 2006/0052986 A1 | 3/2006 | Rogers et al. | |
| 2006/0064325 A1 | 3/2006 | Matsumoto et al. | |
| 2006/0087440 A1 | 4/2006 | Klein | |
| 2006/0106289 A1 | 5/2006 | Elser | |
| 2006/0117619 A1 | 6/2006 | Costantini | |
| 2006/0155172 A1 | 7/2006 | Rugg | |
| 2006/0170561 A1 | 8/2006 | Eyal | |
| 2006/0173367 A1 | 8/2006 | Stuart et al. | |
| 2006/0185605 A1 | 8/2006 | Renz et al. | |
| 2006/0201432 A1* | 9/2006 | Pratt | G06Q 10/10 119/51.02 |
| 2006/0201436 A1 | 9/2006 | Kates | |
| 2006/0207515 A1 | 9/2006 | Palett | |
| 2006/0241521 A1 | 10/2006 | Cohen | |
| 2006/0254523 A1* | 11/2006 | Guo | A01K 1/12 119/14.03 |
| 2006/0282274 A1 | 12/2006 | Bennett | |
| 2006/0290514 A1 | 12/2006 | Sakama et al. | |
| 2007/0006494 A1 | 1/2007 | Hayes et al. | |
| 2007/0008155 A1 | 1/2007 | Trost et al. | |
| 2007/0021660 A1 | 1/2007 | Delonzor et al. | |
| 2007/0027375 A1 | 2/2007 | Melker et al. | |
| 2007/0027377 A1 | 2/2007 | Delonzor et al. | |
| 2007/0027379 A1 | 2/2007 | Delonzor et al. | |
| 2007/0029381 A1 | 2/2007 | Braiman | |
| 2007/0044317 A1 | 3/2007 | Critelli | |
| 2007/0044732 A1 | 3/2007 | Araki et al. | |
| 2007/0062457 A1 | 3/2007 | Bates et al. | |
| 2007/0069899 A1 | 3/2007 | Shih et al. | |
| 2007/0103296 A1 | 5/2007 | Paessel et al. | |
| 2007/0149871 A1 | 6/2007 | Sarussi et al. | |
| 2007/0152825 A1 | 7/2007 | August et al. | |
| 2007/0222624 A1 | 9/2007 | Eicken et al. | |
| 2007/0255124 A1 | 11/2007 | Pologe et al. | |
| 2007/0258625 A1 | 11/2007 | Mirtsching | |
| 2007/0283791 A1 | 12/2007 | Engvall et al. | |
| 2007/0298421 A1 | 12/2007 | Jiang et al. | |
| 2008/0001815 A1 | 1/2008 | Wang et al. | |
| 2008/0004798 A1 | 1/2008 | Troxler et al. | |
| 2008/0017126 A1 | 1/2008 | Adams et al. | |
| 2008/0018481 A1 | 1/2008 | Zehavi | |
| 2008/0021352 A1 | 1/2008 | Keegan et al. | |
| 2008/0036610 A1 | 2/2008 | Hokuf et al. | |
| 2008/0047177 A1 | 2/2008 | Hilpert | |
| 2008/0055155 A1 | 3/2008 | Hensley et al. | |
| 2008/0059263 A1 | 3/2008 | Stroman et al. | |
| 2008/0061990 A1 | 3/2008 | Milnes et al. | |
| 2008/0076988 A1 | 3/2008 | Sarussi et al. | |
| 2008/0076992 A1 | 3/2008 | Hete et al. | |
| 2008/0085522 A1 | 4/2008 | Meghen et al. | |
| 2008/0097726 A1 | 4/2008 | Lorton et al. | |
| 2008/0110406 A1 | 5/2008 | Anderson et al. | |
| 2008/0146890 A1 | 6/2008 | Leboeuf et al. | |
| 2008/0173255 A1 | 7/2008 | Mainini et al. | |
| 2008/0190202 A1 | 8/2008 | Kulach et al. | |
| 2008/0190379 A1 | 8/2008 | Mainini et al. | |
| 2008/0215484 A1 | 9/2008 | Oldham | |
| 2008/0227662 A1 | 9/2008 | Stromberg et al. | |
| 2008/0228105 A1 | 9/2008 | Howell et al. | |
| 2008/0262326 A1 | 10/2008 | Hete et al. | |
| 2008/0272908 A1 | 11/2008 | Boyd | |
| 2008/0312511 A1 | 12/2008 | Osler et al. | |
| 2008/0314325 A1* | 12/2008 | Hempstead | A01K 1/0023 119/51.02 |
| 2009/0009388 A1 | 1/2009 | Wangrud | |
| 2009/0020613 A1 | 1/2009 | Chang et al. | |
| 2009/0025651 A1 | 1/2009 | Lalor | |
| 2009/0058730 A1 | 3/2009 | Geissler et al. | |
| 2009/0094869 A1 | 4/2009 | Geissler et al. | |
| 2009/0102668 A1 | 4/2009 | Thompson et al. | |
| 2009/0139462 A1 | 6/2009 | So | |
| 2009/0149727 A1 | 6/2009 | Truitt et al. | |
| 2009/0187392 A1 | 7/2009 | Riskey et al. | |
| 2009/0255484 A1 | 10/2009 | Muelken | |
| 2009/0312667 A1 | 12/2009 | Utsunomiya et al. | |
| 2010/0018363 A1 | 1/2010 | Chervenak et al. | |
| 2010/0027845 A1* | 2/2010 | Kim | G06V 40/28 382/107 |
| 2010/0030036 A1 | 2/2010 | Mottram et al. | |
| 2010/0045468 A1 | 2/2010 | Geissler | |
| 2010/0107985 A1* | 5/2010 | O'Hare | A01K 29/005 119/174 |
| 2010/0113902 A1 | 5/2010 | Hete et al. | |
| 2010/0116211 A1* | 5/2010 | Sundborger | A01J 5/007 119/14.08 |
| 2010/0139575 A1 | 6/2010 | Duncan et al. | |
| 2010/0147221 A1* | 6/2010 | Holscher | A01K 1/126 119/14.08 |
| 2010/0154722 A1* | 6/2010 | Van Den Berg | A01K 29/00 119/720 |
| 2010/0160809 A1 | 6/2010 | Laurence et al. | |
| 2010/0175625 A1 | 7/2010 | Klenotiz | |
| 2010/0217102 A1 | 8/2010 | LeBoeuf et al. | |
| 2010/0250198 A1 | 9/2010 | Lorton et al. | |
| 2010/0289639 A1 | 11/2010 | Gibson et al. | |
| 2010/0315241 A1 | 12/2010 | Jow | |
| 2010/0321182 A1 | 12/2010 | Wangrud | |
| 2010/0321189 A1 | 12/2010 | Gibson et al. | |
| 2010/0331739 A1* | 12/2010 | Maltz | A61D 17/008 600/588 |
| 2011/0018717 A1 | 1/2011 | Takahashi et al. | |
| 2011/0041367 A1 | 2/2011 | Bladen et al. | |
| 2011/0061605 A1 | 3/2011 | Hardi et al. | |
| 2011/0095089 A1 | 4/2011 | Kolton et al. | |
| 2011/0121356 A1 | 5/2011 | Krawinkel et al. | |
| 2011/0137185 A1 | 6/2011 | Hete et al. | |
| 2011/0152876 A1 | 6/2011 | Vandeputte | |
| 2011/0166793 A1 | 7/2011 | March et al. | |
| 2011/0178423 A1 | 7/2011 | Hatch | |
| 2011/0203144 A1 | 8/2011 | Junek et al. | |
| 2011/0258130 A1 | 10/2011 | Grabiner et al. | |
| 2011/0272470 A1 | 11/2011 | Baba et al. | |

(56) References Cited

U.S. PATENT DOCUMENTS

| | | |
|---|---|---|
| 2011/0313264 A1 | 12/2011 | Hete |
| 2012/0009943 A1 | 1/2012 | Greenberg et al. |
| 2012/0024238 A1 | 2/2012 | Corke |
| 2012/0068848 A1 | 3/2012 | Campbell et al. |
| 2012/0089152 A1 | 4/2012 | Lynd et al. |
| 2012/0092132 A1 | 4/2012 | Holme et al. |
| 2012/0111286 A1 | 5/2012 | Lee et al. |
| 2012/0112917 A1 | 5/2012 | Menachem et al. |
| 2012/0154147 A1 | 6/2012 | Cao et al. |
| 2012/0160181 A1 | 6/2012 | So et al. |
| 2012/0175412 A1 | 7/2012 | Grabiner et al. |
| 2012/0204811 A1 | 8/2012 | Ryan |
| 2012/0234245 A1 | 9/2012 | Rajkondawar et al. |
| 2012/0236690 A1 | 9/2012 | Rader et al. |
| 2012/0238912 A1 | 9/2012 | Rajkondawar et al. |
| 2012/0291715 A1 | 11/2012 | Jiang et al. |
| 2012/0299731 A1 | 11/2012 | Triener |
| 2012/0312250 A1 | 12/2012 | Jesurum |
| 2012/0325153 A1 | 12/2012 | Mostert |
| 2012/0326862 A1 | 12/2012 | Kwak et al. |
| 2012/0326874 A1 | 12/2012 | Kwak et al. |
| 2013/0006065 A1 | 1/2013 | Yanai et al. |
| 2013/0008391 A1 | 1/2013 | Berntsen |
| 2013/0014706 A1 | 1/2013 | Menkes |
| 2013/0046170 A1 | 2/2013 | Haynes |
| 2013/0092099 A1 | 4/2013 | Hardi et al. |
| 2013/0113622 A1 | 5/2013 | Pratt et al. |
| 2013/0119142 A1 | 5/2013 | Mccoy et al. |
| 2013/0175347 A1 | 7/2013 | Decaluwe et al. |
| 2013/0192526 A1 | 8/2013 | Mainini |
| 2013/0211773 A1 | 8/2013 | Loeschinger et al. |
| 2013/0222141 A1 | 8/2013 | Rhee et al. |
| 2013/0237778 A1 | 9/2013 | Rouquette et al. |
| 2013/0239904 A1 | 9/2013 | Kim et al. |
| 2013/0239907 A1 | 9/2013 | Laurence et al. |
| 2013/0265165 A1 | 10/2013 | So et al. |
| 2013/0282295 A1 | 10/2013 | White et al. |
| 2013/0285815 A1 | 10/2013 | Jones, II |
| 2014/0073486 A1 | 3/2014 | Ahmed et al. |
| 2014/0122488 A1 | 5/2014 | Jung et al. |
| 2014/0123912 A1 | 5/2014 | Menkes et al. |
| 2014/0135596 A1 | 5/2014 | LeBoeuf et al. |
| 2014/0135631 A1 | 5/2014 | Brumback et al. |
| 2014/0171762 A1 | 6/2014 | LeBoeuf et al. |
| 2014/0174376 A1 | 6/2014 | Touchton et al. |
| 2014/0196673 A1 | 7/2014 | Menkes et al. |
| 2014/0230755 A1 | 8/2014 | Trenkle et al. |
| 2014/0232541 A1 | 8/2014 | Trenkle et al. |
| 2014/0253709 A1 | 9/2014 | Bresch et al. |
| 2014/0261235 A1 | 9/2014 | Rich et al. |
| 2014/0267299 A1 | 9/2014 | Couse |
| 2014/0275824 A1 | 9/2014 | Couse |
| 2014/0276089 A1 | 9/2014 | Kirenko et al. |
| 2014/0290013 A1 | 10/2014 | Eidelman et al. |
| 2014/0302783 A1 | 10/2014 | Aiuto et al. |
| 2014/0331942 A1 | 11/2014 | Sarazyn |
| 2014/0333439 A1 | 11/2014 | Downing et al. |
| 2014/0347184 A1 | 11/2014 | Triener |
| 2014/0352632 A1 | 12/2014 | Mclaughlin |
| 2014/0368338 A1 | 12/2014 | Rettedal et al. |
| 2015/0025394 A1 | 1/2015 | Hong et al. |
| 2015/0039239 A1 | 2/2015 | Shuler et al. |
| 2015/0057963 A1 | 2/2015 | Zakharov et al. |
| 2015/0097668 A1 | 4/2015 | Toth |
| 2015/0099472 A1 | 4/2015 | Ickovic |
| 2015/0100245 A1 | 4/2015 | Huang et al. |
| 2015/0107519 A1 | 4/2015 | Rajkondawar et al. |
| 2015/0107522 A1 | 4/2015 | Lamb |
| 2015/0109130 A1 | 4/2015 | Rajkondawar et al. |
| 2015/0122893 A1 | 5/2015 | Warther |
| 2015/0128873 A1 | 5/2015 | Prescott et al. |
| 2015/0130617 A1 | 5/2015 | Triener |
| 2015/0148811 A1 | 5/2015 | Swope et al. |
| 2015/0157435 A1 | 6/2015 | Chasins et al. |
| 2015/0182322 A1 | 7/2015 | Couse et al. |
| 2015/0245592 A1 | 9/2015 | Sibbald et al. |
| 2015/0282457 A1 | 10/2015 | Yarden |
| 2015/0334994 A1 | 11/2015 | Prasad |
| 2015/0342143 A1 | 12/2015 | Stewart |
| 2015/0351885 A1 | 12/2015 | Kool et al. |
| 2015/0366166 A1 | 12/2015 | Mueller |
| 2016/0000045 A1 | 1/2016 | Funaya et al. |
| 2016/0021506 A1 | 1/2016 | Bonge, Jr. |
| 2016/0058379 A1 | 3/2016 | Menkes et al. |
| 2016/0066546 A1 | 3/2016 | Borchersen et al. |
| 2016/0100802 A1 | 4/2016 | Newman |
| 2016/0106064 A1 | 4/2016 | Bladen et al. |
| 2016/0113524 A1 | 4/2016 | Gross et al. |
| 2016/0120154 A1 | 5/2016 | Hill et al. |
| 2016/0128637 A1 | 5/2016 | LeBoeuf et al. |
| 2016/0135431 A1 | 5/2016 | Siegel |
| 2016/0148086 A1 | 5/2016 | Clarke et al. |
| 2016/0150362 A1 | 5/2016 | Shaprio et al. |
| 2016/0151013 A1 | 6/2016 | Atallah et al. |
| 2016/0165851 A1 | 6/2016 | Harty et al. |
| 2016/0165852 A1 | 6/2016 | Goldfain |
| 2016/0166761 A1 | 6/2016 | Piehl et al. |
| 2016/0198957 A1 | 7/2016 | Arditi et al. |
| 2016/0210841 A1 | 7/2016 | Huang et al. |
| 2016/0213317 A1 | 7/2016 | Richardson et al. |
| 2016/0278712 A1 | 9/2016 | Sagara et al. |
| 2016/0286757 A1 | 10/2016 | Armstrong |
| 2016/0287108 A1 | 10/2016 | Wei et al. |
| 2016/0317049 A1 | 11/2016 | LeBoeuf et al. |
| 2016/0345881 A1 | 12/2016 | Sarantos et al. |
| 2016/0360733 A1 | 12/2016 | Triener |
| 2016/0367495 A1 | 12/2016 | Miller et al. |
| 2017/0000090 A1 | 1/2017 | Hall |
| 2017/0006836 A1 | 1/2017 | Torres |
| 2017/0006838 A1 | 1/2017 | Brayer et al. |
| 2017/0042119 A1 | 2/2017 | Garrity |
| 2017/0067770 A1 | 3/2017 | Sun |
| 2017/0079247 A1 | 3/2017 | Womble et al. |
| 2017/0095206 A1 | 4/2017 | Leib et al. |
| 2017/0156288 A1 | 6/2017 | Singh |
| 2017/0164905 A1 | 6/2017 | Gumiero |
| 2017/0193208 A1 | 7/2017 | Ashley et al. |
| 2017/0196203 A1 | 7/2017 | Huisma et al. |
| 2017/0202185 A1 | 7/2017 | Trumbull et al. |
| 2017/0245797 A1 | 8/2017 | Quinn |
| 2017/0258039 A1 | 9/2017 | Lauterbach |
| 2017/0272842 A1 | 9/2017 | Touma |
| 2017/0280675 A1 | 10/2017 | MacNeil et al. |
| 2017/0280688 A1 | 10/2017 | Deliou et al. |
| 2017/0318781 A1 | 11/2017 | Rollins et al. |
| 2017/0360004 A1 | 12/2017 | Carver |
| 2017/0372583 A1 | 12/2017 | Lamkin et al. |
| 2018/0000045 A1 | 1/2018 | Bianchi et al. |
| 2018/0007863 A1 | 1/2018 | Bailey et al. |
| 2018/0014512 A1 | 1/2018 | Arabani et al. |
| 2018/0027772 A1 | 2/2018 | Gordon et al. |
| 2018/0055016 A1 | 3/2018 | Hsieh et al. |
| 2018/0064068 A1 | 3/2018 | McKee et al. |
| 2018/0070559 A1 | 3/2018 | So |
| 2018/0098522 A1 | 4/2018 | Steinfort |
| 2018/0110205 A1 | 4/2018 | Czarnecky et al. |
| 2018/0113498 A1 | 4/2018 | Cronin et al. |
| 2018/0131074 A1 | 5/2018 | Wilkinson et al. |
| 2018/0132455 A1 | 5/2018 | Pradeep et al. |
| 2018/0146645 A1 | 5/2018 | Arbel |
| 2018/0206455 A1 | 7/2018 | Thiex et al. |
| 2018/0242860 A1 | 8/2018 | LeBoeuf et al. |
| 2018/0249683 A1 | 9/2018 | Borchersen et al. |
| 2018/0260976 A1 | 9/2018 | Watanabe et al. |
| 2018/0271058 A1 | 9/2018 | Valdez |
| 2018/0279582 A1 | 10/2018 | Yajima et al. |
| 2018/0288968 A1 | 10/2018 | Cisco |
| 2018/0295809 A1 | 10/2018 | Yajima et al. |
| 2018/0303425 A1 | 10/2018 | Wordham et al. |
| 2018/0310526 A1 | 11/2018 | Birch et al. |
| 2018/0325382 A1 | 11/2018 | Brandao et al. |
| 2018/0332989 A1 | 11/2018 | Chiu et al. |
| 2018/0333244 A1 | 11/2018 | Hanks et al. |
| 2019/0008118 A1 | 1/2019 | Keegan |

(56) References Cited

U.S. PATENT DOCUMENTS

| | | |
|---|---|---|
| 2019/0008124 A1 | 1/2019 | Komatsu et al. |
| 2019/0029226 A1 | 1/2019 | Triener |
| 2019/0053469 A1 | 2/2019 | Mardirossian |
| 2019/0053470 A1 | 2/2019 | Singh et al. |
| 2019/0059335 A1 | 2/2019 | Crider, Jr. et al. |
| 2019/0059337 A1 | 2/2019 | Robbins |
| 2019/0059741 A1 | 2/2019 | Crider, Jr. et al. |
| 2019/0069512 A1 | 3/2019 | Eriksson et al. |
| 2019/0075945 A1 | 3/2019 | Strassburger et al. |
| 2019/0082654 A1 | 3/2019 | Robbins |
| 2019/0090754 A1 | 3/2019 | Brandao et al. |
| 2019/0110433 A1 | 4/2019 | Myers |
| 2019/0110436 A1 | 4/2019 | Gardner et al. |
| 2019/0125509 A1 | 5/2019 | Hotchkin |
| 2019/0130728 A1 | 5/2019 | Struhsaker et al. |
| 2019/0133086 A1 | 5/2019 | Katz et al. |
| 2019/0159428 A1 | 5/2019 | Bolen |
| 2019/0166802 A1 | 6/2019 | Seltzer et al. |
| 2019/0183091 A1 | 6/2019 | Betts-LaCroix et al. |
| 2019/0183092 A1 | 6/2019 | Couse et al. |
| 2019/0208358 A1 | 7/2019 | de Barros Chapiewski et al. |
| 2019/0213860 A1 | 7/2019 | Shaprio et al. |
| 2019/0254599 A1 | 8/2019 | Young et al. |
| 2019/0287429 A1 | 9/2019 | Dawson et al. |
| 2019/0290133 A1 | 9/2019 | Crider et al. |
| 2019/0290847 A1 | 9/2019 | Veyrent et al. |
| 2019/0298226 A1 | 10/2019 | Filipowicz |
| 2019/0298924 A1 | 10/2019 | Gibson et al. |
| 2019/0327939 A1 | 10/2019 | Sharpe et al. |
| 2019/0335715 A1 | 11/2019 | Hicks et al. |
| 2019/0350168 A1 | 11/2019 | Shi |
| 2019/0365324 A1 | 12/2019 | Chang |
| 2019/0373857 A1 | 12/2019 | Leigh-Lancaster et al. |
| 2019/0380311 A1 | 12/2019 | Crouthamel et al. |
| 2019/0385037 A1 | 12/2019 | Robadey et al. |
| 2019/0385332 A1 | 12/2019 | Yajima et al. |
| 2019/0387711 A1 | 12/2019 | Flennert et al. |
| 2020/0015740 A1 | 1/2020 | Alnofeli et al. |
| 2020/0029534 A1 | 1/2020 | Austin et al. |
| 2020/0037886 A1 | 2/2020 | Greer et al. |
| 2020/0068853 A1 | 3/2020 | Radovcic |
| 2020/0085019 A1 | 3/2020 | Gilbert et al. |
| 2020/0100463 A1 | 4/2020 | Rooda et al. |
| 2020/0107522 A1 | 4/2020 | Kersey et al. |
| 2020/0110946 A1 | 4/2020 | Kline et al. |
| 2020/0113728 A1 | 4/2020 | Spector et al. |
| 2020/0170222 A1 | 6/2020 | Gotts |
| 2020/0178504 A1 | 6/2020 | Moss et al. |
| 2020/0178505 A1 | 6/2020 | Womble et al. |
| 2020/0178800 A1 | 6/2020 | Geissler et al. |
| 2020/0205381 A1 | 7/2020 | Wernimont et al. |
| 2020/0229391 A1 | 7/2020 | De Groot |
| 2020/0229707 A1 | 7/2020 | Donnelly |
| 2020/0242551 A1 | 7/2020 | Lau et al. |
| 2020/0281151 A1 | 9/2020 | Schmidt |
| 2021/0004536 A1 | 2/2021 | Harvey et al. |
| 2022/0020051 A1 | 1/2022 | Aruga et al. |

FOREIGN PATENT DOCUMENTS

| | | |
|---|---|---|
| AU | 2003238759 | 1/2004 |
| AU | 2004263067 | 2/2005 |
| AU | 2004305403 | 7/2005 |
| AU | 2011210083 | 8/2011 |
| AU | 2016266101 | 12/2016 |
| AU | 2017100469 | 5/2017 |
| AU | 2018220079 | 9/2018 |
| BR | 8701673 | 3/2009 |
| BR | 112012018909 | 1/2011 |
| CA | 2267812 | 10/2000 |
| CA | 2493331 | 1/2005 |
| CA | 2788153 | 8/2011 |
| CA | 2880138 | 2/2013 |
| CA | 2858905 | 10/2013 |
| CA | 2875637 | 1/2014 |
| CA | 2875578 | 12/2014 |
| CA | 2915843 | 12/2014 |
| CA | 2990620 | 12/2016 |
| CA | 2916286 | 6/2017 |
| CA | 3007296 | 6/2017 |
| CN | 1989895 | 7/2007 |
| CN | 201171316 | 12/2008 |
| CN | 101578516 | 11/2009 |
| CN | 101816290 | 9/2010 |
| CN | 101875975 | 11/2010 |
| CN | 101875976 | 11/2010 |
| CN | 102781225 | 1/2011 |
| CN | 102142116 | 8/2011 |
| CN | 102485892 | 6/2012 |
| CN | 102682322 | 9/2012 |
| CN | 203313865 | 12/2013 |
| CN | 203689049 | 2/2014 |
| CN | 203523519 | 4/2014 |
| CN | 204047531 | 8/2014 |
| CN | 204305813 | 5/2015 |
| CN | 204331349 | 5/2015 |
| CN | 105191817 | 12/2015 |
| CN | 106125648 | 11/2016 |
| CN | 106172068 | 12/2016 |
| CN | 106197675 | 12/2016 |
| CN | 106719037 | 2/2017 |
| CN | 205919898 | 2/2017 |
| CN | 106472347 | 3/2017 |
| CN | 106845598 | 6/2017 |
| CN | 206431665 | 8/2017 |
| CN | 107201409 | 9/2017 |
| CN | 207201674 | 9/2017 |
| CN | 107251851 | 10/2017 |
| CN | 107667898 | 2/2018 |
| CN | 108353810 | 2/2018 |
| CN | 207100094 | 3/2018 |
| CN | 207249710 | 4/2018 |
| CN | 108651301 | 5/2018 |
| CN | 108656996 | 5/2018 |
| CN | 108684549 | 5/2018 |
| CN | 108118096 | 6/2018 |
| CN | 108308055 | 7/2018 |
| CN | 109006541 | 8/2018 |
| CN | 109008529 | 8/2018 |
| CN | 108617533 | 10/2018 |
| CN | 108717668 | 10/2018 |
| CN | 108766586 | 11/2018 |
| CN | 109006550 | 12/2018 |
| CN | 208273869 | 12/2018 |
| CN | 109355402 | 2/2019 |
| CN | 109937904 | 3/2019 |
| CN | 109937905 | 3/2019 |
| CN | 109823691 | 5/2019 |
| CN | 110073995 | 5/2019 |
| CN | 110059781 | 7/2019 |
| CN | 110106261 | 8/2019 |
| CN | 110106262 | 8/2019 |
| CN | 110506656 | 11/2019 |
| CN | 210076292 | 2/2020 |
| DE | 633742 | 8/1936 |
| DE | 2850438 | 5/1980 |
| DE | 19629166 | 2/1997 |
| DE | 19826348 | 6/1998 |
| DE | 29906146 | 6/1999 |
| DE | 19911766 | 9/2000 |
| DE | 20018364 | 1/2001 |
| DE | 10001176 | 5/2001 |
| DE | 102004027978 | 12/2005 |
| DE | 202010008325 | 2/2012 |
| DE | 202013011075 | 1/2014 |
| DE | 202016101289 | 4/2016 |
| DK | 140001 | 11/1979 |
| EP | 55127 | 6/1982 |
| EP | 125915 | 11/1984 |
| EP | 0499428 | 8/1992 |
| EP | 513525 | 11/1992 |
| EP | 743043 | 11/1996 |
| EP | 938841 | 2/1998 |
| EP | 898449 | 3/1999 |

(56) References Cited

FOREIGN PATENT DOCUMENTS

| | | |
|---|---|---|
| EP | 1076485 | 2/2001 |
| EP | 1445723 | 8/2004 |
| EP | 1479338 | 11/2004 |
| EP | 1521208 | 4/2005 |
| EP | 1907816 | 4/2008 |
| EP | 1961294 | 8/2008 |
| EP | 2028931 | 3/2009 |
| EP | 2172878 | 4/2010 |
| EP | 2453733 | 5/2012 |
| EP | 2465344 | 6/2012 |
| EP | 2488237 | 8/2012 |
| EP | 2528431 | 12/2012 |
| EP | 2534945 | 12/2012 |
| EP | 2657889 | 10/2013 |
| EP | 2664234 | 11/2013 |
| EP | 2728995 | 5/2014 |
| EP | 2879615 | 6/2015 |
| EP | 2955998 | 12/2015 |
| EP | 3153098 | 4/2017 |
| EP | 3164855 | 5/2017 |
| EP | 3210531 | 8/2017 |
| EP | 3217566 | 9/2017 |
| EP | 3218865 | 9/2017 |
| EP | 3225106 | 10/2017 |
| EP | 3316680 | 5/2018 |
| EP | 3346422 | 7/2018 |
| EP | 3385886 | 10/2018 |
| EP | 3593634 | 1/2020 |
| EP | 3627856 | 3/2020 |
| EP | 3660855 | 6/2020 |
| EP | 4001951 A1 | 5/2022 |
| ES | 2046912 | 2/1994 |
| ES | 2206009 | 5/2004 |
| ES | 2215152 | 10/2004 |
| ES | 1072416 | 7/2010 |
| ES | 2391341 | 11/2012 |
| ES | 1194609 | 10/2017 |
| FI | 20165318 | 6/2017 |
| FR | 2106705 | 5/1972 |
| FR | 2297565 | 8/1976 |
| FR | 2342024 | 1/1983 |
| FR | 2601848 | 1/1988 |
| FR | 2779153 | 12/1999 |
| FR | 2834521 | 7/2003 |
| FR | 2964777 | 3/2012 |
| FR | 3046332 | 1/2016 |
| FR | 3024653 | 2/2016 |
| FR | 3085249 | 9/2018 |
| GB | 588870 | 6/1947 |
| GB | 641394 | 8/1950 |
| GB | 865164 | 4/1961 |
| GB | 1072971 | 6/1967 |
| GB | 1267830 | 3/1972 |
| GB | 1415650 | 11/1975 |
| GB | 2067121 | 7/1981 |
| GB | 2055670 | 7/1983 |
| GB | 2114045 | 8/1983 |
| GB | 2125343 | 3/1984 |
| GB | 2142812 | 1/1985 |
| GB | 2392138 | 2/2004 |
| GB | 2469326 | 10/2010 |
| GB | 2554636 | 9/2016 |
| GB | 2570340 | 7/2019 |
| GB | 2571404 | 8/2019 |
| IN | 201103443 | 12/2011 |
| IN | 200802272 | 6/2016 |
| JP | 57173562 | 11/1982 |
| JP | 7177832 | 7/1995 |
| JP | 2001178692 | 7/2001 |
| JP | 2004292151 | 10/2004 |
| JP | 2005102959 | 4/2005 |
| JP | 5659243 | 1/2011 |
| JP | 2011067178 | 4/2011 |
| JP | 2011087657 | 5/2011 |
| JP | 2013247941 | 6/2012 |
| JP | 2017112857 | 6/2017 |
| JP | 2017002170 | 4/2018 |
| KR | 2003061157 | 7/2003 |
| KR | 2005046330 | 5/2005 |
| KR | 780449 | 11/2007 |
| KR | 101747418 | 1/2011 |
| KR | 20130019970 | 2/2013 |
| KR | 20130057683 | 6/2013 |
| KR | 2013138899 | 12/2013 |
| KR | 2019061805 | 11/2017 |
| KR | 101827311 | 2/2018 |
| KR | 20180035537 | 4/2018 |
| KR | 2018109451 | 10/2018 |
| KR | 20190081598 | 7/2019 |
| KR | 2019091708 | 8/2019 |
| MX | 9600754 | 2/1997 |
| MX | 356331 | 1/2011 |
| NL | 2017104 | 1/2018 |
| NL | 2019186 | 1/2019 |
| NL | 2020275 | 7/2019 |
| NZ | 198486 | 5/1986 |
| NZ | 199494 | 7/1986 |
| NZ | 203924 | 10/1986 |
| NZ | 335702 | 3/2001 |
| NZ | 507129 | 8/2002 |
| NZ | 582984 | 1/2011 |
| RU | 2178711 | 1/2002 |
| RU | 2265324 | 12/2005 |
| SE | 4597 | 3/1893 |
| SE | 5549 | 4/1894 |
| SE | 123213 | 11/1948 |
| SE | 188102 | 3/1964 |
| SU | 1766336 | 10/1992 |
| WO | 1984000468 | 2/1984 |
| WO | 1991011956 | 8/1991 |
| WO | 199302549 | 2/1993 |
| WO | 199822028 | 5/1998 |
| WO | 1998039475 | 9/1998 |
| WO | 1999017658 | 4/1999 |
| WO | 2000062263 | 4/1999 |
| WO | 9945761 | 9/1999 |
| WO | 2000013393 | 3/2000 |
| WO | 2000061802 | 10/2000 |
| WO | 2001033950 | 5/2001 |
| WO | 2001087054 | 11/2001 |
| WO | 0193667 A1 | 12/2001 |
| WO | 2002031629 | 4/2002 |
| WO | 2002085106 | 10/2002 |
| WO | 2003001180 | 1/2003 |
| WO | 2004092920 | 3/2003 |
| WO | 2003087765 | 10/2003 |
| WO | 2003094605 | 11/2003 |
| WO | 2004015655 | 2/2004 |
| WO | 2005104775 | 4/2004 |
| WO | 2006078943 | 1/2005 |
| WO | 2005034617 A1 | 4/2005 |
| WO | 2005104930 | 4/2005 |
| WO | 2005073408 | 8/2005 |
| WO | 2005082132 A2 | 9/2005 |
| WO | 2006021855 | 3/2006 |
| WO | 2006022548 A1 | 3/2006 |
| WO | 20060036567 A1 | 4/2006 |
| WO | 2006134197 | 12/2006 |
| WO | 2006135265 | 12/2006 |
| WO | 2007034211 | 3/2007 |
| WO | 2007095684 | 8/2007 |
| WO | 2007122375 | 11/2007 |
| WO | 200801803 A2 | 2/2008 |
| WO | 2008033042 | 3/2008 |
| WO | 2008041839 A1 | 4/2008 |
| WO | 2008052298 | 5/2008 |
| WO | 2008075974 | 6/2008 |
| WO | 2010091686 | 12/2008 |
| WO | 2009034497 | 3/2009 |
| WO | 2009062249 | 5/2009 |
| WO | 2009076325 | 6/2009 |
| WO | 2009089215 | 7/2009 |
| WO | 2009117764 | 10/2009 |
| WO | 2009153779 | 12/2009 |

(56) References Cited

FOREIGN PATENT DOCUMENTS

| | | |
|---|---|---|
| WO | 2010008620 | 1/2010 |
| WO | 2010048753 | 5/2010 |
| WO | 2010053811 | 5/2010 |
| WO | 2010068713 | 6/2010 |
| WO | 2010140900 | 12/2010 |
| WO | 2012075480 | 12/2010 |
| WO | 2011039112 | 4/2011 |
| WO | 2011076886 | 6/2011 |
| WO | 2011154949 | 12/2011 |
| WO | 2012071670 | 6/2012 |
| WO | 2013008115 | 1/2013 |
| WO | 2013038326 | 3/2013 |
| WO | 2013082227 | 6/2013 |
| WO | 2015001537 | 7/2013 |
| WO | 2013118121 | 8/2013 |
| WO | 2015024050 | 8/2013 |
| WO | 2013179020 | 12/2013 |
| WO | 2013190423 | 12/2013 |
| WO | 2014020463 | 2/2014 |
| WO | 2014030156 A1 | 2/2014 |
| WO | 2014095759 | 6/2014 |
| WO | 2014107766 | 7/2014 |
| WO | 2014118788 | 8/2014 |
| WO | 2014125250 | 8/2014 |
| WO | 2016027271 | 8/2014 |
| WO | 2014140148 | 9/2014 |
| WO | 2014141084 | 9/2014 |
| WO | 2014194383 | 12/2014 |
| WO | 2014197631 | 12/2014 |
| WO | 2014199363 | 12/2014 |
| WO | 2015009167 | 1/2015 |
| WO | 2015030832 | 3/2015 |
| WO | 2015055709 | 4/2015 |
| WO | 2015086338 | 6/2015 |
| WO | 2016207844 | 6/2015 |
| WO | 2015107354 | 7/2015 |
| WO | 2017001717 | 7/2015 |
| WO | 2017031532 | 8/2015 |
| WO | 2015140486 | 9/2015 |
| WO | 2015158787 | 10/2015 |
| WO | 2015160263 A1 | 10/2015 |
| WO | 2015175686 | 11/2015 |
| WO | 2015176027 | 11/2015 |
| WO | 2015197385 | 12/2015 |
| WO | 2016037190 | 3/2016 |
| WO | 2017149049 | 3/2016 |
| WO | 2016053104 | 4/2016 |
| WO | 2016108187 | 7/2016 |
| WO | 2016166748 | 10/2016 |
| WO | 2017001538 | 1/2017 |
| WO | 2017027551 | 2/2017 |
| WO | 2017037479 | 3/2017 |
| WO | 2017066813 | 4/2017 |
| WO | 2017089289 | 6/2017 |
| WO | 2017096256 | 6/2017 |
| WO | 2017121834 | 7/2017 |
| WO | 2018006965 | 1/2018 |
| WO | 2018011736 | 1/2018 |
| WO | 2018019742 | 2/2018 |
| WO | 2020022543 | 7/2018 |
| WO | 2018152593 A1 | 8/2018 |
| WO | 2018172976 | 9/2018 |
| WO | 2020060248 | 9/2018 |
| WO | 2018203203 | 11/2018 |
| WO | 2019009717 | 1/2019 |
| WO | 2019025138 | 2/2019 |
| WO | 2019040721 A2 | 2/2019 |
| WO | 2019046216 | 3/2019 |
| WO | 2019048521 A1 | 3/2019 |
| WO | 2019058752 | 3/2019 |
| WO | 2019071222 | 4/2019 |
| WO | 2019132803 | 7/2019 |
| WO | 2019207561 | 10/2019 |
| WO | 2019226100 A1 | 11/2019 |
| WO | 2019235942 | 12/2019 |
| WO | 2019245978 | 12/2019 |
| WO | 2020003310 | 1/2020 |
| WO | 2020096528 | 5/2020 |
| WO | 2020140013 | 7/2020 |

OTHER PUBLICATIONS

Steensels, Machteld; Maltz, Ephraim; Bahr, Claudia; Berckmans, Daniel; Antler, Aharon; et al., Towards practical application of sensors for monitoring animal health: The effect of post-calving health problems on rumination duration, activity and milk yield, The Journal of Dairy Research; Cambridge vol. 84, Iss. 2, (May 2017): 132-138.

Clark, C., Lyons, N., Millapan, L., Talukder, S., Cronin, G., Kerrisk, K., & Garcia, S. (2015), Rumination and activity levels as predictors of calving for dairy cows, Animal, 9(4), 691-695.

K. Koyama, T. Koyama, M. Sugimoto, N. Kusakari, R. Miura, K. Yoshioka, M. Hirako, Prediction of calving time in Holstein dairy cows by monitoring the ventral tail base surface temperature, The Veterinary Journal, vol. 240, 2018, pp. 1-5, ISSN 1090-0233.

L. Calamari, N. Soriani, G. Panella, F. Petrera, A. Minuti, E. Trevisi, Rumination time around calving: An early signal to detect cows at greater risk of disease, Journal of Dairy Science, vol. 97, Issue 6, 2014, pp. 3635-3647, ISSN 0022-0302.

S. Benaissa, F.A.M. Tuyttens, D. Plets, J. Trogh, L. Martens, L. Vandaele, W. Joseph, B. Sonck, Calving and estrus detection in dairy cattle using a combination of indoor localization and accelerometer sensors, Computers and Electronics in Agriculture, vol. 168, 2020, 105153, ISSN 0168-1699.

N. Soriani, E. Trevisi, L. Calamari, Relationships between rumination time, metabolic conditions, and health status in dairy cows during the transition period, Journal of Animal Science, vol. 90, Issue 12, Dec. 2012, pp. 4544-4554.

The role of sensors, big data and machine learning in modern animal farming; Suresh Neethirajan; Received Jun. 2, 2020; Received in revised form Jun. 30, 2020; Accepted Jul. 3, 2020 Sensing and Bio-Sensing Research 29 (2020) 100367 2214-1804/ © 2020 The Author. Published by Elsevier B.V.

A Review on Determination of Computer Aid Diagnosis and/or Risk Factors Using Data Mining Methods in Veterinary Field Pinar Cihan, Erhan Gökçe, Oya Kalipisiz; Tekirdağ Namik Kemal University, Çorlu Faculty of Engineering, Department of Computer Engineering, Tekirdağ, Turkey. 2019.

Big Data Analytics and Precision Animal Agriculture Symposium: Data to decisions B. J. White, D. E. Amrine, and R. L Larson Beef Cattle Institute, Kansas State University, Manhattan, KS; © The Author(s) 2018. Published by Oxford University Press on behalf of American Society of Animal Science.

Gasteiner, J.; Boswerger, B.; Guggenberger, T., Practical use of a novel ruminal sensor on dairy farms, Praktische Tierarzt 2012 vol. 93 No. 8 pp. 730 . . . 739 ref.45.

Drying up Cows and the Effect of Different Methods Upon Milk Production; Ralph Wayne, C. H. Eckles, and W. E. Peterson; Division of Dairy Husbandry, University of Minnesota, St. Paul; Research-Articlelvol. 16, Issue 1, p. 69-78, Jan. 1, 1933.

Eagan, B. H., B. Eagan, and A. Protopopova. "Behaviour Real-Time spatial tracking identification (BeRSTID) used for cat behaviour monitoring in an animal shelter." Scientific reports 12.1 (2022): 17585.

Garrido-Jurado, Sergio, et al. "Automatic generation and detection of highly reliable fiducial markers under occlusion." Pattern Recognition 47.6 (2014): 2280-2292.

Steve Nadis. "Invisible machine-readable labels that identify and track objects". Retrieved online on Sep. 3, 2023. URL: https://www.wevolver.com/article/invisible-machine-readable-labelsthat-identify-and-track-objects.

* cited by examiner

LIVESTOCK LOCATION SYSTEM

CROSS REFERENCE TO RELATED APPLICATIONS

This application is a Continuation-in-Part of PCT International Application Number PCT/IL2015/050273, filed on 15 Mar. 2015, which claims priority from U.S. Provisional Application No. 61/970,379, filed on 26 Mar. 2015. Both of the applications are hereby incorporated by reference in their entirety.

FIELD OF THE INVENTION

The present invention generally pertains to a system and method for locating and monitoring livestock.

BACKGROUND OF THE INVENTION

The present invention generally pertains to a system and method for locating and monitoring livestock.

Typically, cows are milked in a milking parlor, an isolated room or separate building to which cows kept on a loose-housing system are taken for milking. Milking parlors typically comprise an area into which the cows enter prior to milking, a number of cells or stalls in which the animals are retrained during milking, and an area into which the cows exit after milking.

A farmer will be interested in knowing whether milking cells are occupied, so that cells remain empty for as short a time as is feasible and milking is completed as quickly as possible, both to reduce the cows' discomfort prior to milking and to use the milking parlor the most efficiently. Furthermore, knowing that a cell has emptied enables farm personnel to clean milking machines associated with the cell more quickly, if needed, or to clean the cell itself.

Because of the need to know the milking status of cows and, increasingly, the desire to have products such as milk traceable to the cow that provided the product, there is a need for the farmer or stock keeper to know where each cow is as a function of time. Therefore, he will want to know the cell in which each cow was milked, which will enable him to link the amount of milk and the quality of the milk to the individual cow.

The prior art discloses systems in which there exist identification means on each cow and location means on each milking cell or other animal holding cell such as a stall or pen.

In prior-art systems, typically, matched identification means and location means are used. Typical examples include an RFID tag on the animal and an RFID reader in the cell, a coded IR emitting tag on the animal and an IR sensor in the cell, and a "dumb" tag on the animal and an optical reader in the cell, although there are many other such systems known in the art. In all of these systems, when a cow enters a cell, the location means (such as the RFID reader) in the cell reads the identification means (such as the RFID tag) on the animal, thereby identifying that a specific animal has entered a specific cell.

However, in prior-art systems, every time the layout of a milking parlor is changed, the location means must be changed to match the new layout. This will involve some combination of moving the location means, re-wiring the milking parlor, and, if the number of cells in increased, providing new location means. Care will need to be taken that the location means do not interfere with each other and that structures in the milking parlor do not interfere with the operation of the location means. For example, care would need to be taken to ensure that nothing blocked the line-of-sight between a "dumb" tag on the animal and an optical reader in the cell. Another major issue that needs to be taken into consideration is the costs for the construction and maintenance of the same.

In addition, care will need to be taken that any new location means which are provided are compatible with the rest of the system.

Thus, there is a long felt need for a system for locating a cow or other livestock animal which does not require a location means per milking cell.

Yet another required need is for a system for locating livestock animal (e.g., a cow) which does not require location means per yoke cells (or headlock) in a headlock system. In that manner, once the farmer known the exact location of each animal, he can provide the same with the dedicated treatment required.

Farmers also desire to track cows' movements in barns, pens or fields in order to determine the cows' status; unusual behavior can indicate unwellness in the animal and the sooner an unwell animal is identified and treated, the more likely it is that the animal will show good recovery and, in general, the smaller will be the cost of the treatment. Furthermore, the more quickly the animal is treated, the smaller is the likely effect on the animal's milk production. Unusual behavior can also indicate problems within a herd, such as two animals fighting or the presence of dangerous animals, such as dogs, too close to the cows.

Farmers also desire to move cows. For example, dairy cow farmers' livelihood depends on the milk produced by their dairy cows. A dairy cow is commonly milked twice to four times a day. Most cows enter the milking parlor at milking time of their own will. However, some cows tend to remain in their places, commonly recumbent and reluctant to get up and do not enter the milking parlor so that the farmer must approach each individual cow and drive the cow towards and into the milking parlor.

This activity consumes much effort and time and some farmers commonly refrain from actively retrieving such cows which results in the cow missing the round of milking. Over time, the cumulative effect of cows missing rounds of milking is expressed in a reduction in the overall dairy farm milk production and loss of income.

Existing automatic herd control systems manipulate (open and close) gates guiding walking cows into a desired location (e.g., milking stalls) and various functions such as washing cow's udders, preventing mounting or body elevation and driving cows out of a stall. However, currently, a solution for automatically retrieving reluctant dairy cows is not yet available on the market.

Therefore, there is a long-felt need for a system for monitoring and tracking herd animals' movements when the animals are kept on a loose-housing system and are in barns, pens or fields which is also capable of moving the cows from one location to another.

Furthermore, there is a long felt need for a system for monitoring and tracking herd animals for providing them with health treatment as well as for detection of estrus and insemination.

SUMMARY OF THE INVENTION

It is an object of the present invention to disclose a system for locating livestock.

It is one object of the present invention to disclose, in a headlock system having a plurality of n headlock cells, each of the n cells being adapted to enclose at least one animal; n is an integer greater than 1; a system for locating the position of at least one animal, the system comprising:

a. at least one identification means adapted to transmit at least one identification signal associated with said at least one animal;

b. at least one locating means adapted to generate at least one location signal associated with said at least one animal; and c. a data processing system in communication with said at least one identification means and said at least one locating means, adapted to analyze said signals, said analyzed signals comprising the position within a predetermined region in said headlock system of each of said at least one animals as a function of time.

It is another object of the present invention to disclose the system as defined above, wherein said position is at least one of said n cells.

It is another object of the present invention to disclose the system as defined above, wherein said data processing system is adapted to receive several of said location signals associated with the same animal.

It is another object of the present invention to disclose the system as defined above, wherein said data processing system is adapted to receive several of said location signals associated with different animals.

It is another object of the present invention to disclose the system as defined above, wherein said data processing system, based on said location signals and said identification signal, is adapted to provide the location of said animal within said headlock system.

It is another object of the present invention to disclose the system as defined above, wherein said data processing system, based on said location signals and said identification signal, is adapted to provide said n cell in which said animal is positioned within said headlock system.

It is another object of the present invention to disclose the system as defined above, wherein said data processing system averages said location signals and provides said n cell in which said animal is positioned within said headlock system.

It is another object of the present invention to disclose the system as defined above, wherein said data processing system integrates multiple reading from either said animal and\or at least one adjacent animal over TIME to make a reliable estimation of said n cells.

It is another object of the present invention to disclose the system as defined above, wherein said system identifies said position of said at least one animal without use of location means associated with each of said n cells.

It is another object of the present invention to disclose the system as defined above, wherein at least one said identification means is associated with each of said animals.

It is another object of the present invention to disclose the system as defined above, wherein said association between said identification means and said animal is by means of a mechanism selected from a group consisting of: a tag, a collar, being coupled to the nasal area of said animal, an implantable transponder, a bolus, a microchip, an RFID tag, and any combination thereof.

It is another object of the present invention to disclose the system as defined above, wherein said identification means is associated with said at least one animal by a means selected from a group consisting of: being worn on a collar, being coupled to the nasal area of said animal, collar, being worn on a body band, attached to said animal, implanted within said animal, held within said animal's digestive system, held within said animal's reproductive system, held within said animal's urinary system, and any combination thereof.

It is another object of the present invention to disclose the system as defined above, wherein movement of at least one said animal is trackable by means of said at least one identification means, said at least one locating means and said data processing system.

It is another object of the present invention to disclose the system as defined above, wherein said at least one locating means comprises at least one RF transmitter and at least one RF receiver.

It is another object of the present invention to disclose the system as defined above, wherein said at least one locating means comprises at least one ultra-wide-band (UWB) transmitter and at least one UWB receiver.

It is another object of the present invention to disclose the system as defined above, wherein said animals are milking animals.

It is another object of the present invention to disclose the system as defined above, wherein the type of animal is selected from a group consisting of cows, sheep, goats, horses, buffalo, bison, camels, donkeys, mules, swine, deer, elk, llamas, alpacas and any combination thereof.

It is another object of the present invention to disclose the system as defined above, wherein said at least one animal's position is selected from a group consisting of: the $n^{th}$ cell within said headlock system, xyz position within a predetermined region in said headlock system, xyz position relative to a fixed object, xyz position relative to at least one other said animal, change in xyz position within said predetermined region in said headlock system, change in xyz position relative to a fixed object, change in xyz position relative to at least one other said animal, speed of change in xyz position within said predetermined region in said headlock system, speed of change in xyz position relative to a fixed object, speed of change in xyz position relative to at least one other said animal, and any combination thereof.

It is another object of the present invention to disclose the system as defined above, wherein said system further comprises at least one mechanism for informing a user of at least one of a group consisting of: said at least one animal's position, change in said at least one animal's position, said animals position with respect to a fixed object, change in said animal's position with respect to a fixed object; said animal's position relative to a moving object; change in said animal's position relative to a moving object; how said animal walks, change in how said animal walks, how fast said animal walks, change in how fast said animal walks, behavior of said animal, change in behavior of said animal, behavior pattern of said animal, change in behavior pattern of said animal, and any combination thereof.

It is another object of the present invention to disclose the system as defined above, wherein, based upon the location of said animal, an automatic entrance into and out of at least one of said n headlock cell is provided.

It is another object of the present invention to disclose the system as defined above, wherein said behavior of said animal is selected from a group of behaviors consisting of: fraction of time spent walking, change in fraction of time spent walking, fraction of time spent running, change in fraction of time spent running, limping, fraction of time spent lying down, change in fraction of time spent lying down, fraction of time spent standing, change in fraction of time spent standing, fraction of time spent eating, change in fraction of time spent eating, fraction of time spent drinking, change in fraction of time spent drinking, fraction of time spent at least one predetermined distance range from at least one other animal, change in fraction of time spent at least one predetermined distance range from at least one other animal, fraction of time spent in at least one predetermined position relative to at least one fixed object, change in fraction of time spent in at least one predetermined position relative to at least one fixed object, and any combination thereof.

It is another object of the present invention to disclose the system as defined above, wherein the behavior of said animal is identified as abnormal if at least one of said times changes by at least a predetermined amount.

It is another object of the present invention to disclose the system as defined above, wherein the behavior of said animal is identified as abnormal if at least one of said changes in times is greater than a predetermined amount.

It is another object of the present invention to disclose the system as defined above, additionally comprising at least one mechanism for informing said of the location of said animal with respect to the location of said user, thereby enabling said user to approach said animal.

It is another object of the present invention to disclose the system as defined above, wherein said at least one mechanism for informing said user is selected from a group consisting of: a display within said system, a display in the vicinity of said system, a display in the vicinity of said locating means, a remote display, a display on a personally carryable device, and any combination thereof.

It is another object of the present invention to disclose the system as defined above, wherein said personally carryable device is selected from a group consisting of a cellphone, a Bluetooth device, an earphone, a communication device attachable to the arm, a communication device attachable to the waist, a communication device attachable to a belt, a communication device attachable to a head, a communication device worn around the neck, a communication device worn on the hand, Google Glasses, a helmet comprising a communication device, a heads-up display, an EyeTap, a Golden-i, a virtual retinal display, a GlassUp, an iOptik, a beeper, a handheld computer, a personal digital assistant, a smartphone, and any combination thereof.

It is another object of the present invention to disclose the system as defined above, wherein said display is selected from a member of a group consisting of: an e-mail, a text message, an image, an audible message, and any combination thereof.

It is another object of the present invention to disclose the system as defined above, additionally comprising means to communicate with a user at least one member of a group consisting of: identity of said animal, location of said animal, location of said animal as a function of time, location of said animal relative to said user, health status of said animal, behavioral status of said animal, estrus status of said animal, treatment required to provide said animal and any combination thereof.

It is another object of the present invention to disclose the system as defined above, wherein said health status is selected from a group consisting of: animal currently in normal condition, animal's condition currently not normal.

It is another object of the present invention to disclose the system as defined above, wherein said animal's condition is currently not normal for a reason selected from a group consisting of: abnormal temperature in said quarter of said udder, said quarter of said udder is inflamed, said quarter of said udder is abnormally swollen, said animal is lame, identity of lame limb, abnormal temperature of said animal, weight of said animal has changed by more than a predetermined amount, animal is in estrus, amount of head-shaking of said animal has changed by more than a predetermined amount, and any combination thereof.

It is another object of the present invention to disclose the system as defined above, wherein said means to communicate with said user is selected from a group consisting of: said display, a paper record.

It is another object of the present invention to disclose the system as defined above, additionally comprising an indicator mechanism such that said user can be notified that intervention is needed for at least one said animal.

It is another object of the present invention to disclose the system as defined above, wherein said indicator is selected from a member of a group consisting of a visual indicator, an audible indicator, a tactile indicator, and any combination thereof.

It is another object of the present invention to disclose the system as defined above, wherein said audible indicator is selected from a group consisting of a constant-pitch sound, a constant-loudness sound, a varying-pitch sound, a varying-loudness sound, a sound of a predetermined pattern, and any combination thereof.

It is another object of the present invention to disclose the system as defined above, wherein said audible indicator is changeable depending on the reason for the intervention.

It is another object of the present invention to disclose the system as defined above, wherein said audible indicator is changeable as the distance between said animal and a user changes.

It is another object of the present invention to disclose the system as defined above, wherein said change in said audible indicator is selected from a group consisting of: said loudness of said audible indicator changes, said pitch of said audible indicator changes, the rapidity of change of said loudness changes, the rapidity of change of said pitch changes, the predetermined sound pattern changes and any combination thereof.

It is another object of the present invention to disclose the system as defined above, wherein said visual indicator is selected from a group consisting of light of a constant, predetermined color, a light with color varying in a predetermined manner, a light varying in brightness, light of a predetermined pattern and any combination thereof.

It is another object of the present invention to disclose the system as defined above, wherein said visual indicator is changeable depending on the reason for the intervention.

It is another object of the present invention to disclose the system as defined above, wherein said visual indicator is changeable as the distance between said animal and a user changes.

It is another object of the present invention to disclose the system as defined above, wherein said change in visual indicator is selected from a group consisting of: change in brightness of the indicator, change in color of the indicator, change in rapidity of brightness change, change in rapidity of color change, change in predetermined color pattern and any combination thereof.

It is one object of the present invention to disclose, in a milking parlor having a plurality of n milking cells, each of the n cells being adapted to enclose at least one animal; n is an integer greater than 1; a system for locating the position of at least one animal, the system comprising:

a. at least one identification means adapted to transmit at least one identification signal associated with said at least one animal;

b. at least one locating means adapted to generate at least one location signal associated with said at least one animal; and c. a data processing system in communication with said at least one identification means and said at least one locating means, adapted to analyze said signals, said analyzed signals comprising the position within a predetermined region in said milking parlor of each of said at least one animals as a function of time.

It is another object of the present invention to disclose the system as defined above, wherein said position is at least one of said n milking cells.

It is another object of the present invention to disclose the system as defined above, wherein said data processing system is adapted to receive several of said location signals associated with the same animal.

It is another object of the present invention to disclose the system as defined above, wherein said data processing system is adapted to receive several of said location signals associated with different animals.

It is another object of the present invention to disclose the system as defined above, wherein said data processing system, based on said location signals and said identification signal, is adapted to provide the location of said animal within said system.

It is another object of the present invention to disclose the system as defined above, wherein said data processing system, based on said location signals and said identification signal, is adapted to provide said n cell in which said animal is positioned within said system.

It is another object of the present invention to disclose the system as defined above, wherein said data processing system averages said location signals and provides said n cell in which said animal is positioned within said system.

It is another object of the present invention to disclose the system as defined above, wherein said data processing system integrates multiple reading from either said animal and\or at least one adjacent animal over TIME to make a reliable estimation of said n cells.

It is another object of the present invention to disclose the system as defined above, wherein said system identifies said position of said at least one animal without use of location means associated with each of said n milking cells.

It is another object of the present invention to disclose the system as defined above, wherein at least one said identification means is associated with each of said animals.

It is another object of the present invention to disclose the system as defined above, wherein said association between said identification means and said animal is by means of a mechanism selected from a group consisting of a tag, a collar, being coupled to the nasal area of said animal, an implantable transponder, a bolus, a microchip, an RFID tag, and any combination thereof.

It is another object of the present invention to disclose the system as defined above, wherein said identification means is associated with said at least one animal by a means selected from a group consisting of: being worn on a collar, being worn on a body band, being coupled to the nasal area of said animal, attached to said animal, implanted within said animal, held within said animal's digestive system, held within said animal's reproductive system, held within said animal's urinary system, and any combination thereof.

It is another object of the present invention to disclose the system as defined above, wherein movement of at least one said animal is trackable by means of said at least one identification means, said at least one locating means and said data processing system.

It is another object of the present invention to disclose the system as defined above, wherein said at least one locating means comprises at least one RF transmitter and at least one RF receiver.

It is another object of the present invention to disclose the system as defined above, wherein said at least one locating means comprises at least one ultra-wide-band (UWB) transmitter and at least one UWB receiver.

It is another object of the present invention to disclose the system as defined above, wherein said animals are milking animals.

It is another object of the present invention to disclose the system as defined above, wherein the type of animal is selected from a group consisting of cows, sheep, goats, horses, buffalo, bison, camels, donkeys, mules, swine, deer, elk, llamas, alpacas and any combination thereof.

It is another object of the present invention to disclose the system as defined above, wherein said system further comprises sensors.

It is another object of the present invention to disclose the system as defined above, wherein said sensors are located in a position selected from a group consisting of: on the milking robot, on the milking stall, on a cattle stall, and any combination thereof.

It is another object of the present invention to disclose the system as defined above, wherein said sensors are selected from a group consisting of: heat sensors, pressure sensors, temperature sensors, flow sensors, fat sensors, protein sensors, light sensors, and any combination thereof.

It is another object of the present invention to disclose the system as defined above, wherein said sensors measure body temperature of said animal, temperature of a quarter of said animal, flow rate of milk, fat content of said milk, opacity of said milk, protein content of said milk, weight of said animal, milk's temperature, and any combination thereof.

It is another object of the present invention to disclose the system as defined above, wherein, for each individual animal, at least one member of a group consisting of the following is determined: quantity of the milk, quality of the milk and any combination thereof.

It is another object of the present invention to disclose the system as defined above, wherein milking is stopped at such time as there has occurred at least one condition selected from a group consisting of: said animal has yielded a quantity of said milk substantially equal to the average quantity from previous milkings, the flow of said milk has substantially decreased.

It is another object of the present invention to disclose the system as defined above, wherein said milk quality is determinable from light transmission through said milk, specific gravity of said milk, amount of sugar in said milk, amount of fat in said milk, amount of protein in said milk, and any combination thereof.

It is another object of the present invention to disclose the system as defined above, wherein at least one of a group consisting of: said quality of said milk, said quantity of said milk, said quality of said milk as a function of time, said quantity of said milk as a function of time, changes in said quality of said milk, changes in said quantity of said milk, changes in said quality of said milk as a function of time, changes in said quantity of said milk as a function of time, and any combination thereof is storable in said processor.

It is another object of the present invention to disclose the system as defined above, wherein said at least one animal's position is selected from a group consisting of: the $n^{th}$ cell within said system, xyz position within a predetermined region in said milking parlor, xyz position relative to a fixed object, xyz position relative to at least one other said animal, change in xyz position within said predetermined region in said milking parlor, change in xyz position relative to a fixed object, change in xyz position relative to at least one other said animal, speed of change in xyz position within said predetermined region in said milking parlor, speed of change in xyz position relative to a fixed object, speed of change in xyz position relative to at least one other said animal, and any combination thereof.

It is another object of the present invention to disclose the system as defined above, wherein said system further comprises at least one mechanism for informing a user of at least one of a group consisting of: said at least one animal's position, change in said at least one animal's position, said animal's position with respect to a fixed object, change in said animal's position with respect to a fixed object; said animal's position relative to a moving object; change in said animal's position relative to a moving object; how said animal walks, change in how said animal walks, how fast said animal walks, change in how fast said animal walks, behavior of said animal, change in behavior of said animal, behavior pattern of said animal, change in behavior pattern of said animal, quantity of milk from said animal, quality of milk from said animal and any combination thereof.

It is another object of the present invention to disclose the system as defined above, wherein, based upon the location of said animal, an automatic entrance into and out of said milking parlor is provided.

It is another object of the present invention to disclose the system as defined above, wherein, once a predetermined quantity of said milk is milked from said animal or after a predetermined amount of time, an automatic release of said animal from said milking parlor is provided.

It is another object of the present invention to disclose the system as defined above, wherein said behavior of said animal is selected from a group of behaviors consisting of: fraction of time spent walking, change in fraction of time spent walking, fraction of time spent running, change in fraction of time spent running, limping, fraction of time spent lying down, change in fraction of time spent lying down, fraction of time spent standing, change in fraction of time spent standing, fraction of time spent eating, change in fraction of time spent eating, fraction of time spent drinking, change in fraction of time spent drinking, fraction of time spent at least one predetermined distance range from at least one other animal, change in fraction of time spent at least one predetermined distance range from at least one other animal, fraction of time spent in at least one predetermined position relative to at least one fixed object, change in fraction of time spent in at least one predetermined position relative to at least one fixed object, and any combination thereof.

It is another object of the present invention to disclose the system as defined above, wherein the behavior of said animal is identified as abnormal if at least one of said times changes by at least a predetermined amount.

It is another object of the present invention to disclose the system as defined above, wherein the behavior of said animal is identified as abnormal if at least one of said changes in times is greater than a predetermined amount.

It is another object of the present invention to disclose the system as defined above, wherein said behavior pattern of said animal is determinable from said behavior of said animal, from said temperature of said animal, from said temperature of said quarter of said animal, and any combination thereof.

It is another object of the present invention to disclose the system as defined above, wherein said behavior pattern of said animal is selected from a group consisting of: animal behaves normally, animal in estrus, animal acts lame, animal acts listless, animal acts restless, and any combination thereof.

It is another object of the present invention to disclose the system as defined above, wherein at least one said mechanism for informing said user informs said user of the location of said animal with respect to the location of said user, thereby enabling said user to approach said animal.

It is another object of the present invention to disclose the system as defined above, wherein said at least one mechanism for informing said user is selected from a group consisting of: a display within said milking parlor, a display in the vicinity of said milking parlor, a display in the vicinity of said locating means, a remote display, a display on a personally carryable device, and any combination thereof.

It is another object of the present invention to disclose the system as defined above, wherein said personally carryable device is selected from a group consisting of a cellphone, a Bluetooth device, an earphone, a communication device attachable to the arm, a communication device attachable to the waist, a communication device attachable to a belt, a communication device attachable to a head, a communication device worn around the neck, a communication device worn on the hand, Google Glasses, a helmet comprising a communication device, a heads-up display, an EyeTap, a Golden-i, a virtual retinal display, a GlassUp, an iOptik, a beeper, a handheld computer, a personal digital assistant, a smartphone, and any combination thereof.

It is another object of the present invention to disclose the system as defined above, wherein said display is selected from a member of a group consisting of: an e-mail, a text message, an image, an audible message, and any combination thereof.

It is another object of the present invention to disclose the system as defined above, wherein, after completion of milking, release of an individual animal from its milking stall occurs in a manner selected from a group consisting of: milking of said individual animal is complete; milking of all animals in a predetermined group is complete, treatment of said individual animal is complete, treatment of all animals needing treatment is complete and any combination thereof.

It is another object of the present invention to disclose the system as defined above, wherein, for each said at least one animal, said system determines a member of a group consisting of: that said individual animal has entered said milking parlor, that said individual animal has entered a milking stall, the stall in which said individual animal is milked, that said individual animal has left the milking stall, that said individual animal has left said milking parlor, and any combination thereof.

It is another object of the present invention to disclose the system as defined above, wherein, for each said at least one animal, said system determines a member of a group consisting of: the time said individual animal enters said milking parlor, the time said individual animal enters said milking stall, the time said individual animal leaves said milking stall, the time said individual animal leaves said milking parlor, the amount of time said individual animal is in said milking parlor, the amount of time said individual animal is in said milking stall, the amount of milk given by said individual animal, the number of animals in said milking parlor at any time, the location of said individual animal at any given time, the relative locations of at least two said animals, the distance between said individual animal and at least one other animal, the average distance between said individual animal and a predetermined group of animals, the average distance between two animals in said predetermined group of animals, and any combination thereof.

It is another object of the present invention to disclose the system as defined above, additionally comprising means to communicate with a user at least one member of a group consisting of: identity of said animal, location of said animal, location of said animal as a function of time, location of said animal relative to said user, health status of said animal, behavioral status of said animal, and any combination thereof.

It is another object of the present invention to disclose the system as defined above, wherein said health status is selected from a group consisting of: animal currently in normal condition, animal's condition currently not normal.

It is another object of the present invention to disclose the system as defined above, wherein said animal's condition is currently not normal for a reason selected from a group consisting of: abnormal temperature in said quarter of said udder, said quarter of said udder is inflamed, said quarter of said udder is abnormally swollen, said animal is lame, identity of lame limb, abnormal temperature of said animal, weight of said animal has changed by more than a predetermined amount, animal is in estrus, amount of head-shaking of said animal has changed by more than a predetermined amount, and any combination thereof.

It is another object of the present invention to disclose the system as defined above, wherein said means to communicate with said user is selected from a group consisting of: said display, a paper record.

It is another object of the present invention to disclose the system as defined above, additionally comprising an indicator mechanism such that said user can be notified that intervention is needed for at least one said animal.

It is another object of the present invention to disclose the system as defined above, wherein said intervention is needed for a reason selected from a group consisting of: animal's condition is currently not normal, milking completed, animal fighting, and any combination thereof.

It is another object of the present invention to disclose the system as defined above, wherein said indicator is selected from a member of a group consisting of a visual indicator, an audible indicator, a tactile indicator, and any combination thereof.

It is another object of the present invention to disclose the system as defined above, wherein said audible indicator is selected from a group consisting of a constant-pitch sound, a constant-loudness sound, a varying-pitch sound, a varying-loudness sound, a sound of a predetermined pattern, and any combination thereof.

It is another object of the present invention to disclose the system as defined above, wherein said audible indicator is changeable depending on the reason for the intervention.

It is another object of the present invention to disclose the system as defined above, wherein said audible indicator is changeable as the distance between said animal and a user changes.

It is another object of the present invention to disclose the system as defined above, wherein said change in said audible indicator is selected from a group consisting of: said loudness of said audible indicator changes, said pitch of said audible indicator changes, the rapidity of change of said loudness changes, the rapidity of change of said pitch changes, the predetermined sound pattern changes and any combination thereof.

It is another object of the present invention to disclose the system as defined above, wherein said visual indicator is selected from a group consisting of light of a constant, predetermined color, a light with color varying in a predetermined manner, a light varying in brightness, light of a predetermined pattern and any combination thereof.

It is another object of the present invention to disclose the system as defined above, wherein said visual indicator is changeable depending on the reason for the intervention.

It is another object of the present invention to disclose the system as defined above, wherein said visual indicator is changeable as the distance between said animal and a user changes.

It is another object of the present invention to disclose the system as defined above, wherein said change in visual indicator is selected from a group consisting of: change in brightness of the indicator, change in color of the indicator, change in rapidity of brightness change, change in rapidity of color change, change in predetermined color pattern and any combination thereof.

It is another object of the present invention to disclose the system as defined above, wherein said system is adapted to discontinue milking when the amount of milk removed from said cow is substantially equal to a predetermined amount.

It is another object of the present invention to disclose the system as defined above, wherein said predetermined amount is equal to the average of the amounts of milk produced by said animal during a plurality of milking sessions.

It is another object of the present invention to disclose a system for locating the position of at least one said animal within a predetermined region of space, said system comprising a. at least one identification means adapted to transmit at least one identification signal associated with said at least one animal;

b. at least one locating means adapted to generate at least one location signal associated with said at least one animal; and, c. a data processing system in communication with said at least one identification means and said at least one locating means, adapted to analyze said signals, said analyzed signals comprising the position within said predetermined region of space of each said at least one animal as a function of time.

It is another object of the present invention to disclose the system as defined above, wherein said region of space is selected from a group consisting of: a milking parlor, headlock system, a barn, a shed, a field, and any combination thereof.

It is another object of the present invention to disclose the system as defined above, wherein said position is at least one of n milking cells within said milking parlor, or n headlock cell within said headlock system, n is an integer greater than one.

It is another object of the present invention to disclose the system as defined above, wherein said system identifies said position of said at least one animal without use of location means associated with each of said n milking cells or n headlock cell.

It is another object of the present invention to disclose the system as defined above, wherein said data processing system is adapted to receive several of said location signals associated with the same animal.

It is another object of the present invention to disclose the system as defined above, wherein said data processing system is adapted to receive several of said location signals associated with different animals.

It is another object of the present invention to disclose the system as defined above, wherein said data processing system, based on said location signals and said identification signal, is adapted to provide the location of said animal within said system.

It is another object of the present invention to disclose the system as defined above, wherein said data processing system, based on said location signals and said identification signal, is adapted to provide said n cell in which said animal is positioned within said system.

It is another object of the present invention to disclose the system as defined above, wherein said data processing system averages said location signals and provides said n cell in which said animal is positioned within said system.

It is another object of the present invention to disclose the system as defined above, wherein said data processing system integrates multiple reading from either said animal and\or at least one adjacent animal over TIME to make a reliable estimation of said n cells.

It is another object of the present invention to disclose the system as defined above, wherein at least one said identification means is associated with each of said animals.

It is another object of the present invention to disclose the system as defined above, wherein said association between said identification means and said animal is by means of a mechanism selected from a group consisting of a tag, a collar, being coupled to the nasal area of said animal, an implantable transponder, a bolus, a microchip, an RFID tag, and any combination thereof.

It is another object of the present invention to disclose the system as defined above, wherein said identification means is associated with said at least one animal by a means selected from a group consisting of: being worn on a collar, being coupled to the nasal area of said animal, being worn on a body band, attached to said animal, implanted within said animal, held within said animal's digestive system, held within said animal's reproductive system, held within said animal's urinary system, and any combination thereof.

It is another object of the present invention to disclose the system as defined above, wherein movement of at least one said animal is trackable.

It is another object of the present invention to disclose the system as defined above, wherein said at least one locating means comprises at least one RF transmitter and at least one RF receiver.

It is another object of the present invention to disclose the system as defined above, wherein said at least one locating means comprises at least one ultra-wide-band (UWB) transmitter and at least one UWB receiver.

It is another object of the present invention to disclose the system as defined above, wherein said animals are milking animals.

It is another object of the present invention to disclose the system as defined above, wherein the type of animal is selected from a group consisting of cows, sheep, goats, horses, buffalo, bison, camels, donkeys, mules, swine, deer, elk, llamas, alpacas and any combination thereof.

It is another object of the present invention to disclose the system as defined above, wherein said system further comprises sensors.

It is another object of the present invention to disclose the system as defined above, wherein said sensors are located in a position selected from a group consisting of: on a milking robot, on a milking stall, on a cattle stall, and any combination thereof.

It is another object of the present invention to disclose the system as defined above, wherein said sensors are selected from a group consisting of: heat sensors, pressure sensors, temperature sensors, flow sensors, fat sensors, protein sensors, light sensors, and any combination thereof.

It is another object of the present invention to disclose the system as defined above, wherein said sensors measure body temperature of said animal, temperature of a quarter of said animal, flow rate of milk, fat content of said milk, opacity of said milk, protein content of said milk, weight of said animal, milk's temperature and any combination thereof.

It is another object of the present invention to disclose the system as defined above, wherein, for each individual animal, at least one member of a group consisting of the following is determined: quantity of the milk, quality of the milk and any combination thereof.

It is another object of the present invention to disclose the system as defined above, wherein milking is stopped at such time as there has occurred at least one condition selected from a group consisting of: said animal has yielded a quantity of said milk substantially equal to the average quantity from previous milkings, the flow of said milk has substantially decreased.

It is another object of the present invention to disclose the system as defined above, wherein said milk quality is determinable from light transmission through said milk, specific gravity of said milk, amount of sugar in said milk, amount of fat in said milk, amount of protein in said milk, and any combination thereof.

It is another object of the present invention to disclose the system as defined above, wherein at least one of a group consisting of: said quality of said milk, said quantity of said milk, said quality of said milk as a function of time, said quantity of said milk as a function of time, changes in said quality of said milk, changes in said quantity of said milk, changes in said quality of said milk as a function of time, changes in said quantity of said milk as a function of time, and any combination thereof is storable in said data processor.

It is another object of the present invention to disclose the system as defined above, wherein said at least one animal's position is selected from a group consisting of: the $n^{th}$ cell within said system, xyz position within said predetermined region of space, xyz position relative to a fixed object, xyz position relative to at least one other said animal, change in xyz position within said predetermined region of space, change in xyz position relative to a fixed object, change in xyz position relative to at least one other said animal, speed of change in xyz position within said predetermined region of space, speed of change in xyz position relative to a fixed object, speed of change in xyz position relative to at least one other said animal, and any combination thereof.

It is another object of the present invention to disclose the system as defined above, wherein said system further comprises a mechanism for informing a user of at least one of a group consisting of: said at least one animal's position, change in said at least one animal's position, said animal's position with respect to a fixed object, change in said animal's position with respect to a fixed object: said animal's position relative to a moving object; change in said animal's position relative to a moving object; how said animal walks, change in how said animal walks, how fast said animal walks, change in how fast said animal walks, behavior of said animal, change in behavior of said animal, behavior pattern of said animal, change in behavior pattern of said animal, and any combination thereof.

It is another object of the present invention to disclose the system as defined above, wherein said behavior of said animal is selected from a group of behaviors consisting of: fraction of time spent walking, change in fraction of time spent walking, fraction of time spent running, change in fraction of time spent running, limping, fraction of time spent lying down, change in fraction of time spent lying down, fraction of time spent standing, change in fraction of time spent standing, fraction of time spent eating, change in fraction of time spent eating, fraction of time spent drinking, change in fraction of time spent drinking, fraction of time spent at least one predetermined distance range from at least one other animal, change in fraction of time spent at least one predetermined distance range from at least one other animal, fraction of time spent in at least one predetermined position relative to at least one fixed object, change in fraction of time spent in at least one predetermined position relative to at least one fixed object, and any combination thereof.

It is another object of the present invention to disclose the system as defined above, wherein the behavior of said animal is identified as abnormal if at least one of said times changes by at least a predetermined amount.

It is another object of the present invention to disclose the system as defined above, wherein the behavior of said animal is identified as abnormal if at least one of said changes in time is greater than a predetermined amount.

It is another object of the present invention to disclose the system as defined above, wherein said behavior pattern of said animal is determinable from said behavior of said animal, from said temperature of said animal, from said temperature of said quarter of said animal, and any combination thereof.

It is another object of the present invention to disclose the system as defined above, wherein said behavior pattern of said animal is selected from a group consisting of: animal behaves normally, animal in estrus, animal acts lame, animal acts listless, animal acts restless, and any combination thereof.

It is another object of the present invention to disclose the system as defined above, wherein said mechanism for informing said user informs said user of the location of said animal with respect to the location of said user, thereby enabling said user to approach said animal.

It is another object of the present invention to disclose the system as defined above, wherein said mechanism for informing said user is selected from a group consisting of: a display in the vicinity of said predetermined space, a display in the vicinity of said locating means, a remote display, a display on a personally carryable device, and any combination thereof.

It is another object of the present invention to disclose the system as defined above, wherein said personally carryable device is selected from a group consisting of a cellphone, a Bluetooth device, an earphone, a communication device attachable to the arm, a communication device attachable to the waist, a communication device attachable to a belt, a communication device attachable to a head, a communication device worn around the neck, a communication device worn on the hand, Google Glasses, a helmet comprising a communication device, a heads-up display, an EyeTap, a Golden-i, a virtual retinal display, a GlassUp, an iOptik, a beeper, a handheld computer, a personal digital assistant, a smartphone, and any combination thereof.

It is another object of the present invention to disclose the system as defined above, wherein said display is selected from a member of a group consisting of: an e-mail, a text message, an image, an audible message, and any combination thereof.

It is another object of the present invention to disclose the system as defined above, wherein, after completion of milking, release of an individual animal from its milking stall occurs in a manner selected from a group consisting of: milking of said individual animal is complete; milking of all animals in a predetermined group is complete, treatment of said individual animal is complete, treatment of all animals needing treatment is complete and any combination thereof.

It is another object of the present invention to disclose the system as defined above, wherein, for each said at least one animal, said system determines a member of a group consisting of: that said individual animal has entered said milking parlor, that said individual animal has entered a milking stall, the stall in which said individual animal is milked, that said individual animal has left the milking stall, that said individual animal has left said milking parlor, and any combination thereof.

It is another object of the present invention to disclose the system as defined above, wherein, for each said at least one animal, said system determines a member of a group consisting of: the location of said individual animal at any given time, the relative locations of at least two said animals, the distance between said individual animal and at least one other animal, the average distance between said individual animal and a predetermined group of animals, the average distance between two animals in said predetermined group of animals, and any combination thereof.

It is another object of the present invention to disclose the system as defined above, wherein, for each said at least one animal, said system determines a member of a group consisting of: the time said individual animal enters said milking parlor, the time said individual animal enters said milking stall, the time said individual animal leaves said milking stall, the time said individual animal leaves said milking parlor, the amount of time said individual animal is in the parlor, the amount of time said individual animal is in said milking stall, the amount of milk given by said individual animal, the number of animals in said milking parlor at any time, and any combination thereof.

It is another object of the present invention to disclose the system as defined above, additionally comprising means to communicate with a user at least one member of a group consisting of: identity of said animal, location of said animal, location of said animal as a function of time, location of said animal relative to said user, health status of said animal, behavioral status of said animal, and any combination thereof.

It is another object of the present invention to disclose the system as defined above, wherein said health status is selected from a group consisting of: animal currently in normal condition, animals condition currently not normal.

It is another object of the present invention to disclose the system as defined above, wherein said animal's condition is currently not normal for a reason selected from a group consisting of: abnormal temperature in said quarter of said udder, said quarter of said udder is inflamed, said quarter of said udder is abnormally swollen, said animal is lame, identity of lame limb, abnormal temperature of said animal, weight of said animal has changed by more than a predetermined amount, animal is in estrus, amount of head-shaking of said animal has changed by more than a predetermined amount, and any combination thereof.

It is another object of the present invention to disclose the system as defined above, wherein said means to communicate with said user is selected from a group consisting of: said display, a paper record.

It is another object of the present invention to disclose the system as defined above, additionally comprising an indicator mechanism such that said user can be notified that intervention is needed for at least one said animal.

It is another object of the present invention to disclose the system as defined above, wherein said intervention is needed for a reason selected from a group consisting of: animal's condition is currently not normal, milking completed, animal fighting, and any combination thereof.

It is another object of the present invention to disclose the system as defined above, wherein said indicator is selected from a member of a group consisting of a visual indicator, an audible indicator, a tactile indicator, and any combination thereof.

It is another object of the present invention to disclose the system as defined above, wherein said audible indicator is selected from a group consisting of a constant-pitch sound, a constant-loudness sound, a varying-pitch sound, a varying-loudness sound, a sound of a predetermined pattern, and any combination thereof.

It is another object of the present invention to disclose the system as defined above, wherein said audible indicator is changeable depending on the reason for the intervention.

It is another object of the present invention to disclose the system as defined above, wherein said audible indicator is changeable as the distance between said animal and a user changes.

It is another object of the present invention to disclose the system as defined above, wherein said change in said audible indicator is selected from a group consisting of: said loudness of said audible indicator changes, said pitch of said audible indicator changes, the rapidity of change of said loudness changes, the rapidity of change of said pitch changes, the predetermined sound pattern changes and any combination thereof.

It is another object of the present invention to disclose the system as defined above, wherein said visual indicator is selected from a group consisting of light of a constant, predetermined color, a light with color varying in a predetermined manner, a light varying in brightness, light of a predetermined pattern and any combination thereof.

It is another object of the present invention to disclose the system as defined above, wherein said visual indicator is changeable depending on the reason for the intervention.

It is another object of the present invention to disclose the system as defined above, wherein said visual indicator is changeable as the distance between said animal and a user changes.

It is another object of the present invention to disclose the system as defined above, wherein said change in visual indicator is selected from a group consisting of: change in brightness of the indicator, change in color of the indicator, change in rapidity of brightness change, change in rapidity of color change, change in predetermined color pattern, and any combination thereof.

It is another object of the present invention to disclose the system as defined above, wherein said system is adapted to discontinue milking when the amount of milk removed from said cow is substantially equal to a predetermined amount.

It is another object of the present invention to disclose the system as defined above, wherein said predetermined amount is equal to the average of the amounts of milk produced by said animal during a plurality of milking sessions.

It is another object of the present invention to disclose a method for locating the position of at least one animal in a headlock system having a plurality of n headlock cells, each of which cells adapted to enclose at least one animal; n is an integer greater than 1; said method comprising steps of:

(a) providing a system for locating the position of at least one said animal, said system comprising: (i) at least one identification means adapted to transmit at least one identification signal associated with said at least one animal; at least one locating means adapted to generate at least one location signal associated with said at least one animal; and, (iii) a data processing system in communication with said at least one identification means and said at least one locating means, adapted to analyze said signals, said analyzed signals comprising the position within a predetermined region in said system of each of said at least one animal as a function of time;

(b) transmitting said at least one identification signal;

(c) generating said at least one location signal; and, (d) analyzing said at least one identification signal and said at least one location signal; thereby determining the position within a predetermined region in said system of each said at least one animal as a function of time.

It is another object of the present invention to disclose the method as defined above, wherein said position is at least one of said n cells.

It is another object of the present invention to disclose the method as defined above, wherein said data processing system is adapted to receive several of said location signals associated with the same animal.

It is another object of the present invention to disclose the method as defined above, wherein said data processing system is adapted to receive several of said location signals associated with different animals.

It is another object of the present invention to disclose the method as defined above, wherein said data processing system, based on said location signals and said identification signal, is adapted to provide the location of said animal within said yokes (headlock) system.

It is another object of the present invention to disclose the method as defined above, wherein said data processing system, based on said location signals and said identification signal, is adapted to provide said n cell in which said animal is positioned within said yokes (headlock) system.

It is another object of the present invention to disclose the method as defined above, wherein said data processing system averages said location signals and provides said n cell in which said animal is positioned within said yokes (headlock) system.

It is another object of the present invention to disclose the method as defined above, wherein said data processing system integrates multiple reading from either said animal and\or at least one adjacent animal over TIME to make a reliable estimation of said n cells.

It is another object of the present invention to disclose a method for locating the position of at least one animal in a milking parlor having a plurality of n milking cells, each of said cells adapted to enclose at least one animal; n is an integer greater than 1; said method comprising steps of:

a. providing a system for locating the position of at least one said animal, said system comprising i. at least one identification means adapted to transmit at least one identification signal associated with said at least one animal;
ii. at least one locating means adapted to generate at least one location signal associated with said at least one animal; and,
iii. a data processing system in communication with said at least one identification means and said at least one locating means, adapted to analyze said signals, said analyzed signals comprising the position within a predetermined region in said milking parlor of each of said at least one animals as a function of time;
b. transmitting said at least one identification signal;
c. generating said at least one location signal; and
d. analyzing said at least one identification signal and said at least one location signal,
thereby determining the position within a predetermined region of said milking parlor of each said at least one animal as a function of time.

It is another object of the present invention to disclose the method as defined above, wherein said position is at least one of said n milking cells.

It is another object of the present invention to disclose the method as defined above, wherein said data processing system is adapted to receive several of said location signals associated with the same animal.

It is another object of the present invention to disclose the method as defined above, wherein said data processing system is adapted to receive several of said location signals associated with different animals.

It is another object of the present invention to disclose the method as defined above, wherein said data processing system, based on said location signals and said identification signal, is adapted to provide the location of said animal within said system.

It is another object of the present invention to disclose the method as defined above, wherein said data processing system, based on said location signals and said identification signal, is adapted to provide said n cell in which said animal is positioned within said system.

It is another object of the present invention to disclose the method as defined above, wherein said data processing system, based on said location signals and said identification signal, is adapted to provide said n cell in which said animal is positioned within said system.

It is another object of the present invention to disclose the method as defined above, wherein said data processing system averages said location signals and provides said n cell in which said animal is positioned within said system.

It is another object of the present invention to disclose the method as defined above, wherein said data processing system integrates multiple reading from either said animal and\or at least one adjacent animal over TIME to make a reliable estimation of said n cells.

It is another object of the present invention to disclose the method as defined above, additionally comprising a step of identifying said position of said at least one animal without use of location means associated with each of said n milking cells.

It is another object of the present invention to disclose the method as defined above, additionally comprising a step of associating at least one said transmitter with each said animal.

It is another object of the present invention to disclose the method as defined above, additionally comprising a step of providing said association between said transmitter and said animal by means of a mechanism selected from a group consisting of a tag, a collar, being coupled to the nasal area of said animal, an implantable transponder, a bolus, a microchip, an RFID tag, and any combination thereof.

It is another object of the present invention to disclose the method as defined above, additionally comprising a step of associating said mechanism with said animal by a means selected from a group consisting of: being worn on a collar, being coupled to the nasal area of said animal, being worn on a body band, attached to said animal, implanted within said animal, held within said animal's digestive system, held within said animal's reproductive system, held within said animal's urinary system, and any combination thereof.

It is another object of the present invention to disclose the method as defined above, additionally comprising a step of tracking movement of at least one said animal.

It is another object of the present invention to disclose the method as defined above, additionally comprising a step of selecting said at least one locating means comprising least one RF transmitter and at least one RF receiver. It is another object of the present invention to disclose the method as defined above, additionally comprising a step of selecting said at least one locating means comprising least one ultra-wide-band (UWB) transmitter and at least one UWB receiver.

It is another object of the present invention to disclose the method as defined above, additionally comprising a step of determining each said at least one animal's position within approximately 20 cm.

It is another object of the present invention to disclose the method as defined above, additionally comprising a step of selecting said animals to be milking animals.

It is another object of the present invention to disclose the method as defined above, additionally comprising a step of selecting the type of animal from a group consisting of cows, sheep, goats, horses, buffalo, bison, camels, donkeys, mules, swine, deer, elk, llamas, alpacas and any combination thereof.

It is another object of the present invention to disclose the method as defined above, additionally comprising a step of providing said system with sensors.

It is another object of the present invention to disclose the method as defined above, additionally comprising a step of locating said sensors in a position selected from a group consisting of: on the milking robot, on the milking stall, on a cattle stall, and any combination thereof.

It is another object of the present invention to disclose the method as defined above, additionally comprising a step of selecting said sensors from a group consisting of: heat sensors, pressure sensors, temperature sensors, flow sensors, fat sensors, protein sensors, light sensors, and any combination thereof.

It is another object of the present invention to disclose the method as defined above, additionally comprising a step of measuring, with said sensors, body temperature of said animal, temperature of a quarter of said animal, flow rate of milk, milk's temperature, fat content of said milk, opacity of said milk, protein content of said milk, weight of said animal, and any combination thereof.

It is another object of the present invention to disclose the method as defined above, additionally comprising a step of determining, for each individual animal, at least one member of a group consisting of: quantity of said milk, quality of said milk and any combination thereof.

It is another object of the present invention to disclose the method as defined above, additionally comprising a step of stopping milking at such time as there has occurred at least one condition selected from a group consisting of: said animal has yielded a quantity of said milk substantially equal to the average quantity from previous milkings, the flow of said milk has substantially decreased.

It is another object of the present invention to disclose the method as defined above, additionally comprising a step of determining said milk quality from light transmission through said milk, specific gravity of said milk, amount of sugar in said milk, amount of fat in said milk, amount of protein in said milk, and any combination thereof.

It is another object of the present invention to disclose the method as defined above, additionally comprising a step of storing in said processor at least one of a group consisting of: said quality of said milk, said quantity of said milk, said quality of said milk as a function of time, said quantity of said milk as a function of time, changes in said quality of said milk, changes in said quantity of said milk, changes in said quality of said milk as a function of time, changes in said quantity of said milk as a function of time, and any combination thereof.

It is another object of the present invention to disclose the method as defined above, additionally comprising a step of selecting said at least one animal's position from a group consisting of: the $n^{th}$ cell within said system, xyz position within said predetermined region of said milking parlor, xyz position relative to a fixed object, xyz position relative to at least one other said animal, change in xyz position within said predetermined region of said milking parlor, change in xyz position relative to a fixed object, change in xyz position relative to at least one other said animal, speed of change in xyz position within said predetermined region of said milking parlor, speed of change in xyz position relative to a fixed object, speed of change in xyz position relative to at least one other said animal, and any combination thereof.

It is another object of the present invention to disclose the method as defined above, additionally comprising a step of providing said system with a mechanism for informing a user of at least one of a group consisting of: said at least one animal's position, change in said at least one animal's position, said animal's position with respect to a fixed object, change in said animal's position with respect to a fixed object; said animal's position relative to a moving object; change in said animal's position relative to a moving object; how said animal walks, change in how said animal walks, how fast said animal walks, change in how fast said animal walks, behavior of said animal, change in behavior of said animal, behavior pattern of said animal, change in behavior pattern of said animal, and any combination thereof.

It is another object of the present invention to disclose the method as defined above, additionally comprising a step of selecting said behavior of said animal from a group of behaviors consisting of: fraction of time spent walking, change in fraction of time spent walking, fraction of time spent running, change in fraction of time spent running, limping, fraction of time spent lying down, change in fraction of time spent lying down, fraction of time spent standing, change in fraction of time spent standing, fraction of time spent eating, change in fraction of time spent eating, fraction of time spent drinking, change in fraction of time spent drinking, fraction of time spent at least one predetermined distance range from at least one other animal, change in fraction of time spent at least one predetermined distance range from at least one other animal, fraction of time spent in at least one predetermined position relative to at least one fixed object, change in fraction of time spent in at least one predetermined position relative to at least one fixed object, and any combination thereof.

It is another object of the present invention to disclose the method as defined above, additionally comprising a step of identifying the behavior of said animal as abnormal if at least one of said times changes by more than a predetermined amount.

It is another object of the present invention to disclose the method as defined above, additionally comprising a step of identifying the behavior of said animal as abnormal if at least one of said changes in time is greater than a predetermined amount.

It is another object of the present invention to disclose the method as defined above, additionally comprising a step of determining said behavior pattern of said animal from said behavior of said animal, from said temperature of said animal, from said temperature of said quarter of said animal, and any combination thereof.

It is another object of the present invention to disclose the method as defined above, additionally comprising a step of selecting said behavior pattern of said animal from a group consisting of: animal behaves normally, animal in estrus, animal acts lame, animal acts listless, animal acts restless, and any combination thereof.

It is another object of the present invention to disclose the method as defined above, additionally comprising a step of informing said user of the location of said animal with respect to the location of said user, thereby enabling said user to approach said animal.

It is another object of the present invention to disclose the method as defined above, additionally comprising a step of selecting said mechanism for informing said user from a group consisting of: a display in the vicinity of said transmitter, a display in the vicinity of said receiver, a remote display, a display on a personally carryable device, and any combination thereof.

It is another object of the present invention to disclose the method as defined above, additionally comprising a step of selecting said personally carryable device from a group consisting of a cellphone, a Bluetooth device, an earphone, a communication device attachable to the arm, a communication device attachable to the waist, a communication device attachable to a belt, a communication device attachable to a head, a communication device worn around the neck, a communication device worn on the hand, Google Glasses, a helmet comprising a communication device, a heads-up display, an EyeTap, a Golden-i, a virtual retinal display, a GlassUp, an iOptik, a beeper, a handheld computer, a personal digital assistant, a smartphone, and any combination thereof.

It is another object of the present invention to disclose the method as defined above, additionally comprising a step of selecting said display from a group consisting of: an e-mail, a text message, an image, an audible message, and any combination thereof.

It is another object of the present invention to disclose the method as defined above, additionally comprising a step of, after completion of milking, releasing an individual animal from its milking stall in a manner selected from a group consisting of: milking of said individual animal is complete; milking of all animals in a predetermined group is complete, treatment of said individual animal is complete, treatment of all animals needing treatment is complete and any combination thereof.

It is another object of the present invention to disclose the method as defined above, additionally comprising a step of, for each said at least one animal, determining a member of a group consisting of: that said individual animal has entered said milking parlor, determining that said individual animal has entered a milking stall, determining the stall in which said individual animal is milked, determining that said individual animal has left the milking stall, determining that said individual animal has left said milking parlor and any combination thereof.

It is another object of the present invention to disclose the method as defined above, additionally comprising a step of, for each said at least one animal, determining a member of a group consisting of: the time said individual animal enters said milking parlor, the time said individual animal enters said milking stall, the time said individual animal leaves said milking stall, the time said individual animal leaves said milking parlor, the amount of time said individual animal is in said milking parlor, the amount of time said individual animal is in said milking stall, the amount of milk given by said individual animal, the number of animals in said milking parlor at any time, the location of said individual animal at any given time, the relative locations of at least two said animals, the distance between said individual animal and at least one other animal, the average distance between said individual animal and a predetermined group of animals, the average distance between two animals in said predetermined group of animals, and any combination thereof.

It is another object of the present invention to disclose the method as defined above, additionally comprising a step of providing a means to communicate with a user at least one member of a group consisting of: identity of said animal, location of said animal, location of said animal as a function of time, location of said animal relative to said user, health status of said animal, behavioral status of said animal, and any combination thereof.

It is another object of the present invention to disclose the method as defined above, additionally comprising a step of selecting said health status from a group consisting of: animal currently in normal condition, animal's condition currently not normal.

It is another object of the present invention to disclose the method as defined above, additionally comprising a step of determining that said animal's condition is currently not normal for a reason selected from a group consisting of: abnormal temperature in said quarter of said udder, said quarter of said udder is inflamed, said quarter of said udder is abnormally swollen, said animal is lame, identity of lame limb, abnormal temperature of said animal, weight of said animal has changed by more than a predetermined amount, animal is in estrus, amount of head-shaking of said animal has changed by more than a predetermined amount, and any combination thereof.

It is another object of the present invention to disclose the method as defined above, additionally comprising a step of selecting said means to communicate with said user from a group consisting of: said display, a paper record.

It is another object of the present invention to disclose the method as defined above, additionally comprising a step of providing an indicator mechanism such that said user can be notified that intervention is needed for at least one said animal.

It is another object of the present invention to disclose the method as defined above, additionally comprising a step of selecting the reason said intervention is needed from a group consisting of: animal's condition is currently not normal, milking completed, animal fighting, and any combination thereof.

It is another object of the present invention to disclose the method as defined above, additionally comprising a step of selecting said indicator from a member of a group consisting of: a visual indicator, an audible indicator, a tactile indicator, and any combination thereof.

It is another object of the present invention to disclose the method as defined above, additionally comprising a step of selecting said audible indicator from a group consisting of a constant-pitch sound, a constant-loudness sound, a varying-pitch sound, a varying-loudness sound, a sound of a predetermined pattern, and any combination thereof.

It is another object of the present invention to disclose the method as defined above, additionally comprising a step of changing said audible indicator depending on the reason for the intervention.

It is another object of the present invention to disclose the method as defined above, additionally comprising a step of changing said audible indicator as the distance between said animal and a user changes.

It is another object of the present invention to disclose the method as defined above, additionally comprising a step of selecting said change in said audible indicator from a group consisting of: said loudness of said audible indicator changes, said pitch of said audible indicator changes, the rapidity of change of said loudness changes, the rapidity of change of said pitch changes, the predetermined sound pattern changes and any combination thereof.

It is another object of the present invention to disclose the method as defined above, additionally comprising a step of selecting said visual indicator from a group consisting of light of a constant, predetermined color, a light with color varying in a predetermined manner, a light varying in brightness, light of a predetermined pattern and any combination thereof.

It is another object of the present invention to disclose the method as defined above, additionally comprising a step of changing said visual indicator depending on the reason for the intervention.

It is another object of the present invention to disclose the method as defined above, additionally comprising a step of changing said visual indicator as the distance between said animal and a user changes.

It is another object of the present invention to disclose the method as defined above, additionally comprising a step of selecting said change in visual indicator from a group consisting of: change in brightness of the indicator, change in color of the indicator, change in rapidity of brightness change, change in rapidity of color change, change in predetermined color pattern and any combination thereof.

It is another object of the present invention to disclose the method as defined above, additionally comprising a step of discontinuing milking when the amount of milk removed from said cow is substantially equal to a predetermined amount.

It is another object of the present invention to disclose the method as defined above, additionally comprising a step of selecting said predetermined amount to be equal to the average of the amounts of milk produced by said animal during a plurality of milking sessions.

It is another object of the present invention to disclose a method for locating the position of at least one animal in a within a predetermined region of space; said method comprising steps of:
  a. providing a system for locating the position of at least one said animal, said system comprising:
    i. at least one identification means adapted to transmit at least one identification signal associated with said at least one animal;

ii. at least one locating means adapted to generate at least one location signal associated with said at least one animal; and, iii. a data processing system in communication with said at least one identification means and said at least one locating means, adapted to analyze said signals, said analyzed signals comprising the position within said predetermined region of space of each of said at least one animals as a function of time;

b. transmitting said at least one identification signal;
c. generating said at least one location signal; and
d. analyzing said at least one identification signal and said at least one location signal, thereby determining the position within said predetermined region of space of each said at least one animal as a function of time.

It is another object of the present invention to disclose the method as defined above, additionally comprising a step of selecting said region of space from a group consisting of: a milking parlor, a yokes (headlock) system, a barn, a shed, a field, and any combination thereof.

It is another object of the present invention to disclose the method as defined above, wherein said position is at least one of n milking cells within said milking parlor, or n yokes (headlock) cell within said yokes (headlock) system, n is an integer greater than one.

It is another object of the present invention to disclose the method as defined above, additionally comprising a step of identifying said position of said at least one animal without use of location means associated with each of said n milking cells or n yokes (headlock) cell.

It is another object of the present invention to disclose the method as defined above, wherein said data processing system is adapted to receive several of said location signals associated with the same animal.

It is another object of the present invention to disclose the method as defined above, wherein said data processing system is adapted to receive several of said location signals associated with different animals.

It is another object of the present invention to disclose the method as defined above, wherein said data processing system, based on said location signals and said identification signal, is adapted to provide the location of said animal within said system.

It is another object of the present invention to disclose the method as defined above, wherein said data processing system, based on said location signals and said identification signal, is adapted to provide said n cell in which said animal is positioned within said system.

It is another object of the present invention to disclose the method as defined above, wherein said data processing system averages said location signals and provides said n cell in which said animal is positioned within said system.

It is another object of the present invention to disclose the method as defined above, wherein said data processing system integrates multiple reading from either said animal and\or at least one adjacent animal over TIME to make a reliable estimation of said n cells.

It is another object of the present invention to disclose the method as defined above, additionally comprising a step of associating at least one said transmitter with each said animal.

It is another object of the present invention to disclose the method as defined above, additionally comprising a step of providing said association between said transmitter and said animal by means of a mechanism selected from a group consisting of a tag, a collar, being coupled to the nasal area of said animal, an implantable transponder, a bolus, a microchip, an RFID tag, and any combination thereof.

It is another object of the present invention to disclose the method as defined above, additionally comprising a step of associating said mechanism with said animal by a means selected from a group consisting of: being worn on a collar, being coupled to the nasal area of said animal, being worn on a body band, attached to said animal, implanted within said animal, held within said animal's digestive system, held within said animal's reproductive system, held within said animals urinary system, and any combination thereof.

It is another object of the present invention to disclose the method as defined above, additionally comprising a step of tracking movement of at least one said animal.

It is another object of the present invention to disclose the method as defined above, wherein said at least one locating means comprises at least one RF transmitter and at least one RF receiver.

It is another object of the present invention to disclose the method as defined above, additionally comprising a step of selecting said at least one locating means comprising least one ultra-wide-band (UWB) transmitter and at least one UWB receiver.

It is another object of the present invention to disclose the method as defined above, additionally comprising a step of determining each said at least one animal's position within approximately 20 cm.

It is another object of the present invention to disclose the method as defined above, additionally comprising a step of selecting said animals to be milking animals.

It is another object of the present invention to disclose the method as defined above, additionally comprising a step of selecting the type of animal from a group consisting of cows, sheep, goats, horses, buffalo, bison, camels, donkeys, mules, swine, deer, elk, llamas, alpacas and any combination thereof.

It is another object of the present invention to disclose the method as defined above, additionally comprising a step of providing said system with sensors.

It is another object of the present invention to disclose the method as defined above, additionally comprising a step of locating said sensors in a position selected from a group consisting of: on the milking robot, on the milking stall, on a cattle stall, and any combination thereof.

It is another object of the present invention to disclose the method as defined above, additionally comprising a step of selecting said sensors from a group consisting of: heat sensors, pressure sensors, temperature sensors, flow sensors, fat sensors, protein sensors, light sensors, and any combination thereof.

It is another object of the present invention to disclose the method as defined above, additionally comprising a step of measuring, with said sensors, body temperature of said animal, temperature of a quarter of said animal, flow rate of milk, milk's temperature, fat content of said milk, opacity of said milk, protein content of said milk, weight of said animal, and any combination thereof.

It is another object of the present invention to disclose the method as defined above, additionally comprising a step of determining, for each individual animal, at least one member of a group consisting of: quantity of said milk, quality of said milk and any combination thereof.

It is another object of the present invention to disclose the method as defined above, additionally comprising a step of stopping milking at such time as there has occurred at least one condition selected from a group consisting of: said animal has yielded a quantity of said milk substantially equal to the average quantity from previous milkings, the flow of said milk has substantially decreased.

It is another object of the present invention to disclose the method as defined above, additionally comprising a step of determining said milk quality from light transmission through said milk, specific gravity of said milk, amount of sugar in said milk, amount of fat in said milk, amount of protein in said milk, and any combination thereof.

It is another object of the present invention to disclose the method as defined above, additionally comprising a step of storing in said processor at least one of a group consisting of: said quality of said milk, said quantity of said milk, said quality of said milk as a function of time, said quantity of said milk as a function of time, changes in said quality of said milk, changes in said quantity of said milk, changes in said quality of said milk as a function of time, changes in said quantity of said milk as a function of time, and any combination thereof.

It is another object of the present invention to disclose the method as defined above, additionally comprising a step of selecting said at least one animal's position from a group consisting of: the $n^{th}$ cell within said system, xyz position within said predetermined region of said milking parlor, xyz position relative to a fixed object, xyz position relative to at least one other said animal, change in xyz position within said predetermined region of said milking parlor, change in xyz position relative to a fixed object, change in xyz position relative to at least one other said animal, speed of change in xyz position within said predetermined region of said milking parlor, speed of change in xyz position relative to a fixed object, speed of change in xyz position relative to at least one other said animal, and any combination thereof.

It is another object of the present invention to disclose the method as defined above, additionally comprising a step of providing said system with a mechanism for informing a user of at least one of a group consisting of: said at least one animal's position, change in said at least one animal's position, said animal's position with respect to a fixed object, change in said animal's position with respect to a fixed object; said animal's position relative to a moving object; change in said animal's position relative to a moving object; how said animal walks, change in how said animal walks, how fast said animal walks, change in how fast said animal walks, behavior of said animal, change in behavior of said animal, behavior pattern of said animal, change in behavior pattern of said animal, and any combination thereof.

It is another object of the present invention to disclose the method as defined above, additionally comprising a step of selecting said behavior of said animal from a group of behaviors consisting of: fraction of time spent walking, change in fraction of time spent walking, fraction of time spent running, change in fraction of time spent running, limping, fraction of time spent lying down, change in fraction of time spent lying down, fraction of time spent standing, change in fraction of time spent standing, fraction of time spent eating, change in fraction of time spent eating, fraction of time spent drinking, change in fraction of time spent drinking, fraction of time spent at least one predetermined distance range from at least one other animal, change in fraction of time spent at least one predetermined distance range from at least one other animal, fraction of time spent in at least one predetermined position relative to at least one fixed object, change in fraction of time spent in at least one predetermined position relative to at least one fixed object, and any combination thereof.

It is another object of the present invention to disclose the method as defined above, additionally comprising a step of identifying the behavior of said animal as abnormal if at least one of said times changes by at least a predetermined amount.

It is another object of the present invention to disclose the method as defined above, additionally comprising a step of identifying the behavior of said animal as abnormal if at least one of said changes in time is greater than a predetermined amount.

It is another object of the present invention to disclose the method as defined above, additionally comprising a step of determining said behavior pattern of said animal from said behavior of said animal, from said temperature of said animal, from said temperature of said quarter of said animal, and any combination thereof.

It is another object of the present invention to disclose the method as defined above, additionally comprising a step of selecting said behavior pattern of said animal from a group consisting of: animal behaves normally, animal in estrus, animal acts lame, animal acts listless, animal acts restless, and any combination thereof.

It is another object of the present invention to disclose the method as defined above, additionally comprising a step of informing said user of the location of said animal with respect to the location of said user, thereby enabling said user to approach said animal.

It is another object of the present invention to disclose the method as defined above, additionally comprising a step of selecting said mechanism for informing said user from a group consisting of: a display in the vicinity of said transmitter, a display in the vicinity of said receiver, a remote display, a display on a personally carryable device, and any combination thereof.

It is another object of the present invention to disclose the method as defined above, additionally comprising a step of selecting said personally carryable device from a group consisting of a cellphone, a Bluetooth device, an earphone, a communication device attachable to the arm, a communication device attachable to the waist, a communication device attachable to a belt, a communication device attachable to a head, a communication device worn around the neck, a communication device worn on the hand, Google Glasses, a helmet comprising a communication device, a heads-up display, an EyeTap, a Golden-i, a virtual retinal display, a GlassUp, an iOptik, a beeper, a handheld computer, a personal digital assistant, a smartphone, and any combination thereof.

It is another object of the present invention to disclose the method as defined above, additionally comprising a step of selecting said display from a group consisting of: an e-mail, a text message, an image, an audible message, and any combination thereof.

It is another object of the present invention to disclose the method as defined above, additionally comprising a step of, after completion of milking, releasing an individual animal from its milking stall in a manner selected from a group consisting of: milking of said individual animal is complete; milking of all animals in a predetermined group is complete, treatment of said individual animal is complete, treatment of all animals needing treatment is complete and any combination thereof.

It is another object of the present invention to disclose the method as defined above, additionally comprising a step of, for each said at least one animal, determining a member of a group consisting of: that said individual animal has entered said milking parlor, determining that said individual animal has entered a milking stall, determining the stall in which said individual animal is milked, determining that said individual animal has left the milking stall, determining that said individual animal has left said milking parlor and any combination thereof.

It is another object of the present invention to disclose the method as defined above, additionally comprising a step of, for each said at least one animal, determining a member of a group consisting of: the location of said individual animal at any given time, the relative locations of at least two said animals, the distance between said individual animal and at least one other animal, the average distance between said individual animal and a predetermined group of animals, the average distance between two animals in said predetermined group of animals, and any combination thereof.

It is another object of the present invention to disclose the method as defined above, additionally comprising a step of, for each said at least one animal, determining a member of a group consisting of: the time said individual animal enters said milking parlor, the time said individual animal enters said milking stall, the time said individual animal leaves said milking stall, the time said individual animal leaves said milking parlor, the amount of time said individual animal is in said milking parlor, the amount of time said individual animal is in said milking stall, the amount of milk given by said individual animal, the number of animals in said milking parlor at any time, and any combination thereof.

It is another object of the present invention to disclose the method as defined above, additionally comprising a step of providing a means to communicate with a user at least one member of a group consisting of: identity of said animal, location of said animal, location of said animal as a function of time, location of said animal relative to said user, health status of said animal, behavioral status of said animal, and any combination thereof.

It is another object of the present invention to disclose the method as defined above, additionally comprising a step of selecting said health status from a group consisting of: animal currently in normal condition, animal's condition currently not normal.

It is another object of the present invention to disclose the method as defined above, additionally comprising a step of determining that said animal's condition is currently not normal for a reason selected from a group consisting of: abnormal temperature in said quarter of said udder, said quarter of said udder is inflamed, said quarter of said udder is abnormally swollen, said animal is lame, identity of lame limb, abnormal temperature of said animal, weight of said animal has changed by more than a predetermined amount, animal is in estrus, amount of head-shaking of said animal has changed by more than a predetermined amount, and any combination thereof.

It is another object of the present invention to disclose the method as defined above, additionally comprising a step of selecting said means to communicate with said user from a group consisting of: said display, a paper record.

It is another object of the present invention to disclose the method as defined above, additionally comprising a step of providing an indicator mechanism such that said user can be notified that intervention is needed for at least one said animal.

It is another object of the present invention to disclose the method as defined above, additionally comprising a step of selecting the reason said intervention is needed from a group consisting of: animal's condition is currently not normal, milking completed, animal fighting, and any combination thereof.

It is another object of the present invention to disclose the method as defined above, additionally comprising a step of selecting said indicator from a member of a group consisting of: a visual indicator, an audible indicator, a tactile indicator, and any combination thereof.

It is another object of the present invention to disclose the method as defined above, additionally comprising a step of selecting said audible indicator from a group consisting of a constant-pitch sound, a constant-loudness sound, a varying-pitch sound, a varying-loudness sound, a sound of a predetermined pattern, and any combination thereof.

It is another object of the present invention to disclose the method as defined above, additionally comprising a step of changing said audible indicator depending on the reason for the intervention.

It is another object of the present invention to disclose the method as defined above, additionally comprising a step of changing said audible indicator as the distance between said animal and a user changes.

It is another object of the present invention to disclose the method as defined above, additionally comprising a step of selecting said change in said audible indicator from a group consisting of: said loudness of said audible indicator changes, said pitch of said audible indicator changes, the rapidity of change of said loudness changes, the rapidity of change of said pitch changes, the predetermined sound pattern changes and any combination thereof.

It is another object of the present invention to disclose the method as defined above, additionally comprising a step of selecting said visual indicator from a group consisting of light of a constant, predetermined color, a light with color varying in a predetermined manner, a light varying in brightness, light of a predetermined pattern and any combination thereof.

It is another object of the present invention to disclose the method as defined above, additionally comprising a step of changing said visual indicator depending on the reason for the intervention.

It is another object of the present invention to disclose the method as defined above, additionally comprising a step of changing said visual indicator as the distance between said animal and a user changes.

It is another object of the present invention to disclose the method as defined above, additionally comprising a step of selecting said change in visual indicator from a group consisting of: change in brightness of the indicator, change in color of the indicator, change in rapidity of brightness change, change in rapidity of color change, change in predetermined color pattern and any combination thereof.

It is another object of the present invention to disclose the method as defined above, additionally comprising a step of discontinuing milking when the amount of milk removed from said cow is substantially equal to a predetermined amount.

It is another object of the present invention to disclose the method as defined above, additionally comprising a step of selecting said predetermined amount to be equal to the average of the amounts of milk produced by said animal during a plurality of milking sessions.

It is another object of the present invention to disclose the system as defined above, additionally comprising an animal retrieval system comprising:
  a. (a) at least one elevated rail placed at a height unreachable by said animal and at least one trolley translatable at least along said rail, and (b) at least one low-level mobile maneuvering device, said low-level mobile maneuvering device adapted to move along at least one of a group consisting of a floor and the ground, and at least one trolley attachable to said low-level mobile maneuvering device; and b. at least one animal stimulating device operative to stimulate said animal to move towards a desired location, said animal stimulating device attachable to said maneuvering device.

It is another object of the present invention to disclose the system as defined above, additionally comprising (a) at least one motor propelling the trolley along the rail; and (b) at least one controller operative to activate said motor.

It is another object of the present invention to disclose the system as defined above, additionally comprising at least one transmitter/receiver operative to receive information from and transmit information to said system.

It is another object of the present invention to disclose the system as defined above, wherein said animal stimulating device is selected from a group consisting of a speaker, a low voltage electrical conducting wire, an air gun, a rotating bullwhip, a water gun, a soft ball on a tether, said animal driving fence and any combination thereof.

It is another object of the present invention to disclose the system as defined above, wherein said trolley additionally comprises a member of a group selected from a carrier arm, an air compressor and any combination thereof.

It is another object of the present invention to disclose the system as defined above, wherein said carrier arm is an articulated arm including at least two segments connected to each other by a joint.

It is another object of the present invention to disclose the system as defined above, wherein said carrier arm segments are either connected to each other at a fixed angle or are rotatably moveable relative to each other.

It is another object of the present invention to disclose the system as defined above, wherein at least one carrier arm segment is a telescopic arm segment.

It is another object of the present invention to disclose the system as defined above, additionally adapted to: drive said trolley to the location of said animal; activate said animal stimulation device; and stimulate said animal so as to urge said animal to move towards a desired location.

It is another object of the present invention to disclose the system as defined above, additionally adapted to: receive a destination location for the animal; and automatically drive said animal from its current location to said destination location.

It is another object of the present invention to disclose the system as defined above, wherein said trolley is also translatable across a bridge between two or more elevated rails, said bridge being translatable along said rails.

It is another object of the present invention to disclose the system as defined above, wherein said desired location is at least one of a milking parlor, a gateway, a chute, a pathway and a truck.

It is another object of the present invention to disclose the system as defined above, wherein said trolley has hovering capabilities and is at least partially independent of said rails.

It is another object of the present invention to disclose the system as defined above, additionally comprising a cow latching mechanism including a latch reversibly engageable with a latch receiver attached to a collar of a cow.

It is another object of the present invention to disclose the system as defined above, wherein said latch receiving mechanism is a magnet and the latch is an electromagnet.

It is another object of the present invention to disclose the system as defined above, wherein said latch receiving mechanism is a bearing attached to a cow collar and the latch is hook closed with a bias-controlled tongue.

It is another object of the present invention to disclose the system as defined above, wherein said latch and said latch receiving mechanism are operative to detach from each other so as to prevent injury to cow should said cow begin to resist and to develop aberrant behavior.

It is another object of the present invention to disclose the system as defined above, additionally adapted to activate said cow retrieval system functionality.

It is another object of the present invention to disclose the system as defined above, additionally adapted to perform a member of a group consisting of: generate an alert, activate system functionality and any combination thereof in at least one circumstance selected from a group consisting of: a cow is identified as missing from said milking parlor during a predetermined time slot; a cow is statistically late or missing from the milking parlor; a daily milking schedule of the dairy farm resident cows determines that a cow should be moved to the milking parlor, and any combination thereof.

It is another object of the present invention to disclose the system as defined above, wherein a real time image of said cows is displayed.

It is another object of the present invention to disclose the system as defined above, wherein pressure on an image of a cow activates said system retrieval functionality so as to initiate retrieval of said selected cow.

It is another object of the present invention to disclose the system as defined above, wherein said stationary cow is identified and marked by means of at least one of a group consisting of: pressure on a location on a touchscreen, pressure on at least one key of a keyboard, motion of a mouse and motion of a joystick.

It is another object of the present invention to disclose the system as defined above, wherein said marking automatically activates the system retrieval functionality to initiate retrieval of said selected cow.

It is another object of the present invention to disclose the system as defined above, wherein said trolley further comprises a water reservoir.

It is another object of the present invention to disclose the system as defined above, wherein the shape of said cow driving fence is selected from a group consisting of: flat, in the form of a semi-circle or in the form of a complete circle that completely surroundings said cow when lowered.

It is another object of the present invention to disclose the system as defined above, wherein said low-level maneuvering device is movable on a member of a group selected from: at least one wheel and an air-cushion levitation device, a magnetic levitation device, and any combination thereof.

It is another object of the present invention to disclose the method as defined above, additionally comprising steps of:
a. providing a cow retrieval system comprising:
  i. a maneuvering device selected from a group consisting of: (a) at least one elevated rail placed at a height unreachable by said animal and at least one trolley translatable at least along said rail, and (b) at least one low-level mobile maneuvering device, said low-level mobile maneuvering device adapted to move along at least one of a group consisting of a floor and the ground, and at least one trolley attachable to said low-level mobile maneuvering device; and
  ii. at least one animal stimulating device;
b. maneuvering said maneuvering device so as to bring it to the location of said animal;
c. verifying said location of said animal;
d. activating said animal stimulating device; and e. stimulating said animal, thereby urging said animal to move towards a predetermined location.

It is another object of the present invention to disclose the method as defined above, additionally comprising steps of:
a. providing a cow retrieval system comprising:
   i. (a) at least one elevated rail placed at a height unreachable by said animal and at least one trolley translatable at least along said rail, and (b) at least one low-level mobile maneuvering device, said low-level mobile maneuvering device adapted to move along at least one of a group consisting of a floor and the ground, and at least one trolley attachable to said low-level mobile maneuvering device; and
   ii. at least one animal stimulating device;
b. receiving a destination location for said animal;
c. maneuvering said maneuvering device so as to bring it to the location of said animal;
d. maneuvering said maneuvering device so as to induce said animal to move from its current location to said destination location.

It is lastly an object of the present invention to disclose the method as defined above, additionally comprising steps of activating the cow retrieval system functionality at such time as there occurs a circumstance selected from a group consisting of:
a. a cow is identified as missing from a milking parlor during a predetermined time slot;
b. a cow is identified as statistically late or missing from said milking parlor; and
c. according to a daily milking schedule for said cow, it is the predetermined time for milking said cow.

BRIEF DESCRIPTION OF THE FIGURES

In order to better understand the invention and its implementation in practice, a plurality of embodiments will now be described, by way of non-limiting example only, with reference to the accompanying drawings, wherein FIG. 1a-1b schematically illustrates a yokes (headlock) system and a milking parlor in FIG. 2 is a simplified illustration of an embodiment of an automatic animal retrieval system as viewed from above.

DETAILED DESCRIPTION OF THE PREFERRED EMBODIMENTS

Figure 1A:
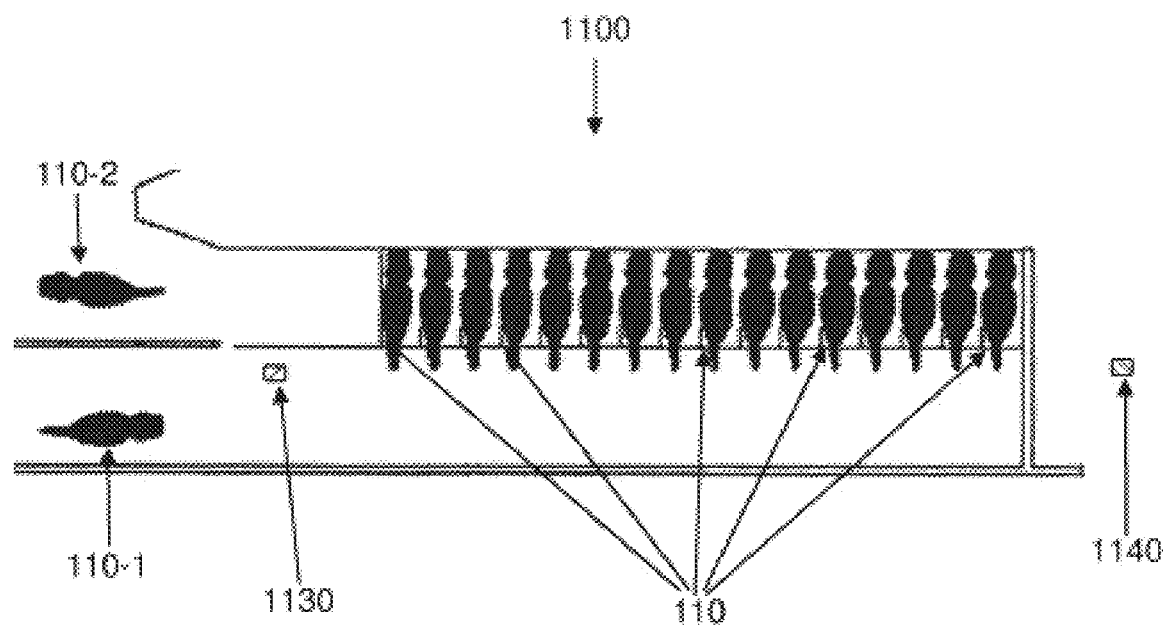

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for identifying and locating livestock.

The term 'plurality' hereinafter refers to any number greater than one.

The term 'approximately' hereinafter refers to a value within 25% of the nominal value.

The term 'cow' hereinafter refers to any mammal generally kept in herds, including, but not limited to, cows, sheep, goats, buffalo, bison, horses, donkeys, mules, swine, deer, elk, llamas, alpacas and camels.

The term 'yoke system' hereinafter refer to a system which comprises n yoke cells; where n is an integer higher than 1. Each yoke cell is used to restrain at least one animal (e.g., cow). i.e., to lock at least one animal for purposes of eating, providing treatment to the same etc. Each yoke cell will be referred hereinafter as headlock as well.

The term 'headlock' hereinafter refer to any means adapted to restrain at least one animal (e.g., cow). Each headlock cell will be referred hereinafter as yoke as well.

The terms 'milking cell' and 'milking stall' hereinafter refer to a defined area large enough to accommodate one animal, within which the animal is milked. Milking cell and milking stall, as used herein, are synonymous.

The term 'milking parlor' hereinafter refers to a defined area within which milking animals such as cows are milked. Typically, milking parlors comprise entry holding areas, milking stalls and exit holding areas, although the entry and exit holding areas cam be the same or can overlap.

The term 'cell' hereinafter refers to a defined volume large enough to accommodate an animal. A cell can comprise a milking cell, a yoke or yoke cell, a headlock or headlock cell, a stall, or any other means of restraining an animal at a known location. A cell can also be a defined region of space such as a milking point or other defined region of space in which the animals should remain. For non-limiting example, in milking parlors with milking points, the milking equipment is spaced such that, when the animals stand with their sides adjacent to each other, each cow can be connected to milking equipment. A milking point and, therefore, a cell is then the cow position associated with a set of milking equipment.

The term 'locating means' hereinafter refers to any means of identifying the position of an animal. Locating means include, but are not limited to, RFID tags and RFID readers, coded IR tags and IR sensors, dumb tags and optical readers, and ultrawide band transmitter-receivers.

The term 'identification means' hereinafter refers to any means of uniquely identifying an individual animal, typically by means of an animal identification number. The identification means can be, but is not limited to, an RFID tag comprising the animal identifier, a coded IR tag comprising the animal identifier, a "dumb" tag into which the identifying number is embossed or onto which the identifying number is painted, or a number tattooed in a cow's ear.

The term 'quarter' hereinafter refers to the portion of the udder associated with a single teat. Cows, bison, buffalo, deer and camels normally have four quarters, sheep, goats, and horses normally have two.

The term 'personally carryable device' hereinafter refers to any device held in the hand, worn on or in the clothing or attached to the body. Non-limiting examples of hand-held devices include mobile phones, cellphones, Bluetooth ear-phones, communication devices attachable to the arm, communication devices attachable to the waist, communication devices attachable to a belt, communication devices attachable to a head, communication devices worn around the neck, communication devices worn on the hand, Google Glasses, helmets comprising a communication device, heads-up displays, EyeTaps, Golden-is, virtual retinal displays, GlassUps, iOptiks, beepers, either kept in a pocket or worn on a belt or around the neck, handheld computers, personal digital assistants, smartphones and any combination thereof.

The term 'rail' hereinafter refers to any construction operative to allow bi-directional translation of a trolley therealong, placed at a height unreachable by a cow, e.g., a rod, a cable, a rope, etc.

In all figures herein, identical numbers refer to analogous parts.

The prior art discloses systems in which there exist identification means on each cow and location means on each milking cell or other animal holding cell such as a stall or pen.

In prior-art systems, typically, matched identification means and location means are used. Typical examples include an RFID tag on the animal and an RFID reader in the cell, a coded IR emitting tag on the animal and an IR sensor in the cell, a "dumb" tag on the animal and an optical reader in the cell, although there are many other such systems known in the art.

In all of these systems, when a cow enters a cell, the location means (such as the RFID reader) in the cell reads the identification means (such as the RFID tag) on the animal, thereby identifying that a specific animal has entered a specific cell.

According to this embodiment, there is no need for the location means on each milking cell.

However, in prior-art systems, every time the layout of a milking parlor is changed, the location means must be changed to match the new layout. This will involve some combination of moving the location means, re-wiring the milking parlor, and, if the number of cells in increased, providing new location means. Care will need to be taken that the location means do not interfere with each other and that structures in the milking parlor do not interfere with the operation of the location means. For example, care would need to be taken to ensure that nothing blocked the line-of-sight between a "dumb" tag on the animal and an optical reader in the cell.

In addition, care will need to be taken that the new location means are compatible with the rest of the system.

In the present system, the locations of the animals can be found without use of location means associated with each of the n milking cells. In contrast to the prior art, in preferred embodiments of the present system, there is a single location means which identities the locations of all of the animals. The system is not limited to a single location means; however, the number of location means is not large.

In the present system, the location means covers an area substantially larger than a single milking pen, for example, an entire milking parlor or all of the milking cells within a milking parlor. Other examples include, but are not limited to, the interior of a barn, the area of stalls within a barn, the area of a pen within the barn, or the area of an outdoor field or an outdoor pen.

The present system further comprises a data processor in communication with the location means and, in some embodiments, the data processor is in communication with the identification means on the animal. Thus, in embodiments with data processor in communication with the identification means the system can inform the farmer, stock keeper or other user that, at the present time, a specific cow, for example cow no 123456 (as identified by the identification means), is located in a specified area for example, cell number 5 (as located by the location means).

The data processor is further in communication with display means adapted to inform a stock keeper or other user of data about the animal, such as the identity of the animals in the milking cells.

The data processor further comprises means, such as a database, for storing the locations of and the identities of the animals.

The system is a real-time system, in that it real-time updates the locations of the animals within the area covered by the location means. For example, for a milking parlor, as each animal enters a milking cell, the system recognizes that the animal has entered a cell and which cell it has entered and updates any databases or displays accordingly. When the animal leaves the cell, for example after milking has finished, the system will recognize that that animal has left that cell and will again update any databases and displays. This enables stock keepers to be aware at all times of the locations of the animals and, therefore, of the progress of milking.

In preferred embodiments of a system wherein the movements of cows are tracked in a milking parlor, the milking stall used by each cow can be identified so that, for example, for each cow, the amount of milk given is known and is attributable to the correct cow.

Farmers also desire to track cows' movements in barns, pens or fields in order to determine the cows' status; unusual behavior can indicate unwellness in the animal and the sooner an unwell animal is identified and treated, the more likely it is that the animal will show good recovery and, in general, the smaller will be the cost of the treatment. Furthermore, the more quickly the animal is treated, the smaller the likely effect on the animal's milk production. Unusual behavior can also indicate problems within a herd, such as two animals fighting or dangerous animals, such as dogs, too close to the cows.

Since the present system requires only one or, at most, a small number of locating means, embodiments of the present system can be installed in barns, pens or fields and can track the cows' movements therein in real time and thereby, using the data processing system and the display system, enable the farmer, stock keeper or other user to be apprised in real time of the status of each animal.

The system of the present invention preferably comprises, for the location means, an ultra wide band (UWB) transmitter-receiver system with at least one transmission antenna and at least one receiver antenna adapted track the location of animals and, in some embodiments, identify the animals, for example cows, so that, for non-limiting example, their progress through a milking parlor can be followed. In other embodiments, other transmitter-receiver systems, such as are known in the art, can be used to locate the animals.

In some embodiments, the location means and the identification means are separate. In such embodiments, one system, for non-limiting example, a UWB transmitter-receiver system, determines the location of each animal, while a second system, for non-limiting example, RFID tags and an RFID reader, determines the identities of the animals.

UWB systems use signals of very low spectral density that extend over a very wide frequency range. Ultra wideband transmissions typically operate in the range 3.1 GHz up to 10.6 GHz, at a limited transmit power of −41 dBm/MHz. In addition, the transmissions typically either occupy a bandwidth of at least 500 MHz, or have a bandwidth of at least 20% of the centre frequency, or both. For example, a transmission with a center frequency of 6 GHz, would have a bandwidth of at least 1.2 GHz.

The advantages of UWB technology for a locating means are (1) that a system comprising one transmitter and one receiver can accurately locate a plurality of animals, even when the animals are moving; (2) the locating means is relatively insensitive to obstacles—at worst it will identify the obstacles as animals, at best, because of the wide bandwidth, the system will effectively see around the obstacles; the obstacles will effectively be invisible; and (3) UWB systems, because of their wide bandwidth, are relatively insensitive to multipath fading, which is loss of signal due to multiple reflections from objects between the transmitter and the receiver.

UWB technology also provides a low-power system, both in the sense that the total amount of power in the signal is relatively small, and in the sense that the amount of power per MHz of bandwidth is small, so that the UWB transmissions will not cause harmful interference to other radio transmissions using traditional carrier-based techniques.

In fact, the actual energy density of the transmissions themselves can be less that the unintentional or spurious radiation levels from a typical PC. Typically, a DS UWB transmitter will transmit less than 75 nanowatts per Megahertz. This means that, when integrated over the total bandwidth of the transmission, the transmissions may only be around 0.25 milliwatts, much smaller than 802.11-type transmissions that are typically between 25 and 100 mW, or Bluetooth transmissions are typically between 1 mW and 1 W.

FIG. 1a schematically illustrates a yokes (headlock) system (1100). Cows (110) can enter (110-1) and leave (110-2) the system.

A plurality of n yokes cells (1110) are available; each cow (110) is contained within a yoke cell within the system (1110).

In this embodiment, a transmitter (1130) is within the yokes system and a receiver (1140) is outside the same.

In other embodiments, the transmitter (1130) is outside the system (1100) and the receiver (1140) is within it. In yet other embodiments, both transmitter (1130) and receiver (1140) are within the yokes system (1100), and in still other embodiments, both transmitter (1130) and receiver (1140) are outside the yokes system (1100).

According to another embodiment, the transmitter (1130) and\or the receiver (1140) are used as location means adapted to generate at least one location signal associated with at least one of the cows. The location signal provides information as for the current location of said cow.

According to another embodiment, the a transmitter (1130) and\or the receiver (1140) are used as identification means adapted to transmit at least one identification signal associated with said at least one animal. For example, the cow number.

It should be emphasized that the location means is associated with the yokes system (1100) as a whole—it is not associated with the specific cells. In the exemplary embodiment shown, there is one transmitter and one receiver which provide coverage for the entire yokes system (1100); the locations of all the animals are determined simultaneously by means of the single transmitter and the single receiver.

Even in embodiments with more than one transmitter or receiver, the number of transmitters or receivers will be much smaller than the number of cells; at no time will each cell have its own location means.

It should also be noted that the location means can be associated with the cow number (or the identification means).

According to a preferred embodiment of the present invention, the system further comprises data processing system adapted to receive the location of each cow (or several cows) as well as the identification of the same (i.e., the cow's number) and to provide the user of the system with the information as for in which cell the cow is located as a function of time.

According to a preferred embodiment of the present invention, the data processing system can receive the location of each cow (or several cows) as well as the identification of the same (i.e., the cow number) and average said location so as to provide the user of the system with the information as for in which cell the cow is located as a function of time.

Thus, it is an object of the present invention to disclose, in a yokes system having a plurality of n yokes cells, each of the n cells being adapted to enclose at least one animal: n is an integer greater than 1; a system for locating the position of at least one animal, the system comprising:
a. at least one identification means adapted to transmit at least one identification signal associated with said at least one animal;
b. at least one locating means adapted to generate at least one location signal associated with said at least one animal; and
c. a data processing system in communication with said at least one identification means and said at least one locating means, adapted to analyze said signals, said analyzed signals comprising the position within a predetermined region in said yokes system of each of said at least one animals as a function of time.

It is another object of the present invention to disclose the system as defined above, wherein said position is at least one of said n cells.

It is another object of the present invention to disclose the system as defined above, wherein said data processing system is adapted to receive several of said location signals associated with the same animal.

It is another object of the present invention to disclose the system as defined above, wherein said data processing system is adapted to receive several of said location signals associated with different animals.

It is another object of the present invention to disclose the system as defined above, wherein said data processing system, based on said location signals and said identification signal, is adapted to provide the location of said animal within said yokes system.

It is another object of the present invention to disclose the system as defined above, wherein said data processing system, based on said location signals and said identification signal, is adapted to provide said n cell in which said animal is positioned within said yokes system.

It is another object of the present invention to disclose the system as defined above, wherein said data processing system averages said location signals and provides said n cell in which said animal is positioned within said yokes system.

It is another object of the present invention to disclose the system as defined above, wherein said data processing system integrates multiple reading from either said animal and\or at least one adjacent animal over TIME to make a reliable estimation of said n cells.

Such a feature is highly important as the cow may move its head (and the sensor) very near the cell/headlock border.

Furthermore, using the location of the adjacent cows may further assist in reliable headlock determination. For example if the location information indicate that cow #10 is either in cell #3 or cell #4. But cow #20 is known to be in cell 4 than cow #10 can be associated with cell #3 with high reliability.

It is another object of the present invention to disclose the system as defined above, wherein said system identities said position of said at least one animal without use of location means associated with each of said n cells.

It is another object of the present invention to disclose the system as defined above, wherein at least one said identification means is associated with each of said animals.

It is another object of the present invention to disclose the system as defined above, wherein said association between said identification means and said animal is by means of a mechanism selected from a group consisting of: a tag, a collar, being coupled to the nasal area of said animal, an implantable transponder, a bolus, a microchip, an RFID tag, and any combination thereof.

It is another object of the present invention to disclose the system as defined above, wherein said identification means is associated with said at least one animal by a means selected from a group consisting of: being worn on a collar, being coupled to the nasal area of said animal, collar, being worn on a body band, attached to said animal, implanted within said animal, held within said animal's digestive system, held within said animal's reproductive system, held within said animal's urinary system, and any combination thereof.

It is another object of the present invention to disclose the system as defined above, wherein movement of at least one said animal is trackable by means of said at least one identification means, said at least one locating means and said data processing system.

It is another object of the present invention to disclose the system as defined above, wherein said at least one locating means comprises at least one RF transmitter and at least one RF receiver.

It is another object of the present invention to disclose the system as defined above, wherein said at least one locating means comprises at least one ultra-wide-band (UWB) transmitter and at least one UWB receiver.

It is another object of the present invention to disclose the system as defined above, wherein said animals are milking animals.

It is another object of the present invention to disclose the system as defined above, wherein the type of animal is selected from a group consisting of cows, sheep, goats, horses, buffalo, bison, camels, donkeys, mules, swine, deer, elk, llamas, alpacas and any combination thereof.

It is another object of the present invention to disclose the system as defined above, wherein said at least one animal's position is selected from a group consisting of: the $n^{th}$ cell within said yokes system, xyz position within a predetermined region in said yokes system, xyz position relative to a fixed object, xyz position relative to at least one other said animal, change in xyz position within said predetermined region in said yokes system, change in xyz position relative to a fixed object, change in xyz position relative to at least one other said animal, speed of change in xyz position within said predetermined region in said yokes system, speed of change in xyz position relative to a fixed object, speed of change in xyz position relative to at least one other said animal, and any combination thereof.

It is another object of the present invention to disclose the system as defined above, wherein said system further comprises at least one mechanism for informing a user of at least one of a group consisting of: said at least one animal's position, change in said at least one animal's position, said animals position with respect to a fixed object, change in said animal's position with respect to a fixed object; said animal's position relative to a moving object; change in said animal's position relative to a moving object; how said animal walks, change in how said animal walks, how fast said animal walks, change in how fast said animal walks, behavior of said animal, change in behavior of said animal, behavior pattern of said animal, change in behavior pattern of said animal, and any combination thereof.

It is another object of the present invention to disclose the system as defined above, wherein, based upon the location of said animal, an automatic entrance into and out of at least one of said n yoke cells is provided.

It should be pointed out that according to another embodiment of the present invention, if a cow that does not need handling (i.e., treatment) tries to enter the headlock, the same will prevent the cow from inserting its head into the same. As a result, the cow will move away and allow another cow to reach the headlock.

It is another object of the present invention to disclose the system as defined above, wherein said behavior of said animal is selected from a group of behaviors consisting of: fraction of time spent walking, change in fraction of time spent walking, fraction of time spent running, change in fraction of time spent running, limping, fraction of time spent lying down, change in fraction of time spent lying down, fraction of time spent standing, change in fraction of time spent standing, fraction of time spent eating, change in fraction of time spent eating, fraction of time spent drinking, change in fraction of time spent drinking, fraction of time spent at least one predetermined distance range from at least one other animal, change in fraction of time spent at least one predetermined distance range from at least one other animal, fraction of time spent in at least one predetermined position relative to at least one fixed object, change in fraction of time spent in at least one predetermined position relative to at least one fixed object, and any combination thereof.

It is another object of the present invention to disclose the system as defined above, wherein the behavior of said animal is identified as abnormal if at least one of said times changes by at least a predetermined amount.

It is another object of the present invention to disclose the system as defined above, wherein the behavior of said animal is identified as abnormal if at least one of said changes in times is greater than a predetermined amount.

It is another object of the present invention to disclose the system as defined above, additionally comprising at least one mechanism for informing said of the location of said animal with respect to the location of said user, thereby enabling said user to approach said animal.

It is another object of the present invention to disclose the system as defined above, wherein said at least one mechanism for informing said user is selected from a group consisting of: a display within said system, a display in the vicinity of said system, a display in the vicinity of said locating means, a remote display, a display on a personally carryable device, and any combination thereof.

It is another object of the present invention to disclose the system as defined above, wherein said personally carryable device is selected from a group consisting of a cellphone, a Bluetooth device, an earphone, a communication device attachable to the arm, a communication device attachable to the waist, a communication device attachable to a belt, a communication device attachable to a head, a communication device worn around the neck, a communication device worn on the hand, Google Glasses, a helmet comprising a communication device, a heads-up display, an EyeTap, a Golden-i, a virtual retinal display, a GlassUp, an iOptik, a beeper, a handheld computer, a personal digital assistant, a smartphone, and any combination thereof.

It is another object of the present invention to disclose the system as defined above, wherein said display is selected from a member of a group consisting of: an e-mail, a text message, an image, an audible message, and any combination thereof.

It is another object of the present invention to disclose the system as defined above, additionally comprising means to communicate with a user at least one member of a group consisting of: identity of said animal, location of said animal, location of said animal as a function of time, location of said animal relative to said user, health status of said animal, behavioral status of said animal, estrus status of said animal, treatment required to provide said animal and any combination thereof.

It is another object of the present invention to disclose the system as defined above, wherein said health status is selected from a group consisting of: animal currently in normal condition, animal's condition currently not normal.

It is another object of the present invention to disclose the system as defined above, wherein said animal's condition is currently not normal for a reason selected from a group consisting of: abnormal temperature in said quarter of said udder, said quarter of said udder is inflamed, said quarter of said udder is abnormally swollen, said animal is lame, identity of lame limb, abnormal temperature of said animal, weight of said animal has changed by more than a predetermined amount, animal is in estrus, amount of head-shaking of said animal has changed by more than a predetermined amount, and any combination thereof.

It is another object of the present invention to disclose the system as defined above, wherein said means to communicate with said user is selected from a group consisting of: said display, a paper record.

It is another object of the present invention to disclose the system as defined above, additionally comprising an indicator mechanism such that said user can be notified that intervention is needed for at least one said animal.

It is another object of the present invention to disclose the system as defined above, wherein said indicator is selected from a member of a group consisting of a visual indicator, an audible indicator, a tactile indicator, and any combination thereof.

It is another object of the present invention to disclose the system as defined above, wherein said audible indicator is selected from a group consisting of a constant-pitch sound, a constant-loudness sound, a varying-pitch sound, a varying-loudness sound, a sound of a predetermined pattern, and any combination thereof.

It is another object of the present invention to disclose the system as defined above, wherein said audible indicator is changeable depending on the reason for the intervention.

It is another object of the present invention to disclose the system as defined above, wherein said audible indicator is changeable as the distance between said animal and a user changes.

It is another object of the present invention to disclose the system as defined above, wherein said change in said audible indicator is selected from a group consisting of: said loudness of said audible indicator changes, said pitch of said audible indicator changes, the rapidity of change of said loudness changes, the rapidity of change of said pitch changes, the predetermined sound pattern changes and any combination thereof.

It is another object of the present invention to disclose the system as defined above, wherein said visual indicator is selected from a group consisting of light of a constant, predetermined color, a light with color varying in a predetermined manner, a light varying in brightness, light of a predetermined pattern and any combination thereof.

It is another object of the present invention to disclose the system as defined above, wherein said visual indicator is changeable depending on the reason for the intervention.

It is another object of the present invention to disclose the system as defined above, wherein said visual indicator is changeable as the distance between said animal and a user changes.

It is another object of the present invention to disclose the system as defined above, wherein said change in visual indicator is selected from a group consisting of: change in brightness of the indicator, change in color of the indicator, change in rapidity of brightness change, change in rapidity of color change, change in predetermined color pattern and any combination thereof.

The following description will demonstrate a second use of the above mentioned system being used in milking parlor.

Figure 1B:
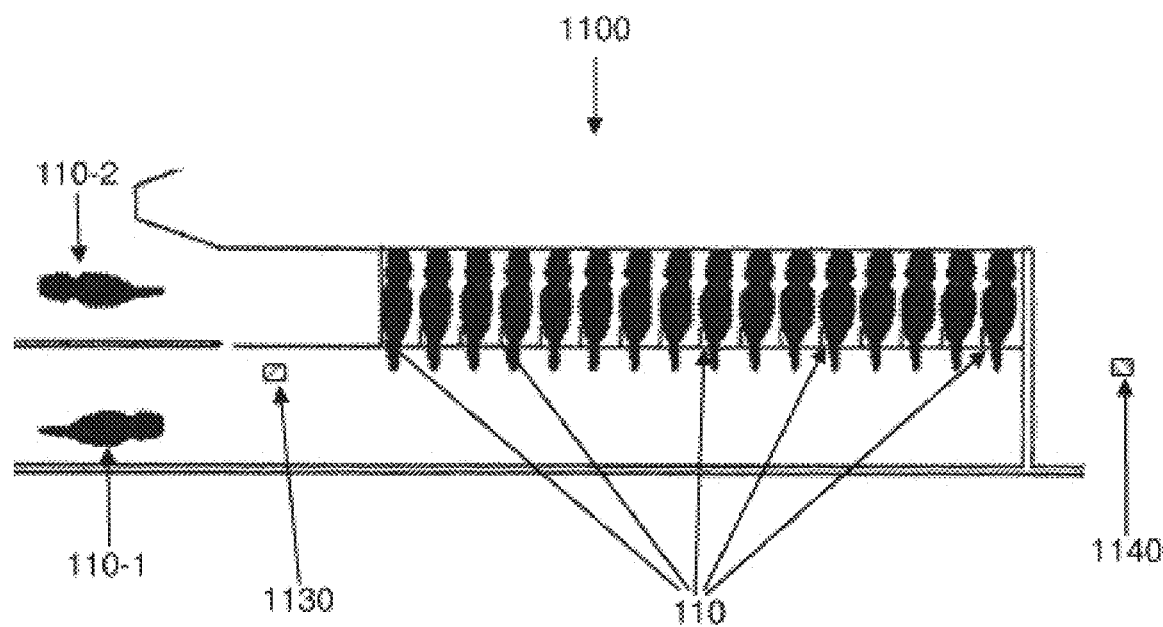

FIG. 1b schematically illustrates a milking parlor (1100) from above, with the roof removed for clarity. Cows (110) enter (110-1) the parlor to be milked and leave (110-2) the parlor after milking. A plurality of n milking stalls (1110) are available; each cow (110) is milked while it is in a stall (1110). In this embodiment, the transmitter (1130) is within the milking parlor and the receiver (1140) is outside the milking parlor. In other embodiments, the transmitter (1130) is outside the milking parlor and the receiver (1140) is within it. In yet other embodiments, both transmitter (1130) and receiver (1140) are within the milking parlor, and in still other embodiments, both transmitter (1130) and receiver (1140) are outside the milking parlor.

It should be emphasized that the location means is associated with the milking parlor as a whole—it is not associated with the specific cells. In the exemplary embodiment shown, there is one transmitter and one receiver which provide coverage for the entire milking parlor, the locations of all the animals are determined simultaneously by means of the single transmitter and the single receiver.

Even in embodiments with more than one transmitter or receiver, the number of transmitters or receivers will be much smaller than the number of cells; at no time will each cell have its own location means.

According to another embodiment, the transmitter (1130) and\or the receiver (1140) are used as location means adapted to generate at least one location signal associated with at least one of the cows. The location signal provides information as for the current location of said cow.

According to another embodiment, the a transmitter (1130) and\or the receiver (1140) are used as identification means adapted to transmit at least one identification signal associated with said at least one animal. For example, the cow's number.

It should be emphasized that the location means is associated with the yokes system (1100) as a whole—it is not associated with the specific cells. In the exemplary embodiment shown, there is one transmitter and one receiver which provide coverage for the entire yokes system (1100); the locations of all the animals are determined simultaneously by means of the single transmitter and the single receiver.

Even in embodiments with more than one transmitter or receiver, the number of transmitters or receivers will be much smaller than the number of cells; at no time will each cell have its own location means.

It should also be noted that the location means can be associated with the cow number (or the identification means).

According to a preferred embodiment of the present invention, the system further comprises data processing system adapted to receive the location of each cow (or several cows) as well as the identification of the same (i.e., the cow number) and to provide the user of the system with the information as for in which cell the cow is located as a function of time.

According to a preferred embodiment of the present invention, the data processing system can receive the location of each cow (or several cows) as well as the identification of the same (i.e., the cow number) and average said location so as to provide the user of the system with the information as for in which cell the cow is located as a function of time.

In some embodiments of the system wherein the progress of cows through a milking parlor is tracked, preferably, the system will, at minimum, identify, for each cow in the herd, that it has entered the milking stall, the stall in which it is milked, and that it has left the milking stall. Other data that can be collected include, but are not limited to: that it has entered the milking parlor, the time it enters the milking parlor, the time it enters the milking stall, the time it leaves the milking stall, that it has left the milking parlor, the time it leaves the milking parlor, the amount of time spent in the parlor, the amount of time spent in the stall, the amount of milk given, the number of cows in the parlor at any time, the location of the cows at any given time, and the relative locations of the cows such as the closeness of individual cows to each other.

The system further comprises a data processing system to store these data and to analyze them. With the addition of sensors such as, for non-limiting example, heat sensors or pressure sensors, other data such as, but not limited to, the cow's temperature or weight or the udder temperature can be collected, attributed to the individual cow, and analyzed.

In some embodiments of the systems, the locations of the cows in the milking parlor are determined by the UWB locating means, without there being any need for identification means, either RFID or other smart tags or optically-readable identifiers, in the milking stalls or, in some embodiments, on the cows. In these embodiments, the UWB locating means determines the locations of the cows. Since the distance between stalls is known to the system, the stall the cow has entered can be determined.

In preferred embodiments of the system, each animal has a unique identifier, with the identification means which comprises the identifier at least semi-permanently associated with the animal.

The identification means can be a marking, such as a brand or tattoo inscribed into the animal's skin. It can be a tag, either a "dumb" tag or a smart tag. The tag can be optically, mechanically or electronically readable, or any combination thereof. A non-limiting example of an electronically-readable smart tag is an RFID tag. The tag can be attached to the animal such as, for non-limiting example, as an ear tag or a nose ring, or can be worn on the animal, for example, as part of or attached to a collar, halter, harness or belly band. The identification means can be implanted in the animal, for non-limiting example, as a microchip, or it can be held within the animal, for non-limiting example, as a bolus inside the animal's digestive system, its reproductive system, or its urinary system. Any combination of the above can be used as the identification means for the animal.

In some embodiments of the system, the milking robot comprises sensors to determine at least one of: the amount of milk given by the cow during the milking session and the quality of the milk. Milk quality can be determined from, for non-limiting example, light transmission through the milk, specific gravity of the milk, amount of sugar in the milk, amount of fat in the milk, amount of protein in the milk, and any combination thereof.

In embodiments of the system comprising an identification means for identifying individual cows, the quality and quantity of the milk can be tracked over time, so that increases or decreases in milk production can be identified. Sudden decreases in milk production, for example, can be the result of general ill-health in the animal. Decreases in milk production in a single nipple can result from either illness (such as, but not limited to, mastitis), or injury. In general, the sooner ill-health or injury is identified, the more effectively it can be treated.

In some embodiments, sensors on or near the milking robot measure the temperature of at least one location on the udder, and preferably measure the temperature of each quarter of the udder. In some variants, sensors on or near the milking robot or in or on the milking stall measure the body temperature of the cow. Abnormal temperatures can be indicators of general ill-health or of diseases of the udder, such as mastitis.

In some embodiments, pressure sensors in the milking stall measure the weight of the cow. Unusual changes in weight can indicate ill-health.

If suspected ill-health is determined, help can be provided more rapidly because the location of the animal is known; a caregiver such as a veterinarian can be informed which cow needs treatment or other intervention. Treatment or other intervention can be provided while the animal is in the stall or, since the system can track the cow after departure from the milking stall, treatment or intervention can alternatively or additionally be provided after the cow has left the stall. For non-limiting example, a stockman can intercept the animal as it leaves the milking parlor, intercept it within the milking parlor, or intercept it after it has left the milking parlor.

In some embodiments, the means of information is an audible or visual indication provided when a caregiver is within a predetermined distance of the cow needing intervention, thereby assisting the caregiver in tracking the animal.

In some embodiments, means of information is a hand-held or head-mounted device in communication with the data processing system; in others, the indicator is mounted within the milking parlor, for non-limiting example, on a wall or ceiling or on or in the fittings of the parlor. If the device is hand-held or mounted on the caregiver's body, the indicator can be tactile.

A visual indicator can be a light of a constant, predetermined color, a light with color varying in a predetermined color pattern, a light varying in brightness, light of a predetermined pattern such as a word or words and any combination thereof. The light can change in brightness or color, in rapidity of brightness change or rapidity of color change or the predetermined pattern can change (e.g., the words change) as the distance between the caregiver and the animal changes.

An audible indicator can be a constant-pitch sound, a constant-loudness sound, a varying-pitch sound, a varying-loudness sound, or a sound of a predetermined pattern such as, but not limited to, a voice message. The sound can change in loudness or pitch, in rapidity of loudness change or rapidity of pitch change, the predetermined sound pattern can change or any combination thereof as the distance between the caregiver and the animal changes. For non-limiting example, the predetermined sound patterns can be words such as "five feet", "four feet", "3 feet", "2 feet", and "one foot".

In some embodiments, the indicator depends on the reason for the intervention. For non-limiting example, a lame animal could be indicated by a green light, an animal with a fever by a yellow light, an animal with inflamed udder by a blue light, an animal in estrus by an orange light, or animals fighting by a red light. Similarly, a lame animal could be indicated by a constant, low tone, an animal with a fever by a slow beep, an animal with inflamed udder by a fast beep, an animal in estrus by a two-tone beep and animals fighting by a loud, high-pitched fast beep.

Tactile warnings can also be provided. In some embodiments, vibration of a hand-held device can indicate to a user that intervention is needed, that a cow or cows has finished milking and should be released, that the user is approaching the correct cow (e.g., for intervention), or any combination thereof.

The indicator can be on a display, it can be on the animal, it can be part of a hand-held device and any combination thereof.

In some embodiments, after the cow has given the average amount of milk for a milking session, or a predetermined desired amount of milk, the milking robot will automatically release the cow from the robot. The average can be calculated from the amounts given by the same animal during previous unrestricted milking sessions. In other embodiments, milking continues until the flow rate of milk substantially decreases, for non-limiting example, the flow rate decreases by 50%, or by any other predetermined amount.

In some embodiments, the system additionally comprises a sensor, RFID tag or smart tag on each cow and can also include at least one of a light source or sound source. The at least one of a light source or sound source can be activated if the animal needs intervention.

In some embodiments, as described hereinabove, the light source or sound source can lead the caregiver to the animal.

In some embodiments, the light source or sound source can indicate, as described hereinabove, the nature of the animal's problem, for non-limiting example, by saying "hot udder" if a raised temperature is found in an udder, or "hot quarter" if only one quarter is hot. Many such phrases will be obvious to one skilled in the art.

In some embodiments, an identifier of the cow and/or the nature of the problem are shown on a display, which can be, for non-limiting example, on a wall in the milking parlor, on a display screen in the milking parlor, on a display screen at a remote location, on a hand-held device, or any combination thereof.

In some variants, the display can comprise an identifier of the cow and the amount of milk given.

Any combination of the above can be included in the display.

In some variants, each individual animal is released from the milking stall when milking is complete. In other embodiments, all animal are released at the same time, after milking of all animal is complete. In yet other embodiments, if an animal needs treatment, release of that animal is delayed until intervention, such as treatment, is complete, while other animals are released either as a group or when milking of an individual animal is complete. In still other embodiments, no animal is released until all cows needing intervention have been dealt with.

In some embodiments wherein animals are released individually, each time an animal is released and is permitted to leave the milking parlor, another animal is enabled to enter the milking parlor, enter a milking stall and be milked, so that animals, in general, enter individually and leave individually. In other embodiments, a new group of animals is enabled to enter the milking parlor only after all of the previous group has left the milking parlor.

In yet other embodiments, all cows needing intervention are kept in milking stalls until all animals not needing intervention have left the milking parlor. No new animals are permitted to enter the milking parlor until intervention has been completed for the retained animals and these animals have left the milking parlor.

Other combinations of allowing animals to enter the milking parlor, allowing animals to enter the milking stalls, allowing animals to leave the milking stalls and allowing animals to leave the milking parlor will be obvious to one skilled in the art.

In some embodiments, any combination of the following can be monitored: the way the animal walks, the time taken for the animal to move from the entrance to the milking parlor to the milking stall, the time taken for the animal to move from the milking stall to the exit from the milking parlor, whether the animal lies down, and the distance between any given animal and other animals.

Abnormalities in the way the animal walks and changes in the animal's walking pattern can indicate both systemic illnesses and local illnesses (e.g., lameness or udder inflammations). Abnormalities or changes in times taken to get to the milking stall or to leave the milking stall or the milking parlor can indicate illness, debility, or problems such as sore nipples.

Lying down for an unusual length of time or at an unusual time of day can, again, indicate illness or debility.

Changes in movement patterns can also indicate estrus.

Animals that are too close together can indicate estrus in one of them, or can indicate that the animals are fighting.

In some embodiments, the location means are placed in a barn, pen, milking parlor or field and the movements of the animals are tracked over longer time periods. In such embodiments, at least one of the following can be tracked: the position of the animal within the barn, pen, milking parlor or field, its position relative to a fixed object, and its position relative to at least one other animal. In preferred embodiments, these can be stored as an xyz position.

From these, in conjunction with the locations within the space of fixed objects, the following can be determined: the change in position of the animal, the change in its position relative to a fixed object, and the change in its position relative to at least one other animal, and the speed of change of the position of the animal, the speed of change in its position relative to a fixed object, and the speed of change in its position relative to at least one other animal can be found, as well as the way the animal walks, the speed of movement, how often the animal lies down and for how long, how often it goes to a drinking trough and how long it spends there, how often it goes to a food supply area such as a feeding trough or hayrick and how long it spends there, and how often it approaches other animals, how long it spends close to the other animal and how close it comes to the other animal.

In preferred embodiments, users can be informed of at least one of: the change in position of the animal, the change in its position relative to a fixed object, and the change in its position relative to at least one other animal, and the speed of change of the position of the animal, the speed of change in its position relative to a fixed object, and the speed of change in its position relative to at least one other animal can be found, as well as the way the animal walks, the speed of movement, how often the animal lies down and for how long, how often it goes to a drinking trough and how long it spends there, how often it goes to a food supply area such as a feeding trough or hayrick and how long it spends there, and how often it approaches other animals, how long it spends close to the other animal and how close it comes to the other animal.

From these data, at least one of the following can be determined: whether the animal is in estrus; whether it is involved in a fight; whether it is suffering from debility; how much it eats; how much it drinks: if there is more than one source of food (such as both hay and cattle feed), what it is eating; whether it is lame; whether it has an inflammation or soreness in or on the udder; whether it is ill (sick animals often go "off their food"), whether it is being attacked—if a number of animals are running in the same direction, it can indicate that a dog or other predator has entered the field where the animals are kept.

Abnormal behavior such as the above can be identified if the amount of time spent by the animal in performing any of the types of behavior indicated hereinabove changes by more than a predetermined amount.

In preferred embodiments, users can be informed of: whether the animal is in estrus; whether it is involved in a fight; whether it is suffering from debility; how much it eats; how much it drinks; if there is more than one source of food, what it is eating; whether it is lame; whether it has an inflammation or soreness in or on the udder, whether it is ill and whether it is being attacked, or any combination thereof.

Figure 2:
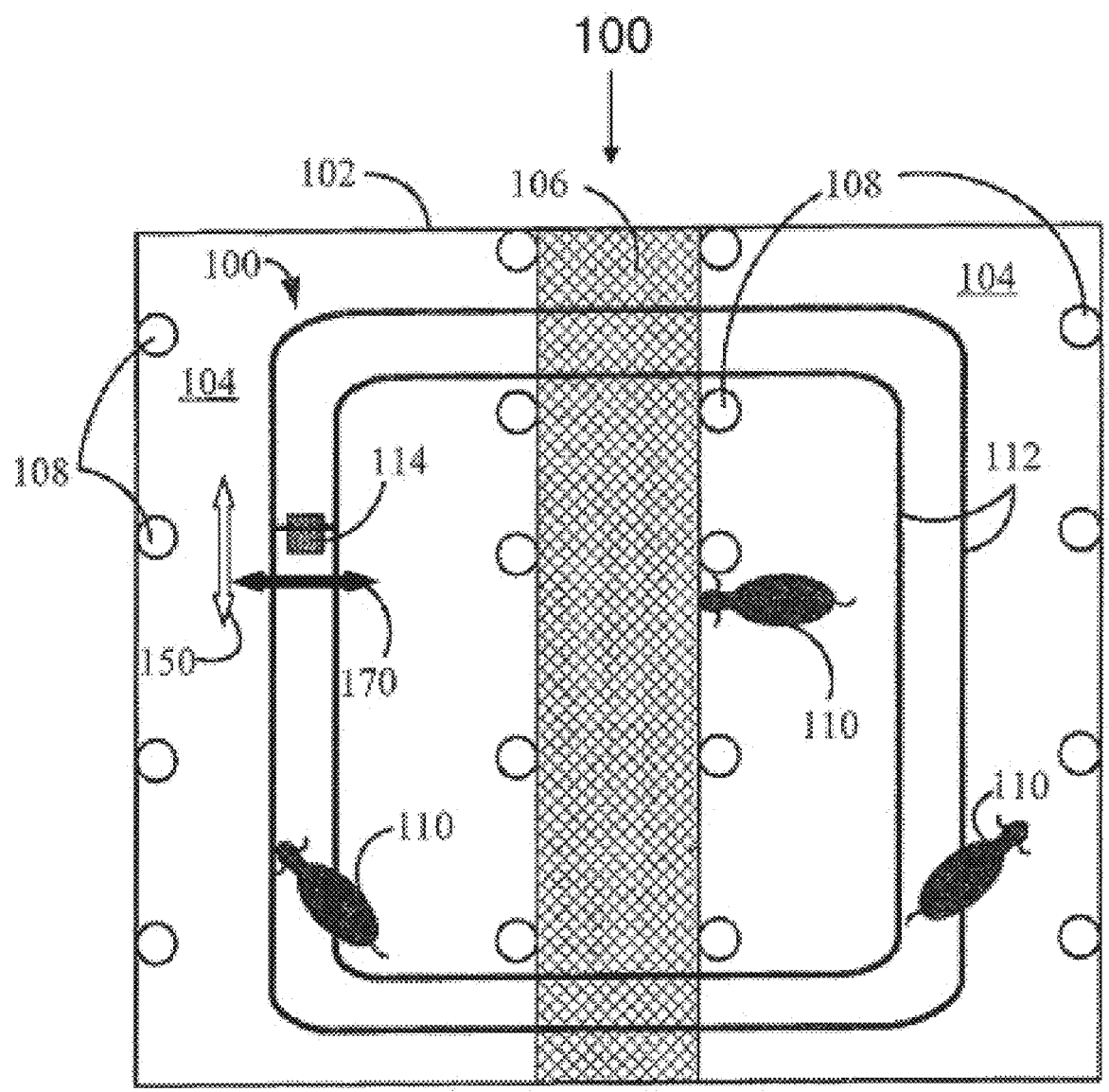

In some embodiments, the system additionally comprises an automatic animal retrieval system, Referring now to FIG. 2, which is a schematic illustration of an embodiment of an automatic animal retrieval system 100 as viewed from above. In FIG. 2, the roof has been removed for the purpose of illustration and to reveal the retrieval system 100.

A typical dairy farm cow shed 102 commonly includes one or more fenced-in lots 104 separated by a driveway 106. A shed 102 commonly also includes support poles 108 supporting the roof (not shown). Cows 110 are free to move within lots 104.

In some embodiments, system 100 comprises one or more elevated rails 112 suspended from the roof (not shown) or suspended from or attached to support poles 108 or from dedicated poles (not shown).

In other embodiments, system 100 comprises at least one low-level mobile maneuvering device.

The shed commonly is adjacent to and abutting a milking parlor or, alternatively, the shed includes a gateway and a chute or pathway leading to a milking parlor, a truck or any other location. One or more trolleys 114 can be translatable along rail 112 as indicated by white arrow 150 and/or be translatable across a bridge 116 between at least two rails, as indicated by black arrow 170, bridge 116 itself being translatable along rail 112 as indicated by white arrow 150.

Figure 3:
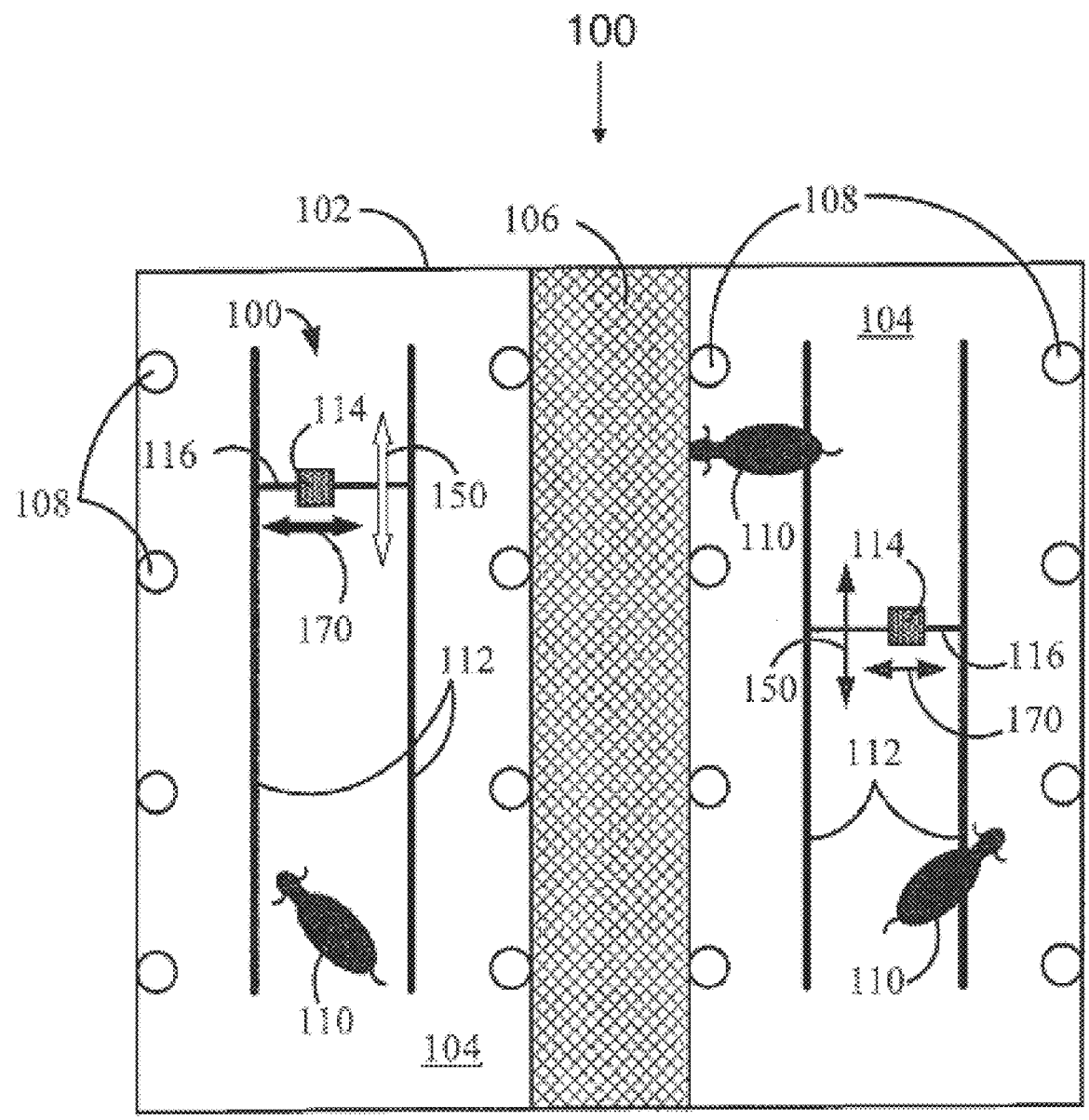
FIG. 3 is a simplified illustration of an embodiment of an automatic animal retrieval system as viewed from above.

As shown in FIG. 3, a schematic illustration of another embodiment of an automatic animal retrieval system 100 is viewed from above. System 100 can comprise one or more pairs of rails 112 suspended from the roof (not shown) or suspended from or attached to support poles 108.

As in FIG. 2, one or more trolleys 114 could be translatable along rails 112 and/or translatable across bridge 116 between at least two rails, which itself could be movable along rails 112 as indicated by corresponding black arrow 170 and white arrow 150.

In embodiments with a low-level mobile maneuvering device, the low-level mobile maneuvering device is adapted to move along at least one of a group consisting of a floor and the ground. The low-level mobile maneuvering device is moveable across a floor or across the ground, using any conventional system, such as, but not limited to, at least one wheel, an air cushion levitation system, a magnetic levitation system, or any combination thereof, to enable it to move. The low-level mobile maneuvering system will also comprise means of locating obstacles in its path such as other animals or fixed objects. In some embodiments, the means of locating obstacles comprises at least one sensor; in other embodiments, the animal location system described hereinabove is used. In yet other embodiments, both are present.

Typically, the low-level mobile maneuvering system will be free-standing. Preferably, it will contain a power source and so will not need, during use a physical connection to any other device or object. Examples of connections not needed are power cables and fuel delivery hoses.

All embodiments of the maneuvering device will also comprise a cow stimulating device 132, mounted on a trolley (114). The trolley can be built into or attachable to maneuvering device.

Figure 4:
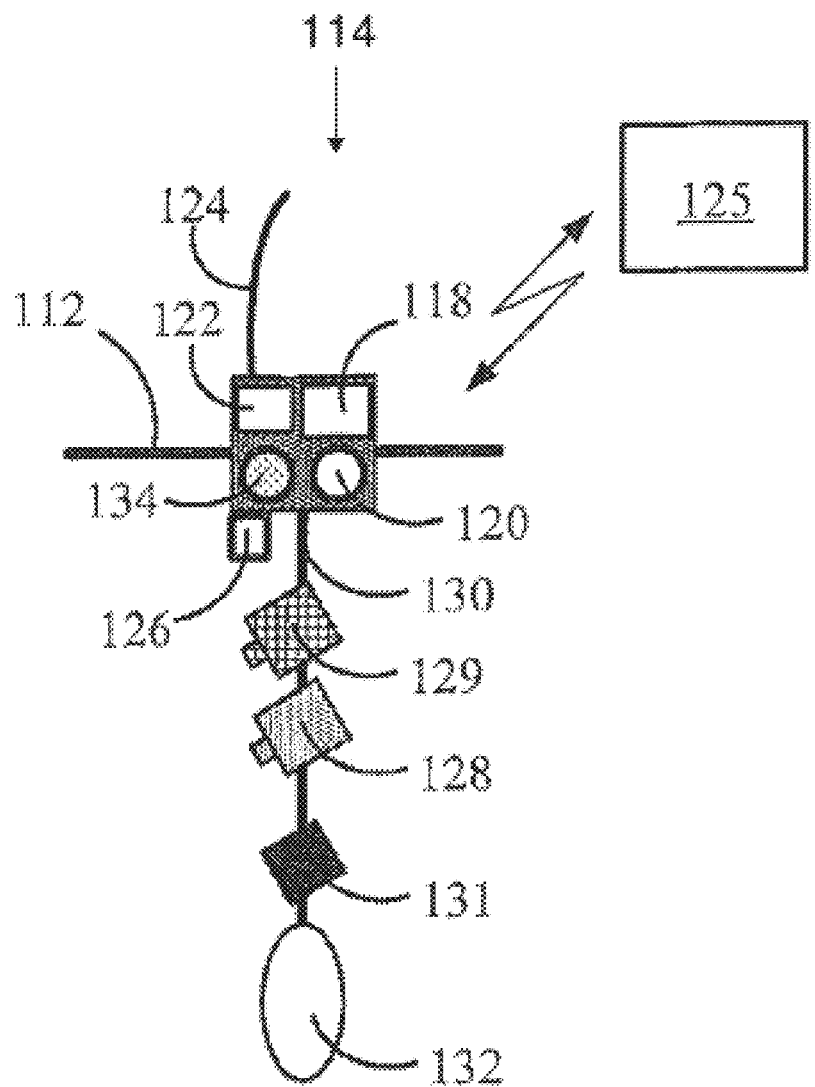
FIG. 4 is a simplified diagram of an embodiment of a trolley.

Reference is now made to FIG. 4, which is a schematic diagram of an embodiment of a trolley 114. Trolley 114 can carry a carrier arm 130 carrying a cow stimulating device 132 and can include one or more controllers 118 operative to activate a motor 120 propelling trolley 114 along rails 112. Additionally and optionally, trolley 114 can include an air compressor 134. Alternatively and optionally, compressed air can be supplied from a central compressor.

Trolley 114 also includes a transmitter/receiver 122 and an antenna 124 to receive information from and transmit information to the animal location system described hereinabove.

In some embodiments, in addition to the animal location system, trolley 114 also comprises at least one cow 110 identification and verification device, such as an RFID reader 126 operative to read an RFID tag attached to cow 110, a camera 128, a barcode reader 129 or an optic sensor 131.

Referring now to FIGS. 5A-G, which show elevated side view schematic illustrations of several embodiments of cow stimulating devices 132. Cow stimulating devices 132 shown in FIGS. 5A-G are designed to stimulate and urge a cow 110 (FIGS. 1 and 2) to get up (when recumbent) and/or walk towards a desired location. In the following examples, a milking parlor is described as the desired location. However, such a location should not be read as limited to a milking parlor and could be understood as any location to which a farmer would commonly move a cow such as a milking parlor, a chute, a gate or any other similar location.

In some embodiments, trolley 114 of system 100 is adapted to follow a cow 110 not heading in the direction of the milking parlor, employing animal location systems as described hereinabove and further stimulating cow 110 to head in the correct direction by employing stimulation devices 132.

Figure 5A:
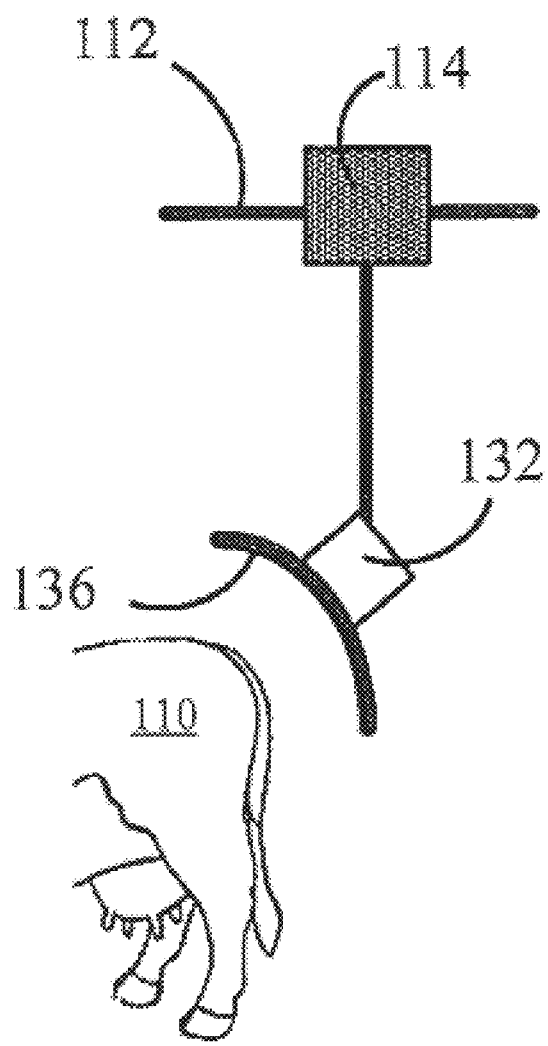
FIGS. 5A-G are elevated side-view simplified illustrations of an embodiment of cow stimulating devices.

As shown in FIG. 5A, a cow stimulation device 132 could include a speaker 136 generating sounds known to be disturbing to a cow.

Figure 5B:
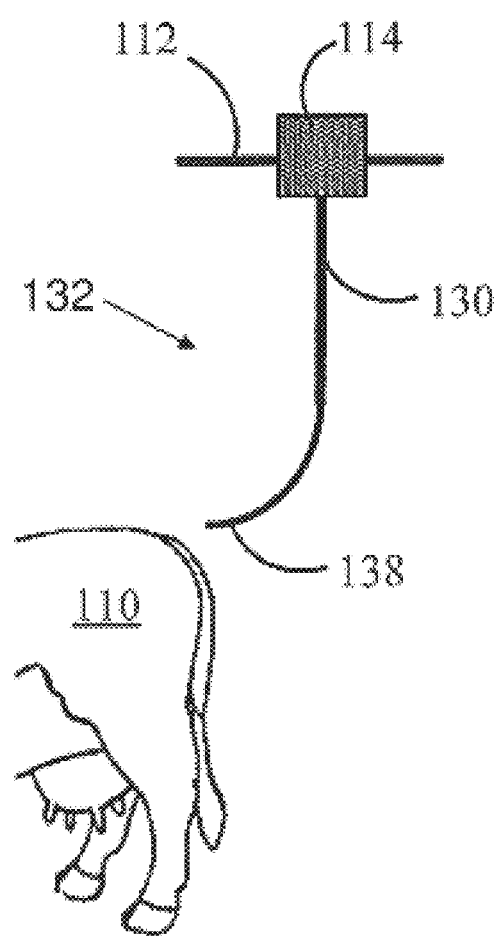

Another example of a cow stimulation device 132, depicted schematically in FIG. 5B, is a low voltage electrical conducting wire 138 generating a low non-painful voltage upon contact with the cow sufficient to initiate getting up (when recumbent) and/or walking towards the milking parlor.

Figure 5C:
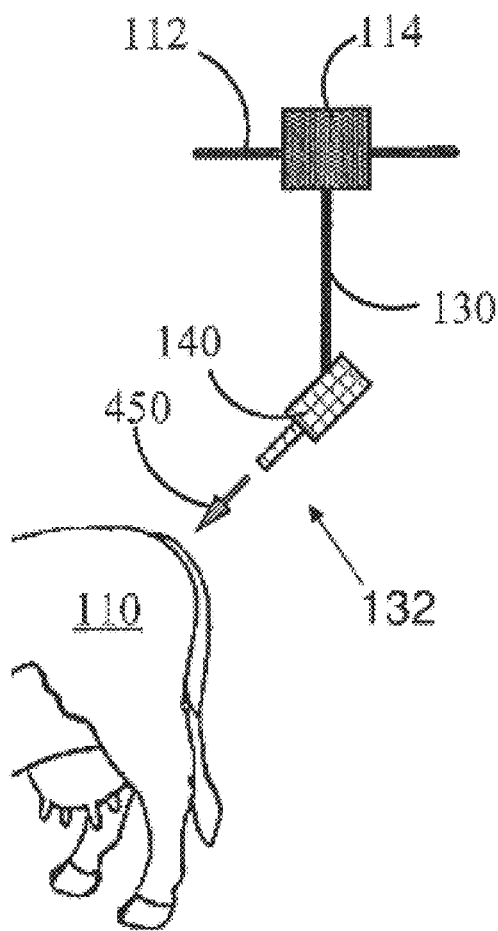

A third example of a cow stimulation device 132, schematically illustrated in FIG. 5C, is an air gun 140 operative to blow a stream of compressed air indicated by a grey arrow 450.

Figure 5D:
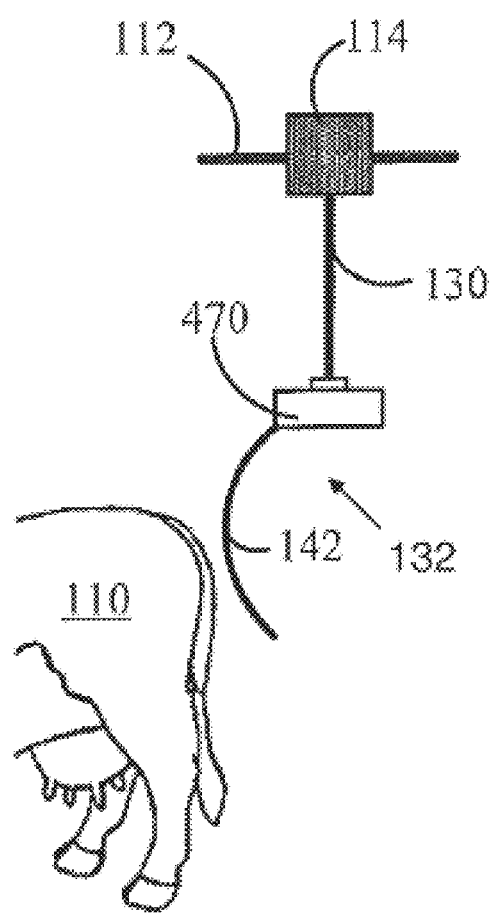

As shown in FIG. 5D, in another embodiment, cow stimulation device 132 also includes a rotating bullwhip 142 attached to a horizontally rotating motor 470 so that when motor 470 slowly rotates, bullwhip 142 could gently whip a cow 110 recumbent or standing in close propinquity thereto.

Figure 5E:
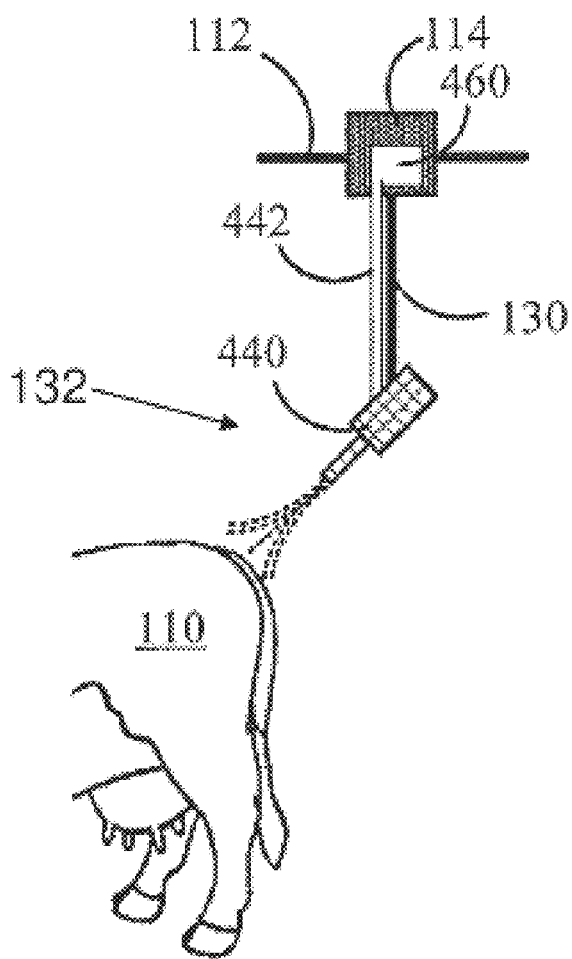

FIG. 5E depicts an embodiment similar to that shown in FIG. 5C, however air gun 140 is replaced with a water gun 440 supplied from a water reservoir 460 via a water conduit 442. Water reservoir 460 can be refilled when trolley 114 arrives at a docking station (not shown).

Figure 5F:
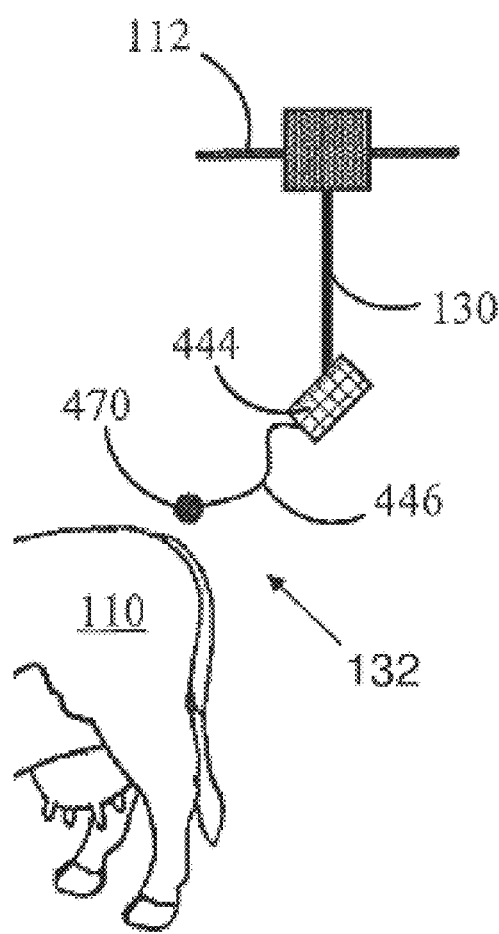

As shown in FIG. 5F, stimulating device 132 could be a soft ball 470 attached to a tether 446 and propelled in a direction of a cow 110 from a propulsion ball gun 444. Preferably, tether 446 of soft ball 470 can be pulled back into gun 444 to enable ball 470 to be reused as necessary.

Figure 5G:
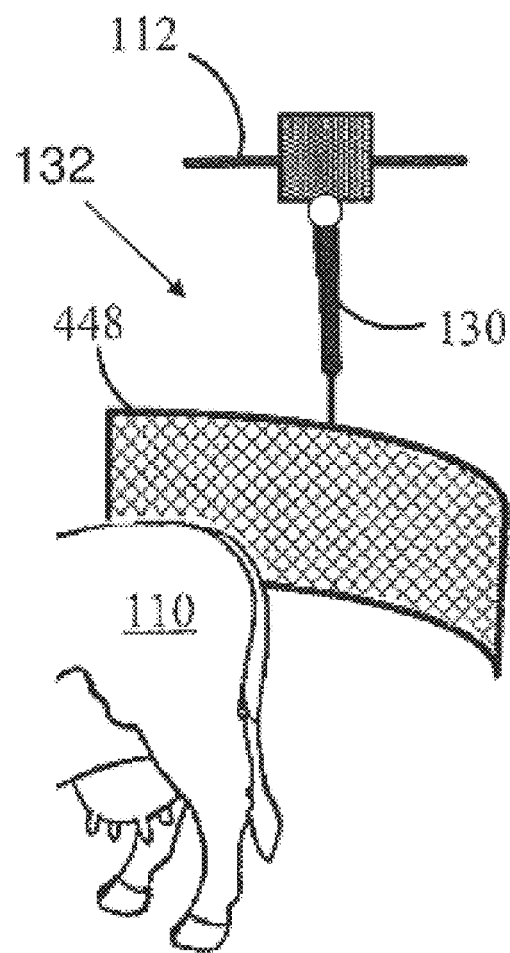

Alternatively and optionally, and as shown schematically in FIG. 5G, stimulation device 132 can be a cow driving fence 448 that could be lowered by a telescopic arm 130 behind a cow 110. Translating trolley 114 can then drive a cow 110 in a desired direction. Cow driving fence 448 can be flat or in the form of a semi-circle as shown in FIG. 5G. Alternatively and optionally, cow driving fence 448 can form a complete circle, completely surrounding a cow 110 when lowered by telescopic arm 130 around cow 110. Driving fence 448 can be lowered so that the bottom margin thereof is at a height of approximately between 40 cm to 100 cm above ground level.

Figures 6A, 6B:
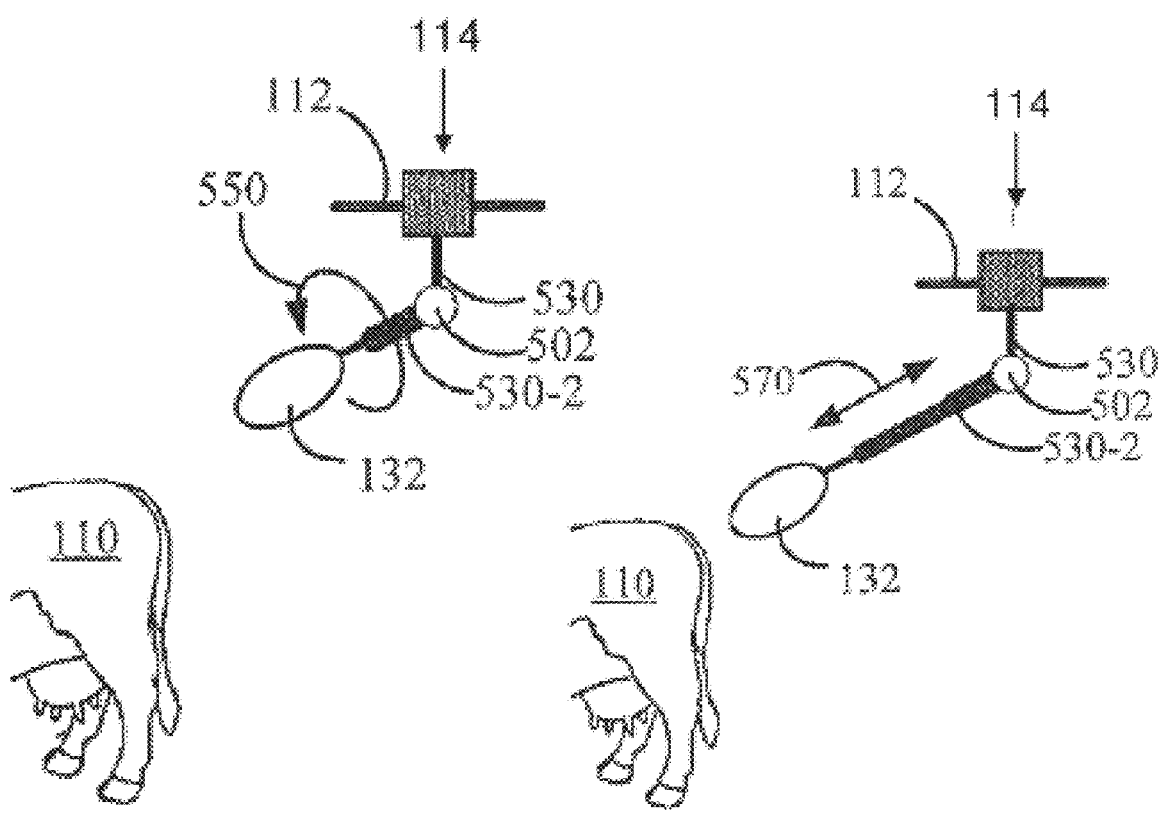
FIGS. 6A-B are side view simplified illustrations of an embodiment of a carrier arm.

Referring now to FIGS. 6A-B, which are side view schematic illustrations of an embodiment of a carrier arm 530. Carrier arm 530 can be an articulated arm including one or more segments 530-1 and 530-2 connected to each other by a joint 502. Segments 530-1 and 530-2 can be connected to each other at a fixed angle or be rotatably moveable relative to each other as indicated by curved arrow 550 (FIG. 6A). The movement of segment 530-2 relative to segment 530-1 can be carried out by a motor such as a servo motor (not shown) in joint 502 controlled by controller 118 (FIG. 4).

Additionally and optionally, segment 530-2 can be a telescopic arm operative to extend as shown by the double-ended arrow 570 in FIG. 6B. Additionally and optionally, one or more of segments 530-1 and 530-2 can be telescopic, extendible and retractable as indicated by the double-ended arrow 570. The extension and retraction of telescopic segments 530-1 and/or 530-2 can be carried out by a motor such as a servo motor (not shown) in segment 503-2 or joint 502 controlled by controller 118 (FIG. 4).

Figure 7A:
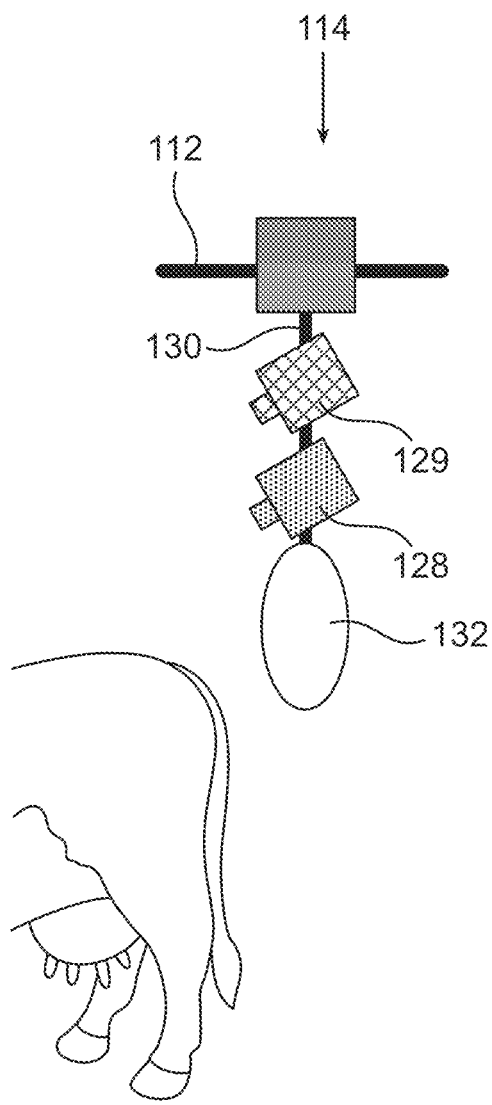
FIGS. 7A-C are simplified illustrations of an embodiment of a trolley and stimulating device.
Figure 7B:
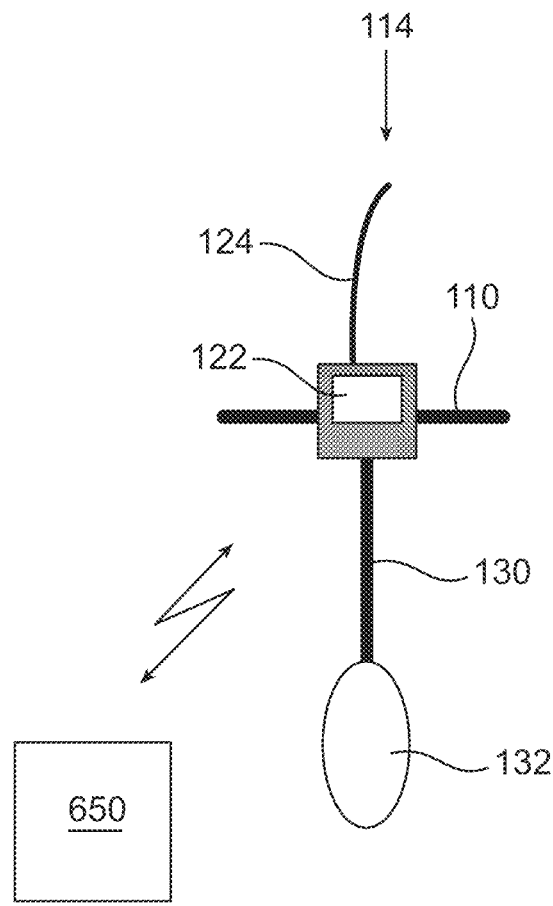

Referring now to FIGS. 7A-B, which are schematic illustrations of two embodiments of a trolley 114 and stimulating device 132. System 100 can additionally and optionally include a cow identification verification device 602. Such a device can identify an individual cow by, for example, capturing one or images thereof and/or identifying a tag 650 attached to a cow 110. As depicted in FIG. 7A, verification device 602 can be a camera 128 communicating an image of cow 110 to computer 118 in trolley 114 or, alternatively and optionally, a UPC (Universal Product Code) reader known as barcode reading device 129 operative to read a barcode placed, for example, on a cow 110 (e.g., on the cow's collar or nose) or stamped on a tag 650 attached to the cow.

Alternatively and optionally and as illustrated in FIG. 7B, verification device 602 can be a receiver/transmitter 604 communicating with a tag 650 such as, for example, a low power consumption electronic tag such an Animal Transmit/Receive Unit (ARTU) described in Assignee's US Patent Application No. 2012/0112917.

An ARTU, as described in the above reference, can be housed in a mobile tag housing, such as tag 650 (FIG. 7B), having a cover and attached to or placed inside an animal to wirelessly receive/transmit data. The ARTU can include a source of power, such as a regular or rechargeable battery or any other source of power light in weight and small enough to enable it to be carried by or inside an animal. Such an ARTU can also be lightweight, small and have an average power consumption less than 0.5 mW.

Figure 7C:
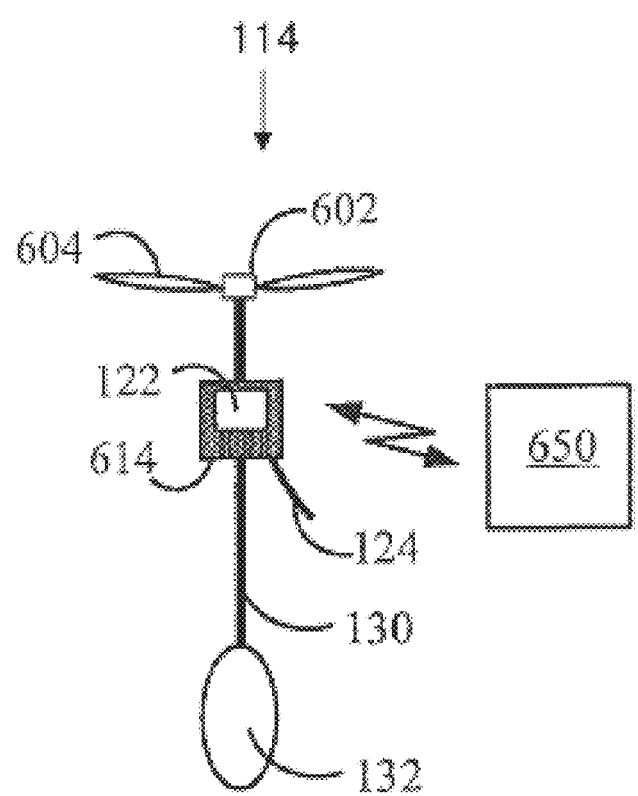

As shown in FIG. 7C, trolley 614 carrying stimulating device 132 can include hovering capabilities and be autonomous of rails 112 (FIG. 2). Trolley 614 can include an electric motor 602 driving a rotor 604 controllable by controller 118 or remotely controllable by computer 125 via antenna 124. Trolley 614 can also optionally include a horizontal obstacle detection device (not shown) enabling trolley 614 to automatically avoid obstacles such as poles, electric wires, etc. Trolley 614 can include all the above described stimulating devices 132 and an identification verification device such as an RFID reader 126, a camera 128, a barcode reader 129 and an optic sensor 131.

Reference is now made to FIGS. 8A-D, which are schematic illustrations of embodiments of a trolley and stimulating device. Arm 130 of trolley 114 can include a cow latching mechanism 750 including a latch 702 reversibly engageable with a latch receiver 704 attached to a collar of a cow. Latch 702 can engage with latch receiver 704 so as to tug on the collar of cow 110, pulling, urging and driving cow 110 in the desired direction.

Figures 8A, 8B:
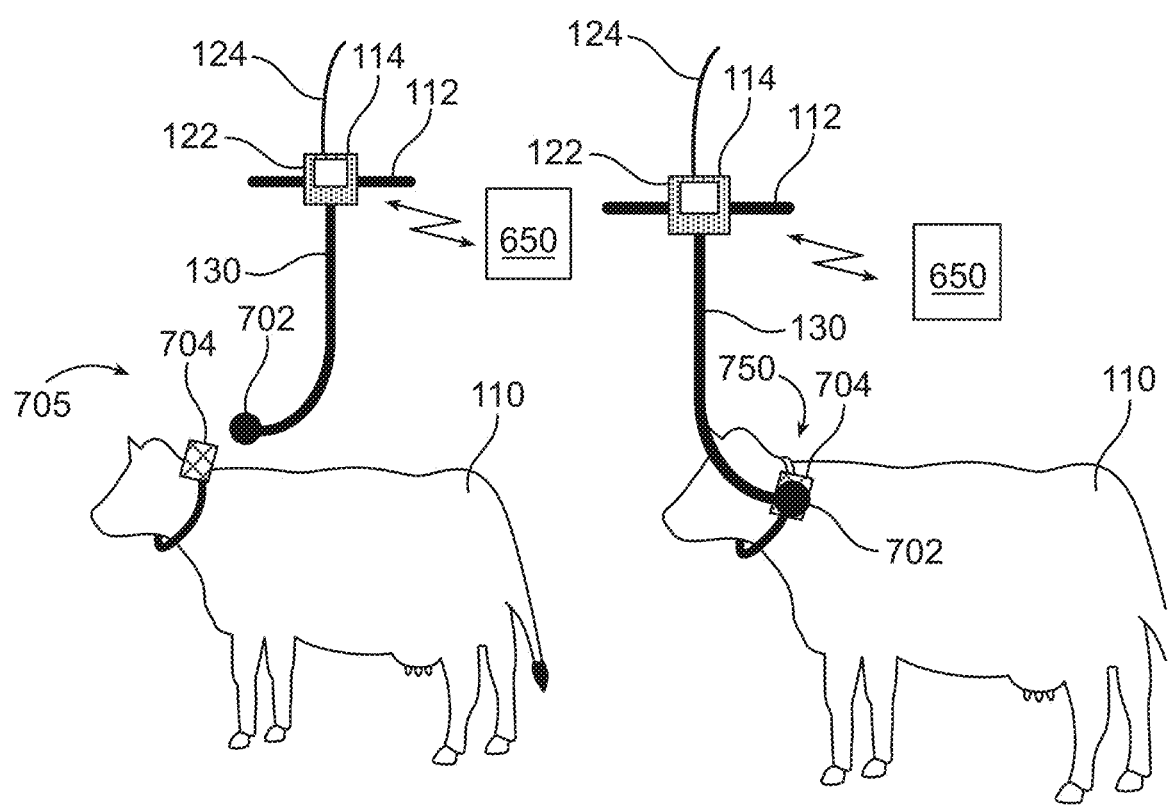
FIGS. 8A-D are simplified illustrations of an embodiment of a trolley and stimulating device.
Figure 8C:
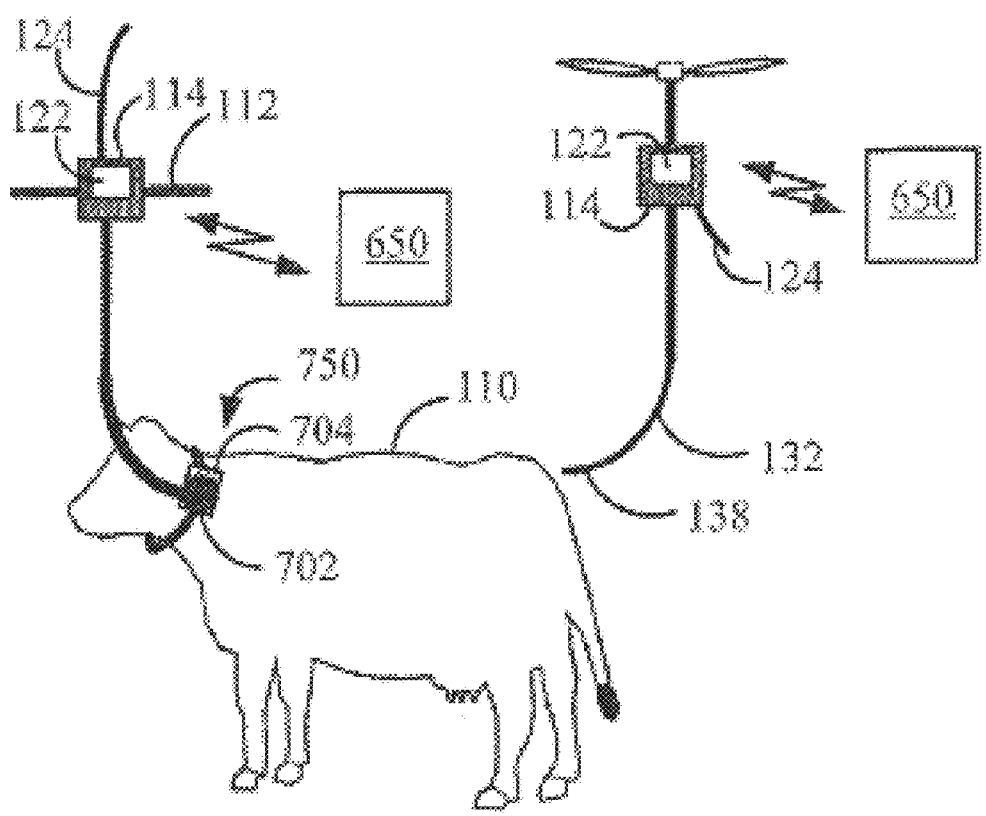

As shown in FIG. 8C, cow latching mechanism 750 could be employed together with any one of the cow 110 stimulating devices 132 described above.

As shown in FIGS. 8A-B, latch receiver 704 can be, for example, a magnet, whereas latch 702 can be, for example, an electromagnet controlled, for example by controller 118 in trolley 114 or remote computer 125. The magnetic attraction forces generated between latch 702 and latch receiver 704 can be designed to enable tugging on cow 110 collar but operative to detach from each other should cow 110 begin to resist and develop aberrant behavior so as to prevent any injury to the cow 110.

Figure 8D:
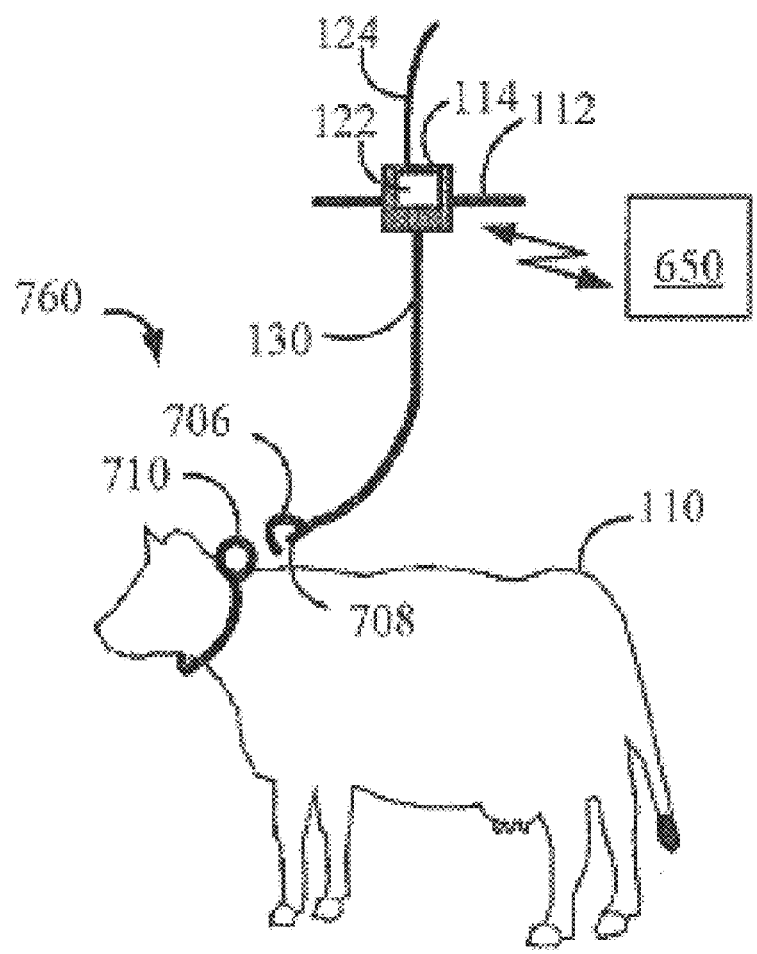

FIG. 8D illustrates another example of a cow latching mechanism 760. As shown in FIG. 8D, latch 706 can be a hook closed with a bias-controlled or electrically controlled tongue 708. Optionally, tongue 708 can be controlled by controller 118 or by computer 125. Latch receiver 710 can be a ring attached to the collar of cow 110.

Cow latching mechanism 760 can be designed to enable tugging on the collar of cow 110 but operative to allow latch 706 and latch receiver 710 to detach from each other should cow 110 begin to resist and develop aberrant behavior so as to prevent any injury to cow 110. Optionally, latch receiver 710 can be designed to tear when stressed by forces greater than normal such as when cow 110 resists and develops aberrant behavior so as to prevent any injury to cow 110.

Figure 9:
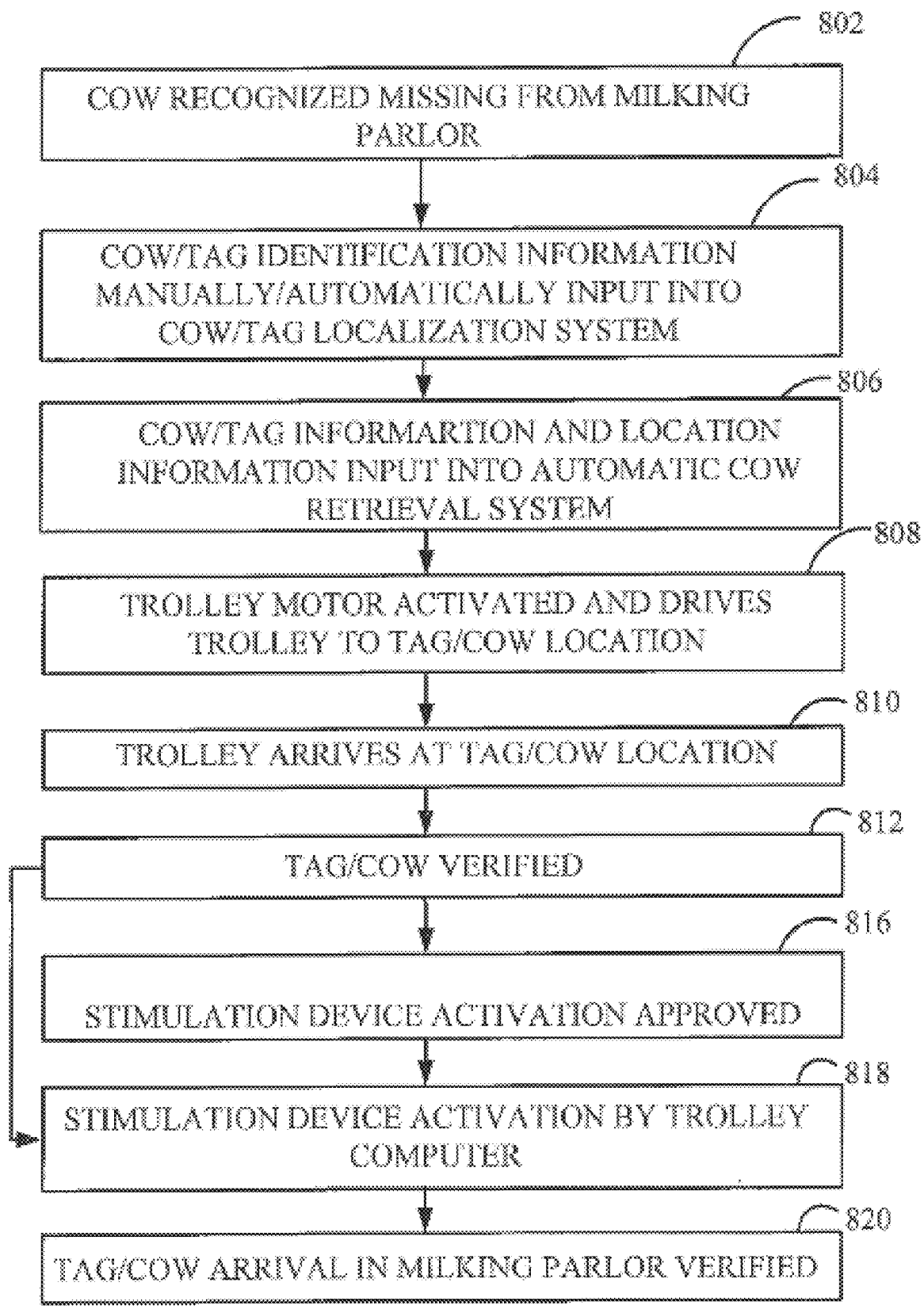
FIG. 9 is a block diagram of an embodiment of an automatic retrieval of a cow by the automatic animal retrieval system.

Reference is now made to FIG. 9, which is a block diagram of an embodiment of an automatic retrieval of a cow by a cow localization system such as described hereinabove in communication with automatic animal retrieval system 100. Preferably, system 100 is adapted to receive the current location of the cow 110 (e.g., geographical coordinates or location on a predetermined map grid), receive a destination location for cow 110 (e.g., geographical coordinates or location on a predetermined map grid) and automatically drive cow 110 from the current location to the destination location.

In the embodiment shown in FIG. 9, when a cow 110 is recognized to be missing from the milking parlor (802), either automatically or by the dairy farmer, cow 110 identification data, such as barcode number or tag 650 identification information can be manually or automatically input into the cow localization system (804), which in turn localizes tag 650 or cow 110 (806).

Data regarding tag 650 identifying cow 110 location can be manually or automatically input into system 100 (806), computer 118 or, transmitted to computer 118 from remote computer 125 via transmitter/receiver 122, which activates trolley 114 motor 120 propelling trolley 114 along elevated rails 112 driving trolley 114 carrying a carrier arm 130 and a cow stimulating device 132 to the location of cow 110 (808). Cow 110 identification is carried out by the cow localization system described hereinabove.

Upon arrival at the tag 650/cow 110 location (810), cow 110 the localization system verifies (812) that the trolley has reached the correct cow.

Once verification is complete (816), the cow stimulation device (818) is activated to stimulate and urge cow 110 (FIGS. 1 and 2) and, optionally, adjacent cows 110 to get up (when recumbent) and/or walk towards the milking parlor. Once cow 110 arrives in the milking parlor, the localization system verifies (820) that the cow has reached its destination.

Figure 10:
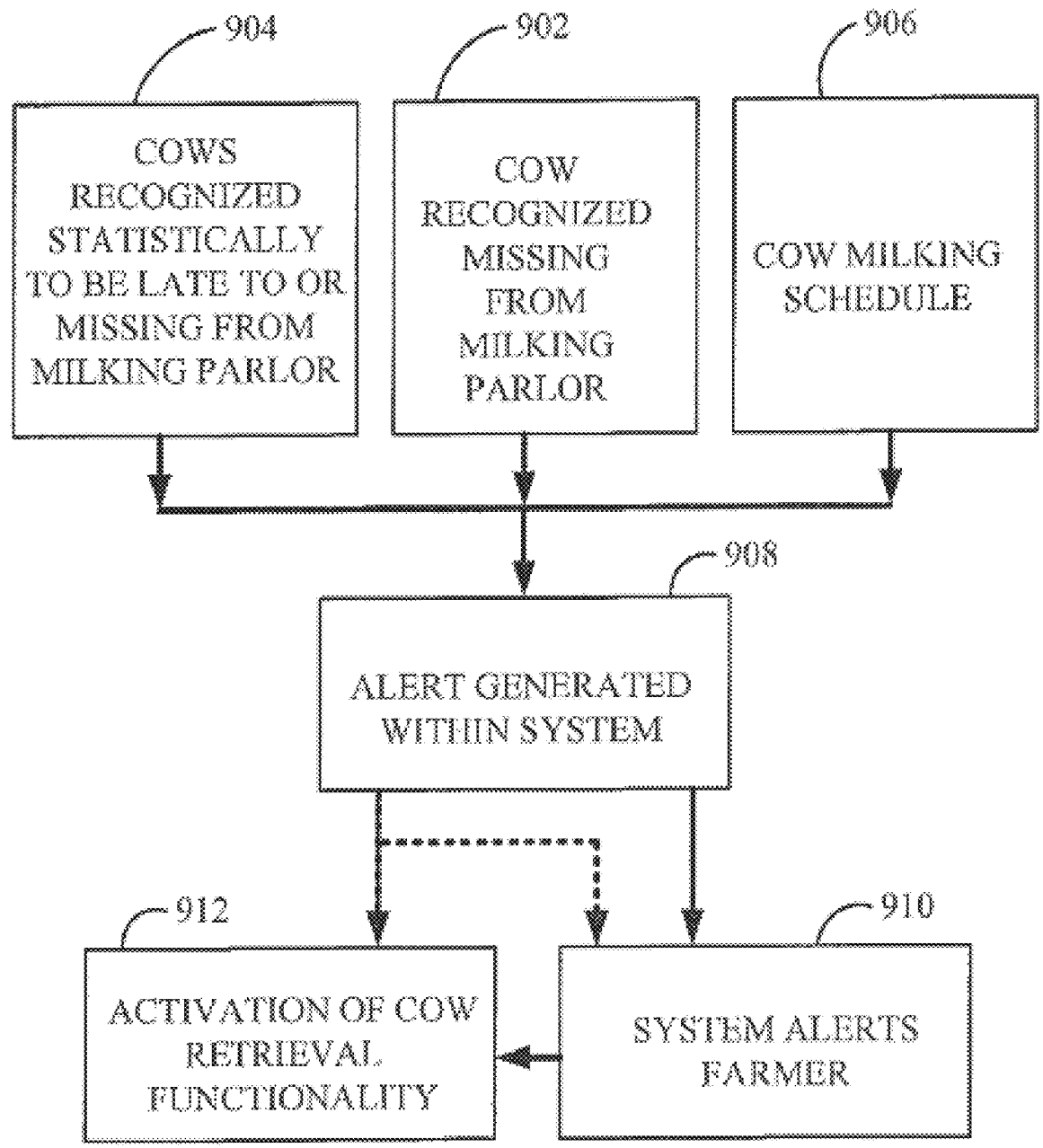
FIG. 10 is a flowchart of alert generation and activation of an embodiment of the automatic animal retrieval system.

Referring now to FIG. 10, which is a flowchart of an embodiment of alert generation and activation for automatic animal retrieval system 100. An alert can be generated in several circumstances.

For example, a cow 110 can be identified missing from the milking parlor during the time slot dedicated to milking that specific cow (902).

Another example is a cow being statistically late or missing (i.e., skipping milking time slots) from the milking parlor (904). The processing system 125 can collect data over a period of time regarding the arrival of and milking of cow 110 at the milking parlor and can generate statistical information regarding cows regularly tardy or missing from the milking parlor. In a manually run dairy farm, farmers, for various reasons, often opt to allow these cows to skip their milking time slot, which cumulatively results in reduced milk production over time. This system of the present invention prevents loss of milk production by automatically retrieving obstinate cows.

A third example could be a daily milking schedule of the dairy farm's resident cows 110, input manually or automatically into the system (906). The system can be adapted to identify and pair each cow 110 and its specific milking time slot and retrieve each cow 110 when its corresponding milking time slot approaches.

Any one or any combination of the above circumstances (902, 904 and 906) can generate a system alert (908). The system alert can be directly communicated to the farmer (910) who manually activates the cow retrieval functionality (block 912). Preferably, a generated system alert (908) automatically activates the cow retrieval functionality (912) and, optionally also alerts the farmer (910) (dashed line).

Figure 11A:
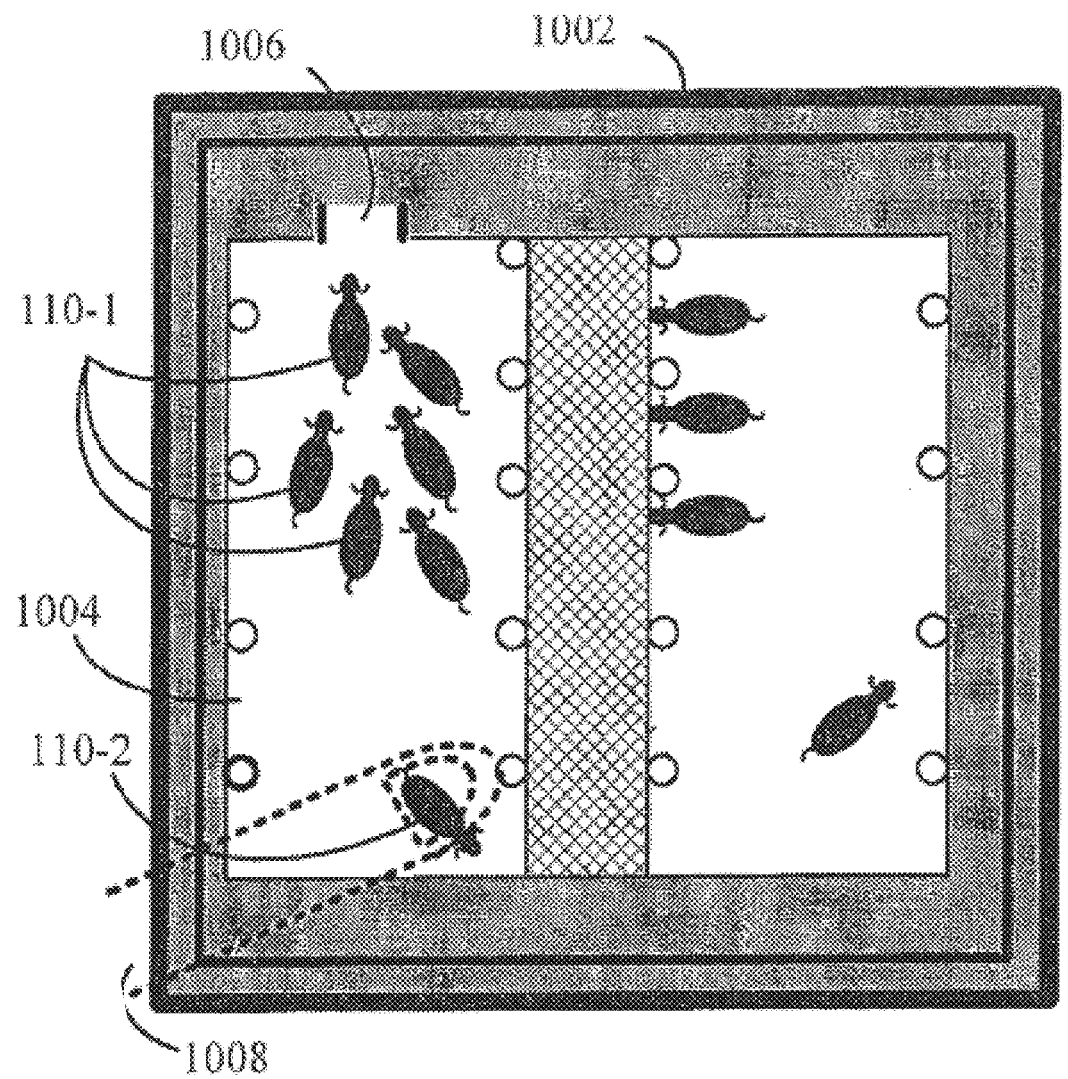
FIGS. 11A-B are simplified illustrations of an embodiment of displays of a system computer.
Figure 11B:
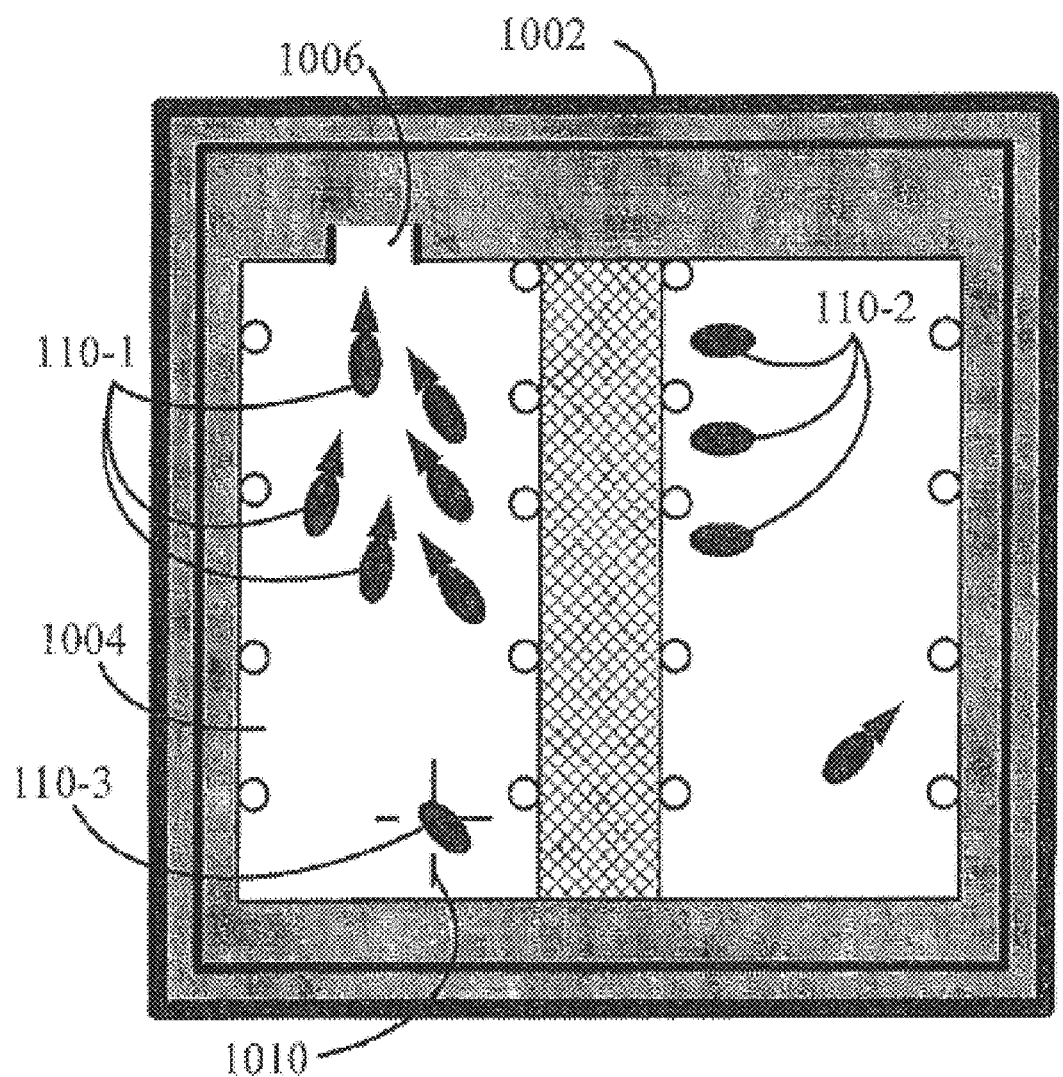

Reference is now made to FIGS. 11A-B, which are schematic illustrations of an embodiment of a display 1002 of system 100 computer 125. Display 1002 could be a touch-screen and display a real time image 1004 of cows 110 in the cowshed, for example, as captured from a camera located at the ceiling of the cowshed. A user can identify a group of cows such as cows 110-1, facing an open gate 1006 (e.g., leading to a milking parlor) and an isolated cow 110-2 not facing the gate. A user can press on the image of cow 110-2 with a finger 1008, depicted in FIG. 11A by broken lines, which can automatically activate the retrieval functionality of system 100 to retrieve selected cow 110-2.

In another embodiment, shown schematically in FIG. 11B, system 100 computer 125 can generate a graphic display of cows 110 in the cowshed. In the display in FIG. 11, moving cows 110-1 are depicted by having arrowheads, preferably indicating the direction of movement, whereas stationary cows 110-2 and cow 110-3 lack arrowheads. A user can identify and mark a stationary cow such as cow 110-3 with, for example, cross-hairs 1010, employing a finger (e.g., on a touch screen) or by using keyboard arrows, a mouse or a joystick, which can automatically activate the retrieval functionality of system 100 to retrieve selected cow 110-2.

It will also be appreciated by persons skilled in the art that the present method and apparatus are not limited to what has been particularly shown and described hereinabove. Rather, the scope of the method and apparatus includes both combinations and sub-combinations of various features described hereinabove as well as modifications and variations thereof which would occur to a person skilled in the art upon reading the foregoing description and which are not in the prior art.

It is another object of the present invention to disclose the system as defined above, wherein, based upon the location of said animal, an automatic entrance into and out of said milking parlor is provided.

It is another object of the present invention to disclose the system as defined above, wherein, once a predetermined quantity of said milk is milked from said animal or after a predetermined amount of time, an automatic release of said animal from said milking parlor is provided.

The invention claimed is:

1. A system for milking and locating the position of at least one animal within a milking parlor, said system comprising:
    at least one identification means configured to transmit at least one identification signal associated with said at least one animal;
    at least one locating means configured to generate at least one location signal associated with said at least one animal;
    at least one milking means configured for milking at least one animal;
    at least one sensor for monitoring the milking; and,
    a data processing system in communication with said at least one identification means, said at least one location means, and said at least one milking means, said data processing system configured to:
        analyze said location and identification signals, said analyzed signals comprising the position within said predetermined region of space of said at least one animal as a function of time; and discontinue milking when the amount of milk removed from said at least one animal is substantially equal to a predetermined amount.

2. The system according to claim 1, wherein said position is at least one of n milking cells within said milking parlor, n is an integer greater than one.

3. The system according to claim 2, wherein said system identifies said position of said at least one animal without use of location means associated with each of said n milking cells.

4. The system according to claim 2, wherein said data processing system, based on said location signals and said identification signal, is adapted to provide said n cell in which said animal is positioned within said system.

5. The system according to claim 2, wherein said data processing system averages said location signals and provides said n cell in which said animal is positioned within said system.

6. The system according to claim 2, wherein said data processing system integrates multiple reading from either said animal and\or at least one adjacent animal over time to make a reliable estimation of said n cells.

7. The system according to claim 1, wherein said at least one locating means comprises at least one ultra-wide-band UWB transmitter and at least one UWB receiver, and wherein said at least one UWB transmitter is configured to be located inside the headlock system or milking parlor and the at least one UWB receiver is configured to be located outside of said headlock system or milking parlor, or vice versa.

8. The system according to claim 1, wherein the system additionally comprises an indicator mechanism placed on said at least one animal, the indicator mechanism configured such that said user can be notified that intervention is needed for at least one said animal.

9. The system according to claim 1, wherein said sensor is a milk flow sensor configured to measure a flow rate of milk.

10. The system according to claim 1, wherein said sensor is located in a position selected from a group consisting of: on a milking robot, on a milking stall, on a cattle stall, and any combination thereof.

11. A method for milking and locating the position of at least one animal in a milking parlor, the method comprising:
providing a system for milking and locating the position of said at least one animal, said system comprising:
at least one identification means configured to transmit at least one identification signal associated with said at least one animal;
at least one locating means configured to generate at least one location signal associated with said at least one animal;
at least one milking means configured for milking at least one animal;
at least one sensor for monitoring the milking; and,
a data processing system in communication with said at least one identification means, said at least one location means, and said at least one milking means, said data processing system configured to:
analyze said location and identification signals, said analyzed signals comprising the position within said predetermined region of space of each of said at least one animal as a function of time; and
discontinue milking when the amount of milk removed from said at least one animal is substantially equal to a predetermined amount.

12. The method according to claim 11, wherein said at least one locating means comprises at least one ultra-wide-band UWB transmitter and at least one UWB receiver, wherein said at least one UWB transmitter is located inside the headlock system or milking parlor and the at least one UWB receiver is located outside of said headlock system or milking parlor, or vice versa.

13. The method according to claim 11, wherein said system additionally comprises an indicator mechanism placed on said at least one animal, the indicator mechanism configured such that said user can be notified that intervention is needed for at least one said animal.

14. A system for milking and locating the position of at least one animal within a milking parlor, said system comprising:
at least one identification means configured to transmit at least one identification signal associated with said at least one animal;
at least one locating means configured to generate at least one location signal associated with said at least one animal;
at least one milking means configured for milking at least one animal;
at least one sensor for monitoring the milking; and,
a data processing system in communication with said at least one identification means, said at least one location means, and said at least one milking means, said data processing system configured to:
analyze said location and identification signals, said analyzed signals comprising the position within said predetermined region of space of said at least one animal as a function of time; and
discontinue milking based on a change in a flow of milk removed from said at least one animal.

15. The system according to claim 14, wherein said sensor is a milk flow sensor configured to measure a flow rate of milk.

16. The system according to claim 14, wherein said sensor is located in a position selected from a group consisting of: on a milking robot, on a milking stall, on a cattle stall, and any combination thereof.

17. The system of claim 14, wherein the milking is discontinued when the flow of milk has substantially decreased.

18. The system according to claim 14, wherein said at least one locating means comprises at least one ultra-wide-band UWB transmitter and at least one UWB receiver, wherein said at least one UWB transmitter is located inside the headlock system or milking parlor and the at least one UWB receiver is located outside of said headlock system or milking parlor, or vice versa.

19. The system according to claim 14, wherein said system additionally comprises an indicator mechanism placed on said at least one animal, the indicator mechanism configured such that said user can be notified that intervention is needed for at least one said animal.

* * * * *